(12) United States Patent
Bauer et al.

(10) Patent No.: US 11,718,774 B2
(45) Date of Patent: Aug. 8, 2023

(54) ABRASIVE PARTICLES AND METHODS OF FORMING SAME

(71) Applicant: SAINT-GOBAIN CERAMICS & PLASTICS, INC., Worcester, MA (US)

(72) Inventors: Ralph Bauer, Niagara Falls (CA); Eric Moch, Allston, MA (US); Jennifer H. Czerepinski, Framingham, MA (US); Yves Boussant-Roux, Avignon (FR); Flavien Fremy, Brookline, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 90 days.

(21) Appl. No.: 15/591,964

(22) Filed: May 10, 2017

(65) Prior Publication Data

US 2017/0335156 A1  Nov. 23, 2017

Related U.S. Application Data

(60) Provisional application No. 62/334,296, filed on May 10, 2016.

(51) Int. Cl.
*C09K 3/14* (2006.01)
*C01F 7/441* (2022.01)
(Continued)

(52) U.S. Cl.
CPC ............... *C09K 3/1409* (2013.01); *B01J 2/26* (2013.01); *C01F 7/441* (2013.01);
(Continued)

(58) Field of Classification Search
CPC ........ C09K 3/1409; C09K 3/1436; B01J 2/26; C01F 7/441; C04B 35/1115;
(Continued)

(56) References Cited

U.S. PATENT DOCUMENTS

| 345,604 A | 7/1886 | Semper |
| 1,910,444 A | 5/1933 | Nicholson |

(Continued)

FOREIGN PATENT DOCUMENTS

| CA | 743715 A | 10/1966 |
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.

(Continued)

*Primary Examiner* — Pegah Parvini
*Assistant Examiner* — Ross J Christie
(74) *Attorney, Agent, or Firm* — Abel Schillinger, LLP; Adrian Lawrence

(57) ABSTRACT

An abrasive particle having a body including a first major surface, a second major surface opposite the first major surface, and a side surface extending between the first major surface and the second major surface, such that a majority of the side surface comprises a plurality of microridges.

20 Claims, 36 Drawing Sheets

(51) Int. Cl.
*C04B 35/111* (2006.01)
*C04B 35/626* (2006.01)
*B01J 2/26* (2006.01)

(52) U.S. Cl.
CPC ...... *C04B 35/1115* (2013.01); *C04B 35/6261* (2013.01); *C09K 3/1436* (2013.01); *C04B 2235/3217* (2013.01); *C04B 2235/3218* (2013.01); *C04B 2235/5292* (2013.01); *C04B 2235/5296* (2013.01); *C04B 2235/606* (2013.01); *C04B 2235/6021* (2013.01); *C04B 2235/6583* (2013.01)

(58) Field of Classification Search
CPC ........ C04B 35/6261; C04B 2235/3217; C04B 2235/3218; C04B 2235/5292; C04B 2235/5296; C04B 2235/6021; C04B 2235/606; C04B 2235/6583
See application file for complete search history.

(56) References Cited

U.S. PATENT DOCUMENTS

| | | | |
|---|---|---|---|
| 2,033,991 A | 3/1936 | Melton et al. |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |

(56) References Cited

U.S. PATENT DOCUMENTS

| | | |
|---|---|---|
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Melson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujar et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |

(56) References Cited

U.S. PATENT DOCUMENTS

| | | |
|---|---|---|
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,500,493 B2 | 12/2002 | Swei et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,572,554 B2 | 6/2003 | Yock |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,620,214 B2 | 9/2003 | McArdle et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 * | 10/2011 | Erickson ............... B24D 3/00 428/142 |
| 3,049,136 A1 | 11/2011 | Mase et al. |
| 8,049,136 B2 | 11/2011 | Mase et al. |
| 8,070,556 B2 | 12/2011 | Kumar et al. |
| 8,079,806 B2 | 12/2011 | Tholen et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Cedric |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2 | 7/2019 | Josseaux et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |

(56) References Cited

U.S. PATENT DOCUMENTS

| | | |
|---|---|---|
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0060243 A1* | 4/2004 | Fries ............... B24D 3/08 51/293 |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1* | 7/2009 | Culler ............... B01J 2/22 51/296 |
| 2009/0165661 A1 | 7/2009 | Koenig et al. |
| 2009/0169816 A1* | 7/2009 | Erickson ............... B01J 2/22 51/309 |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0015119 A1 | 6/2010 | Adefris |
| 2010/0015120 A1 | 6/2010 | Erickson |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0021295 A1 | 8/2013 | Welygan |
| 2013/0199105 A1 | 8/2013 | Braun et al. |
| 2013/0203328 A1 | 8/2013 | Givot et al. |
| 2013/0212952 A1* | 8/2013 | Welygan ............ B23K 26/0821 51/309 |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0033726 A1 | 12/2013 | Bauer |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0034520 A1 | 2/2014 | Scicluna |
| 2014/0080393 A1 | 3/2014 | Ludwig |
| 2014/0010612 A1 | 4/2014 | Gaeta |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1* | 9/2014 | Flaschberger ............ B24D 3/14 51/307 |
| 2014/0290147 A1 | 10/2014 | Seth et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |

(56) References Cited

U.S. PATENT DOCUMENTS

| | | |
|---|---|---|
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0023272 A1 | 1/2015 | Choi et al. |
| 2015/0034360 A1 | 2/2015 | Muto et al. |
| 2015/0089881 A1* | 4/2015 | Stevenson ............ C09K 3/1409 51/309 |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0225299 A1 | 8/2017 | Keipert et al. |
| 2017/0335156 A1 | 11/2017 | Bauer et al. |
| 2017/0349797 A1 | 12/2017 | Yener et al. |
| 2018/0086957 A1 | 3/2018 | Sahlin et al. |
| 2018/0161960 A1 | 6/2018 | Wilson et al. |
| 2018/0169837 A1 | 6/2018 | Liu |
| 2018/0215975 A1 | 8/2018 | Marazano et al. |
| 2018/0215976 A1 | 8/2018 | Cotter et al. |
| 2018/0318983 A1 | 11/2018 | Wilson et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0126436 A1 | 5/2019 | Westberg et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 78896 A2 | 5/1983 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 931032 B1 | 7/2001 |
| EP | 0931032 B3 | 7/2001 |
| EP | 0833803 | 8/2001 |
| EP | 1207015 A2 | 5/2002 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |

(56) References Cited

FOREIGN PATENT DOCUMENTS

| | | |
|---|---|---|
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 2001162541 A1 | 6/2001 |
| JP | 03194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 9711484 A1 | 3/1997 |
| WO | 1997014536 A1 | 4/1997 |
| WO | 1999006500 A1 | 2/1999 |
| WO | 99/14016 A1 | 3/1999 |
| WO | 99/38817 A1 | 8/1999 |
| WO | 1999038817 A1 | 8/1999 |
| WO | 9954424 A1 | 10/1999 |
| WO | 00/64630 A1 | 11/2000 |
| WO | 01/14494 A1 | 3/2001 |
| WO | 0123323 A1 | 4/2001 |
| WO | 2002097150 | 12/2002 |
| WO | 03/087236 A1 | 10/2003 |
| WO | 2005/080624 A1 | 9/2005 |
| WO | 2005/112601 A2 | 12/2005 |
| WO | 2006/027593 | 3/2006 |
| WO | 2006/062597 A1 | 6/2006 |
| WO | 2007/041538 A1 | 4/2007 |
| WO | 2009/085578 A2 | 7/2009 |
| WO | 2009-085841 A2 | 7/2009 |
| WO | 2009085578 A2 | 7/2009 |
| WO | 2009085841 A2 | 7/2009 |
| WO | 2009/098017 A1 | 8/2009 |
| WO | 2010-077509 A1 | 7/2010 |
| WO | 2010/077509 A1 | 7/2010 |
| WO | 2010/085587 A1 | 7/2010 |
| WO | 2010085587 A1 | 7/2010 |
| WO | 2010/151201 | 12/2010 |
| WO | 2011005425 A2 | 1/2011 |
| WO | 2011019188 A2 | 2/2011 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011133438 A1 | 10/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2010070294 A1 | 8/2012 |
| WO | 2012/141905 A2 | 10/2012 |
| WO | 2012092590 A3 | 10/2012 |
| WO | 2012140617 A1 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013040423 A2 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | WO-2013106602 A1 * | 7/2013 ........... C09K 3/1409 |
| WO | 2013/151745 A1 | 10/2013 |
| WO | 2013149209 A1 | 10/2013 |
| WO | 2013/177446 | 11/2013 |
| WO | 2013/177446 A1 | 11/2013 |
| WO | WO-2013177446 A1 * | 11/2013 ........... C09K 3/1427 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2017/106173 A1 | 7/2014 |

(56) References Cited

FOREIGN PATENT DOCUMENTS

| | | |
|---|---|---|
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015143461 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017151498 A1 | 9/2017 |
| WO | 2018/010730 A2 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018/118688 A1 | 6/2018 |
| WO | 2018/118690 A1 | 6/2018 |
| WO | 2018/118695 A1 | 6/2018 |
| WO | 2018/118699 A1 | 6/2018 |
| WO | 2018/134732 A1 | 7/2018 |
| WO | 2018/136268 A1 | 7/2018 |
| WO | 2018/136269 A1 | 7/2018 |
| WO | 2018/136271 A1 | 7/2018 |
| WO | 2018/172193 A1 | 9/2018 |
| WO | 2018207145 A1 | 11/2018 |
| WO | 2018/236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2020212788 A1 | 10/2020 |
| WO | 2021/009600 A1 | 1/2021 |
| WO | 2021/014271 A1 | 1/2021 |
| WO | 2021/074756 A1 | 4/2021 |
| WO | 2021/074768 A1 | 4/2021 |
| WO | 2021/079331 A1 | 4/2021 |
| WO | 2021/081571 A1 | 5/2021 |
| WO | 2021105030 A1 | 6/2021 |
| WO | 2021116883 A1 | 6/2021 |
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | 2021179025 A1 | 9/2021 |
| WO | 2021186326 A1 | 9/2021 |
| WO | 2021214576 A1 | 10/2021 |

(56) References Cited

FOREIGN PATENT DOCUMENTS

| WO | 2021214605 A1 | 10/2021 |
|---|---|---|
| WO | 2021234540 A1 | 11/2021 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Manstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com. May 2014, pp. 36-44.
DOW Machine Tool Accessories, Grinding & Surface Finishing, www.1mta.com, Nov. 2014, 72 pages.
International Search Report with regard to International application No. PCT/US2017/031998, dated Aug. 21, 2017.
International Search Report with regard to International application No. PCT/US2017/031992, dated Aug. 21, 2017.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
NPL, VSM Actirox Fibre Discs, The Latest Generation of Abrasives for Maximum Stock Removal [PDF] VSM Abrasives Ltd., Apr. 2019 [retrieved on May 15, 2019]. Retrieved from https://uk.vsmabrasives.com/fileadmin/user_upload/ACTIROX/VSM-ACTIROX-EN.pdf.
International Search Report and Written Opinion for Application No. PCT/US2016/036701, dated Sep. 1, 2016, 12 pages.
Kavanaugh, et al., "Shaped Ceramic Articles by Screen Printing", Saint-Gobain Ceramics & Plastics R&D Center, 3 pages.
Nakahara, A., Matsuo, Y. (2007). Morphological Change of Crack Patterns Induced by Memory Effect of Drying Paste. In: Schadschneider, A., Pöschel, T., Kühne, R., Schreckenberg, M., Wolf, D.E. (eds) Traffic and Granular Flow'05. Springer, Berlin, Heidelberg, Abstract only. <https://doi.org/10.1007/978-3-540-47641-2_14>.
Khatun, Tajkera, et al., "Crack Formation in the Presence of an Electric Field in Droplets of Laponite Gel" Aug. 14, 2013, Condensed Matter Physics Research Centre, Physics Department, Jadavpur University, Kolkata 700032, India and Physics Department, St. Xavier's College, Kolkata 700016, India, 28 pages <http://arxiv.org/pdf/1308.3023.pdf>.

* cited by examiner

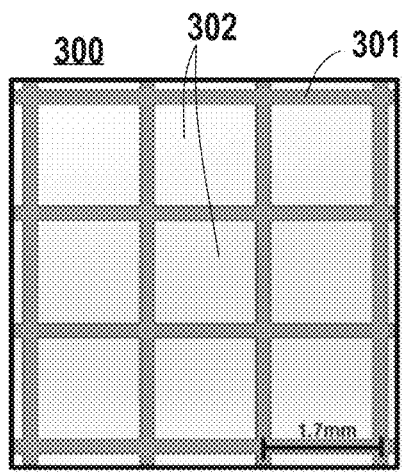
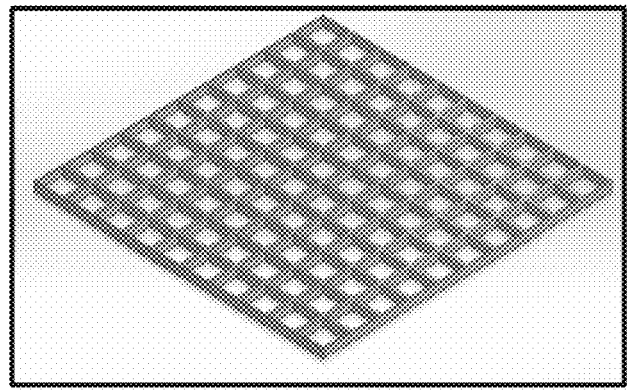
FIG. 3A  FIG. 3B
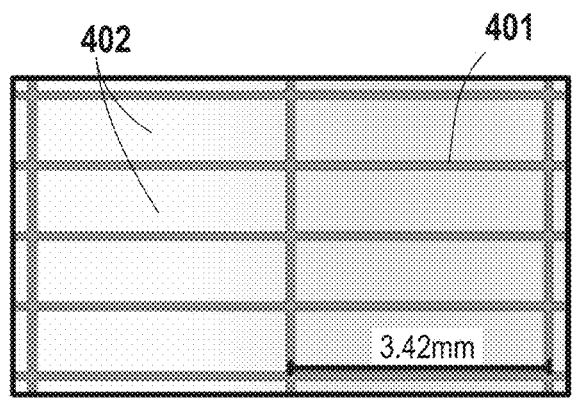
FIG. 4A
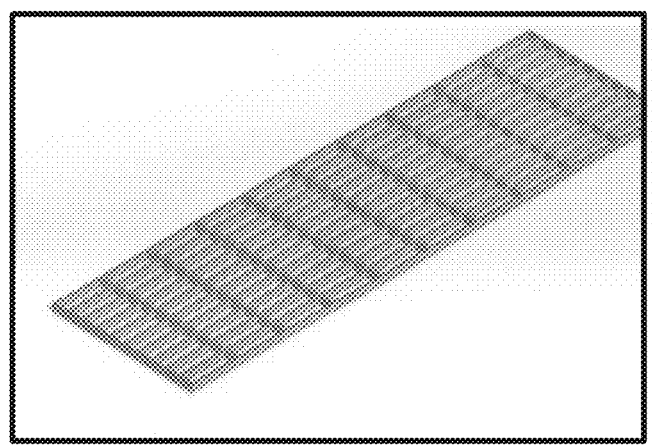
FIG. 4B

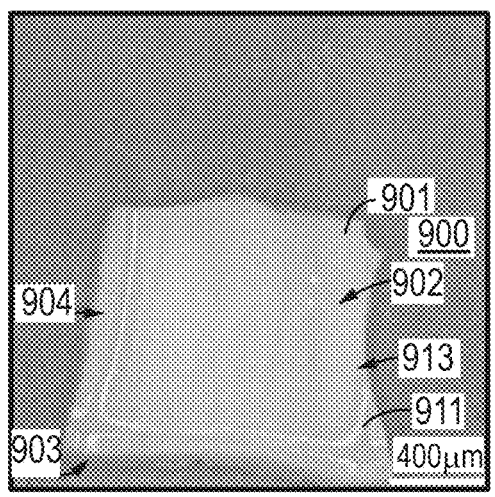 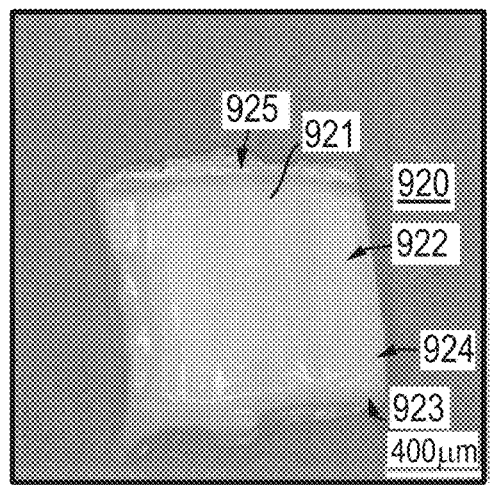
FIG. 9A  FIG. 9B
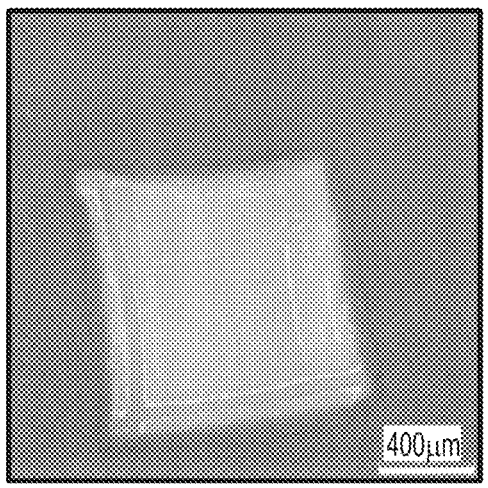 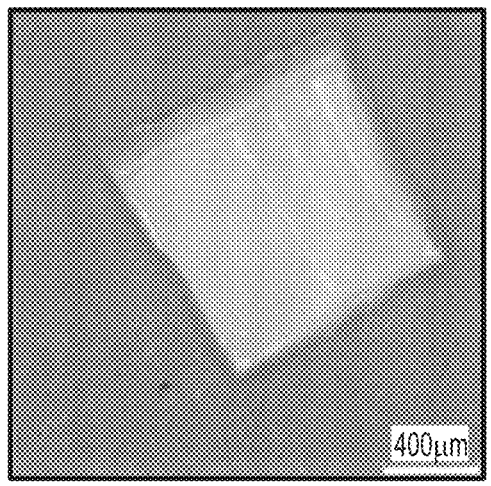
FIG. 9C  FIG. 9D
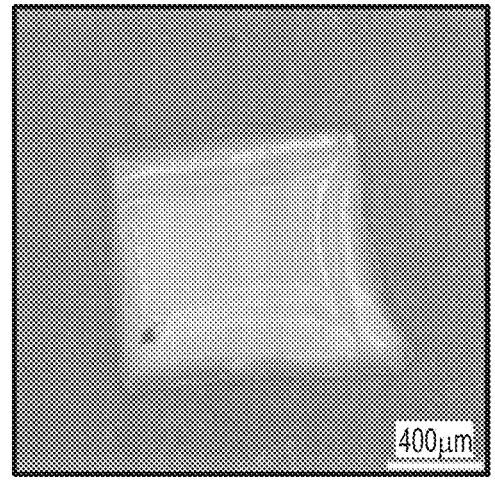
FIG. 9E

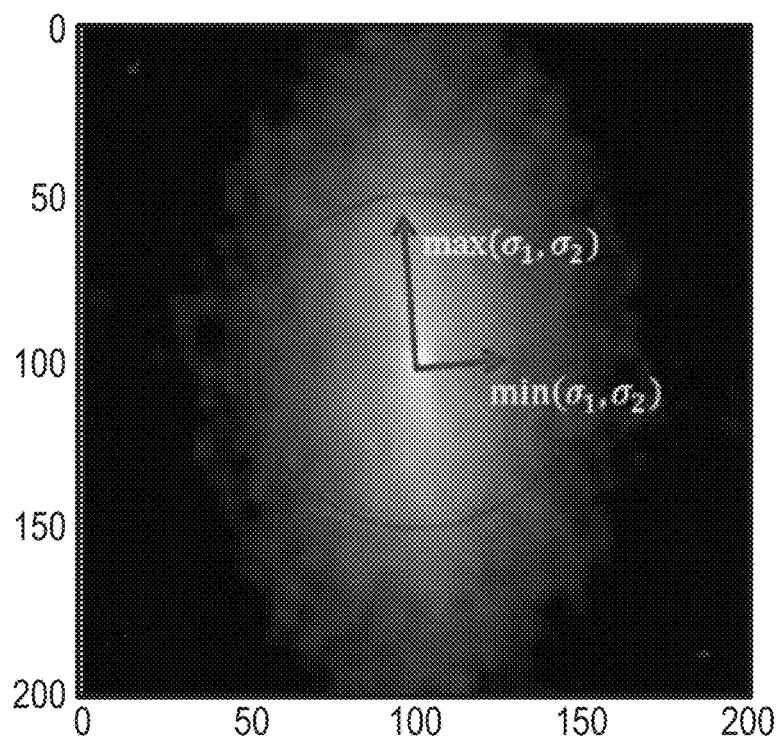
FIG. 21B
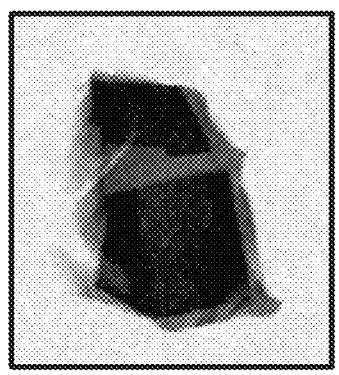 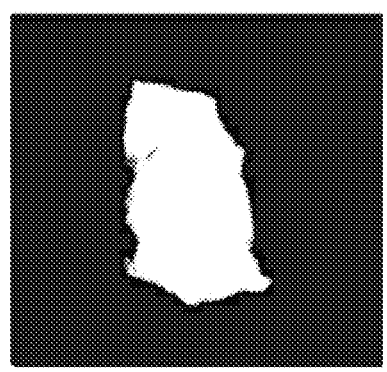 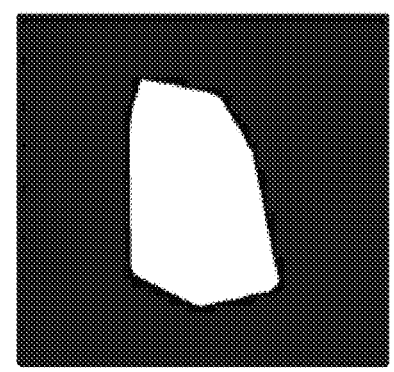
FIG. 22A      FIG. 22B      FIG. 22C

ABRASIVE PARTICLES AND METHODS OF FORMING SAME

CROSS-REFERENCE TO RELATED APPLICATION(S)

This application claims priority under 35 U.S.C. § 119(e) to U.S. Provisional Patent Application No. 62/334,296 entitled "ABRASIVE PARTICLES AND METHOD OF FORMING SAME," by Ralph BAUER et al., filed May 10, 2016, which is assigned to the current assignee hereof and incorporated herein by reference in its entirety.

BACKGROUND

Field of the Disclosure

The following is directed to abrasive particles, and more particularly, to abrasive particles having certain features and methods of forming such abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041. Other relevant disclosures on abrasive particles and associated methods of forming and abrasive articles incorporating such particles are available at: http://www.abel-ip.com/publications/.

The industry continues to demand improved abrasive materials and abrasive articles.

SUMMARY

According to one aspect, an abrasive particle includes a body including a first major surface, a second major surface opposite the first major surface, and a side surface extending between the first major surface and the second major surface, wherein the side surface comprises a Mean Anisotropy Factor of at least 1.25.

According to another aspect, an abrasive particle includes a body including a first major surface, a second major surface opposite the first major surface, and a side surface extending between the first major surface and the second major surface, wherein the first major surface comprises a first protrusion disposed abutting the first side surface portion and extending along at least a portion of the first side surface portion, and further comprising an untextured region extending through a central region of the body, wherein the untextured region defines a majority of a total surface area of the first major surface.

In yet another aspect, an abrasive particle includes a body including a first major surface, a second major surface opposite the first major surface, and a side surface extending between the first major surface and the second major surface, wherein a majority of the side surface comprises a plurality of microridges.

According to yet another aspect, a collection of abrasive particles includes a first abrasive particle comprising a body including a first major surface, a second major surface opposite the first major surface, and a side surface extending between the first major surface and the second major surface, wherein the body of the first abrasive particle comprises a first two-dimensional shape, and wherein the first major surface comprises a first protrusion abutting and extending along at least a portion of a first side surface portion of the side surface, and wherein the body further comprises an untextured region extending through a central region of the body, wherein the untextured region defines a majority of a total surface area of the first major surface, and further including a second abrasive particle comprising a body including a first major surface, a second major surface opposite the first major surface, and a side surface extending between the first major surface and the second major surface, wherein the body of the second abrasive particle comprises a two-dimensional shape that is different compared to the two-dimensional shape of the first abrasive particle.

In yet another aspect, a collection of abrasive particles comprises abrasive particles, wherein each particle of the collection of abrasive particles includes a body having a first major surface, a second major surface opposite the first major surface, and a side surface extending between the first major surface and the second major surface; and wherein a majority of the particles of the collection of abrasive particles comprises a plurality of microridges extending along at least a portion of the sides surface.

According to still another aspect, a collection of abrasive particles comprises abrasive particles, wherein a particle of the collection of abrasive particles includes a body having a first major surface, a second major surface opposite the first major surface, and a side surface extending between the first major surface and the second major surface, and wherein the side surface includes a plurality of side surface portions extending between external corners of the body and wherein at least 45% of the side surface portions of the body include a plurality of microridges.

One aspect includes a collection of abrasive particles, wherein each abrasive particle of the collection of abrasive particles including a body having a first major surface, a second major surface opposite the first major surface, and a side surface extending between the first major surface and the second major surface, wherein the first major surface and second major surface are substantially parallel with each other; and wherein the collection of abrasive particles comprises a Mean Non-Convexity Factor of at least 3.5 and a Non-Convexity Factor Standard Deviation of at least 2.4.

Another aspect includes a collection of abrasive particles, wherein each abrasive particle of the collection of abrasive particles comprises a body having a first major surface, a second major surface opposite the first major surface, and a side surface extending between the first major surface and the second major surface, and wherein the collection of abrasive particles comprises a Mean Anisotropy Factor of at least 1.25.

And yet another aspect includes a collection of abrasive particles, wherein each abrasive particle of the collection of abrasive particles comprises a body having a first major surface, a second major surface opposite the first major surface, and a side surface extending between the first major surface and the second major surface, wherein the body comprises a height as defined as the distance along the side surface between the first major surface and the second major surface wherein the collection of abrasive particles comprises a standard deviation of height of not greater than 100 microns, and wherein the collection of abrasive particles comprises a Mean Non-Convexity Factor of at least 3.5.

BRIEF DESCRIPTION OF THE DRAWINGS

The present disclosure may be better understood, and its numerous features and advantages made apparent to those skilled in the art by referencing the accompanying drawings.

FIGS. 3A, 3B, and 4A-4L include top-down and perspective view illustrations of forms used to modify a body according to embodiments.

FIGS. 9A-9E include images of abrasive particles according to embodiments herein.

FIG. 21B includes the image of the FIG. 21A as analyzed using the Fourier Transform.

FIG. 22A includes a top-down X-ray microscopy (XRM) image of an abrasive particle according to an embodiment.

FIG. 22B includes a binary image of FIG. 22A.

FIG. 22C includes a converted image of FIG. 22B using a convex hull analysis via imaging processing software.

DETAILED DESCRIPTION

The following is directed to methods of forming abrasive particles and features of such abrasive particles. The abrasive particles may be used in various abrasive articles, including for example bonded abrasive articles, coated abrasive articles, and the like. Alternatively, the abrasive particles of the embodiments herein may be utilized in free abrasive technologies, including for example grinding and/or polishing slurries.

Figure 1:
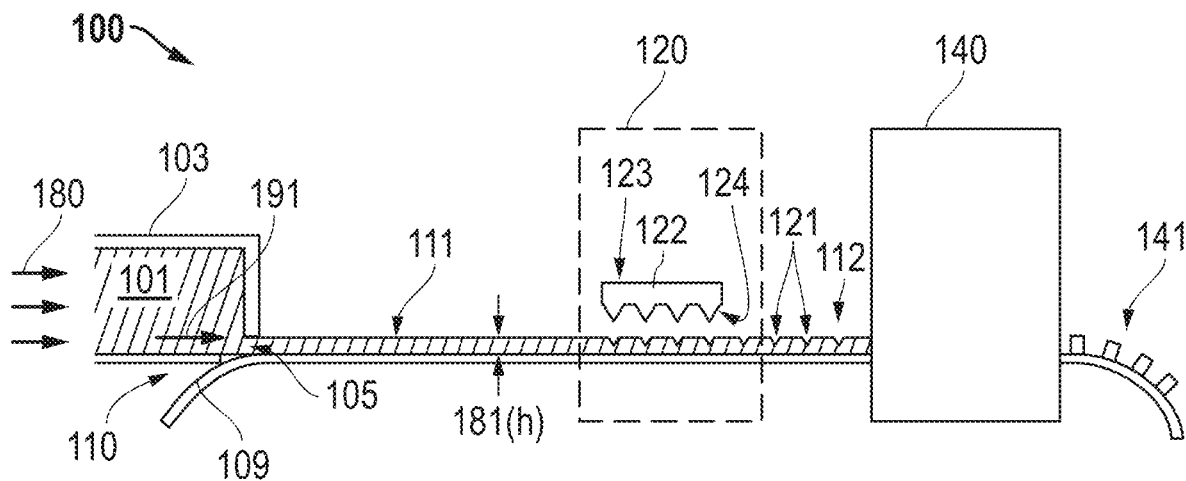
FIG. 1 includes a schematic of a method of forming an abrasive particle in accordance with an embodiment.

FIG. 1 includes an illustration of a system for forming an abrasive particle in accordance with an embodiment. The process of forming the abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to hold a given shape even in the green (i.e., unfired) state.

In accordance with an embodiment, the gel can include a powder material that is an integrated network of discrete particles.

The mixture 101 can be formed to have a particular content of solid material, such as the ceramic powder material. For example, in one embodiment, the mixture 101 can have a solids content within a range of at least 25 wt % and not greater than 75 wt % for the total weight of the mixture 101.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being Al2O3·H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 101 can be formed to have a particular content of liquid material. Some suitable liquids may include organic materials. Other suitable materials can include water. In accordance with one embodiment, the mixture 101 can be formed to have a liquid content less than the solids content of the mixture 101. In more particular instances, the mixture 101 can have a liquid content within a range of at least about 25 wt % and not greater than 75 wt % for the total weight of the mixture 101. The water content of the mixture 101 may be controlled to facilitate suitable drying upon shrinkage, which may assist with the formation of abrasive particles according to the embodiments herein.

Furthermore, to facilitate processing and forming abrasive particles according to embodiments herein, the mixture 101 can have a particular storage modulus. For example, the mixture 101 can have a storage modulus within a range of at least about $1 \times 10^4$ Pa and not greater than about $1 \times 10^7$ Pa. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.1% to 100%, at 6.28 rad·s$^{-1}$ (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported. The viscosity can be calculated by dividing the storage modulus value by 6.28 s$^{-1}$.

Furthermore, to facilitate processing and forming abrasive particles according to embodiments herein, the mixture 101 can have a particular viscosity, which may facilitate later processing (e.g., modification) and formation of the desired abrasive particles. For example, the mixture 101 can have a viscosity of at least about $4 \times 10^3$ Pa·s, at least about $5 \times 10^3$ Pa·s, at least about $6 \times 10^3$ Pa·s, at least about $8 \times 10^3$ Pa·s, at least about $10 \times 10^3$ Pa·s, at least about $20 \times 10^3$ Pa·s, at least about $30 \times 10^3$ Pa·s, at least about $40 \times 10^3$ Pa·s, at least about $50 \times 10^3$ Pa·s, at least about $60 \times 10^3$ Pa·s, or even at least about $65 \times 10^3$ Pa·s. In at least one non-limiting embodiment, the mixture 101 may have a viscosity of not greater than about $1 \times 10^6$ Pa·s, not greater than about $5 \times 10^5$ Pa·s, not greater than about $3 \times 10^5$ Pa·s, or even not greater than about $2 \times 10^5$ Pa·s. It will be appreciated that the viscosity of the mixture 101 can be within a range between any of the minimum and maximum values noted above.

Moreover, the mixture 101 can be formed to have a particular content of organic materials, including for example, organic additives that can be distinct from the liquid, to facilitate processing and formation of abrasive particles according to the embodiments herein. Some suitable organic additives can include stabilizers, plasticizers, surfactants, binders, such as fructose, sucrose, lactose, glucose, UV curable resins, and the like.

The embodiments herein may utilize a mixture 101 having a particular content of organic additives. For example, the content of organic materials within the mixture 101, particularly, any of the organic additives noted above may be a minor amount as compared to other components within the mixture 101. In at least one embodiment, the mixture 101 can have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.1 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid and/or base to facilitate processing and formation of abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture 101 can have a pH of less than about 5, and more particularly, within a range between about 2 and about 4, using a nitric acid additive.

The process of forming the abrasive particles can include forming the mixture 101 into a body. Referencing FIG. 1, the system 100 can include a die 103 and define a deposition zone wherein the mixture 101 is formed into the body 111. As illustrated, the mixture 101 can be provided within the interior of the die 103 and configured to be extruded through a die opening 105 positioned at one end of the die 103. As further illustrated, forming can include applying a force 180 (that may be translated into a pressure) on the mixture 101 to facilitate moving the mixture 101 through the die opening 105. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 10 MPa or not greater than 5 MPa. It will be appreciated that the pressure used to extrude the mixture 101 can be within a range between any of the minimum and maximum values noted above.

In certain systems, the die 103 can include a die opening 105 having a particular shape. It will be appreciated that the die opening 105 may be shaped to impart a particular shape to the mixture 101 and the resulting body 111. Furthermore, the mixture 101 extruded through the die opening 105 and the resulting body 111 can have essentially the same cross-sectional shape as the die opening 105. In accordance with an embodiment, the die opening 105 can have a rectangular shape. In still other embodiments, the die opening 105 can be shaped to create certain features in one or more surfaces of the body 111 as the mixture exits the die 103. The features can include a controlled distribution of features. Thus in certain instances, extrusion of the mixture 101 from the die 103 and modification of the body 111 can happen simultaneously. That is, the mixture 101 can exit the die 103 and be formed into a body 111 having certain features in one or more surfaces, such that the during forming of the body 111, the body 111 is also modified to include one or more features in one or more surfaces of the body 111.

As further illustrated in FIG. 1, the mixture 101 may be extruded onto a substrate. In the illustrated embodiment of FIG. 1, the substrate is in the form of a belt 109 underlying the die 103, such that the resulting body 111 is in the form or a layer or sheet of material. Other types of substrates may be utilized. In specific instances, the mixture 101 can be extruded directly onto the belt 109, which may facilitate continuous processing.

According to one particular embodiment, the belt 109 can be formed to have a film overlying a substrate, wherein the film can be a discrete and separate layer of material configured to facilitate processing and forming of abrasive particles. The process can include providing the mixture 101 directly onto the film of the belt to form the body 111. In certain instances, the film can include a polymer material, such as polyester. In at least one particular embodiment, the film can consist essentially of polyester.

In still another embodiment, the upper surface of the belt 109 can have a particular roughness, which may facilitate formation of the abrasive particles according to the embodiments herein. For example, the roughness of the surface of the belt 109 may impact the manner in which the body 111 is dried and may facilitate controlled cracking of the body 111. Various materials can be used for the belt 109 or as a coating on the surface of the belt 109. Some suitable materials can include inorganic materials, such as metal, metal alloys, ceramics, polycrystalline materials, amorphous phase materials, monocrystalline materials, or any combination thereof. In another embodiment, the belt 109 or upper surface of the belt 109 can include an organic material, such as a polymer, which may include materials such as epoxies, resins, thermosets, thermoplastics, polyimides, polyamides, and a combination thereof. It will be appreciated that the upper surface of the belt 109 may include one or more features, which are described in embodiments herein, which may be used to form a distribution of features in a portion of the body 111, such as the portion of the body 111 in contact with the upper surface of the belt 109 having such features. For example, aspects of the belt 109, such as surface roughness, material of the belt and the like, may be tailored to the specific aspects of the body 111 and the forming process to facilitate suitable formation of abrasive particles as described in embodiment herein.

In some embodiments, the belt 109 can be translated while moving the mixture 101 through the die opening 105. As illustrated in the system 100, the mixture 101 may be extruded in a direction 191. The direction of translation 110 of the belt 109 can be angled relative to the direction of extrusion 191 of the mixture. While the angle between the direction of translation 110 and the direction of extrusion 191 are illustrated as substantially orthogonal in the system 100, other angles are contemplated, including for example, an acute angle or an obtuse angle. Moreover, while the mixture 101 is illustrated as being extruded in a direction 191, which is angled relative to the direction of translation 110 of the belt 109, in an alternative embodiment, the belt 109 and mixture 101 may be extruded in substantially the same direction.

The belt 109 may be translated at a particular rate to facilitate processing. For certain processes according to embodiments herein, the rate of translation of the belt 109 as compared to the rate of extrusion of the mixture 101 in the direction 191 may be controlled to facilitate proper processing. For example, the rate of translation of the belt 109 can be essentially the same as the rate of extrusion to ensure formation of a suitable body 111.

For certain embodiments, the mixture 101 may be extruded to form a body 111 in the form of a body 111 having a generally rectangular cross-sectional shape as viewed in a plane defined by a height and width of the body 111. While the body 111 is illustrated as a sheet, it will be appreciated that the process is not so limited and the mixture can be formed into a body having any desired shape.

The process of forming the body 111 from the mixture 101 can include control of particular features and process parameters to facilitate suitable formation of abrasive particles having one or more features as provided in the embodiments herein. For example, in certain instances, the process of forming a body 111 from the mixture 101 can include forming a body 111 having a particular height. Moreover, it is noted that the height 181 of the body 111 can be controlled by varying a distance between the die 103 and the surface of the belt 109. Alternatively, the process may use a doctor blade or similar technique to control the height 181 of the body 111. Additionally, forming the mixture 101 into the body 111 can include controlling the dimensions of the body 111 based in part upon the viscosity of the mixture 101. In at least one embodiment, the body 111 is formed into a large layer of material having a first major surface having a major surface area of at least 10 $cm^2$, such as at least 20 $cm^2$ or at least 50 $cm^2$ or at least 100 $cm^2$ or at least 500 $cm^2$ or at least 1 $m^2$. Notably, the process of forming the body 111 may be conducted without the use of a mold or other production tool to form a plurality of individual and discrete portions of gel contained within openings of a production tool.

Furthermore, to facilitate processing and forming abrasive particles according to embodiments herein, the body 111, can have a particular viscosity, which can have any of the values noted above for the viscosity of the mixture 101.

The body 111 can have particular dimensions, including for example, a length (l), a width (w), and a height (h). In accordance with an embodiment, the body 111 may have a length that extends in the direction of the translating belt 109, which can be greater than the width, wherein the width of the body 111 is a dimension extending in a direction perpendicular to the length of the belt 109 and to the length of the sheet. The body 111 can have a height 181, wherein the length and width are greater than the height 181 of the body 111. As such, according to one embodiment, the length>width>height.

Notably, the height 181 of the body 111 can be the dimension extending vertically from the surface of the belt 109. In accordance with an embodiment, the body 111 can be formed to have a particular dimension of height 181, wherein the height may be an average height of the body 111 derived from multiple measurements. For example, the height 181 of the body 111 can be at least about 0.1 mm, such as at least about 0.5 mm. In other instances, the height 181 of the body 111 can be greater, such as at least about 0.8 mm, at least about 1 mm, at least about 1.2 mm, at least about 1.6 mm, or even at least about 2 mm. Still, in one non-limiting embodiment, the height 181 of the body 111 may be not greater than about 10 mm, not greater than about 5 mm, or even not greater than about 2 mm. It will be appreciated that the body 111 may have an average height within a range between any of the minimum and maximum values noted above.

After extruding the mixture 101 from the die 103, the body 111 may be translated in a direction 112 along the surface of the belt 109. Translation of the body 111 along the belt 109 may facilitate further processing. For example, after forming the body 111, the body 111 may be translated to a modification zone 120, wherein at least a portion of the body 111 is modified. The process of modifying the body 111 can include using one or more processes that can facilitate changing the stress generation within the body 111 during further processing. For example, the process of modifying the body 111 can include modifying portions of the body 111, such that upon further processing (e.g., drying), the portions of the body 111 associated with the modification can be regions of higher stress concentrations compared to those regions that are not modified, such that fracturing of the body may be more likely in the regions of higher stress concentrations, thus facilitating forming shaped precursor particles. For example, the process of modifying the body 111 may locally alter the stress generation in the body 111 during drying. In one embodiment, the process of modifying can include deforming at least a portion of the body 111. Modification of the body 111 may facilitate the formation of at least one crack initiation point in the body 111, such that during later processing (e.g., drying), the initial position of a crack or defect and the direction of crack propagation within the body 111 can be controlled. In one embodiment, the process of modifying the body 111 can include changing a physical feature of the body 111, such as an alteration of one or more surfaces and/or dimensions of the body 111.

In yet another embodiment, modifying at least portion of the body 111 can include changing a chemical composition of at least a portion of the body 111. In certain instances, modifying the body 111 can include changing a rheological property of the body 111. In certain instances, the process of modifying the body 111 can include applying or providing at least one additive to at least a portion of the body 111, such that the additive may chemically and/or physically alter the body 111. The additive may facilitate a change in the body that leads to regions of higher stress concentrations during further processing, which can facilitate controlled fracturing of the body 111. Such modifications may facilitate changing the stress within the body 111, such that of the body 111 includes regions of higher stress relative to other regions within the body 111 having a lower stress. The distribution of the regions of higher stress and lower stress may be controlled by controlling one or more parameters associated with the modification process, including but not limited to, the control of the distribution of features formed in the body, control of the distribution of one or more additives within the body, and the like. Notably, when the process of modifying the body 111 is combined with other processes (e.g., certain drying conditions) it may facilitate formation of abrasive particles having the features described herein.

The process of modification and drying may have one or more parameters that can be controlled and facilitate the formation of various types of abrasive particles. For example, certain parameters that may influence the characteristics of the finally-formed abrasive particles can include, but are not limited to, composition of the upper surface of the belt 109, the surface roughness of the upper surface of the belt 109, the distribution of features formed in the body 111 during modification, the shape, size and/or cross-sectional shape of the distribution of features formed in the body 111 during modification, the distribution and type of one or more additives used during modification, the rheological properties (e.g., viscosity, etc.) of the body 111, the size, shape, and composition of raw materials within the body 111, the height of the body 111, the depth of the features, drying temperature, relative humidity, drying rate, drying time, rate of translation through the drying environment, or any combination thereof.

Figure 2A:
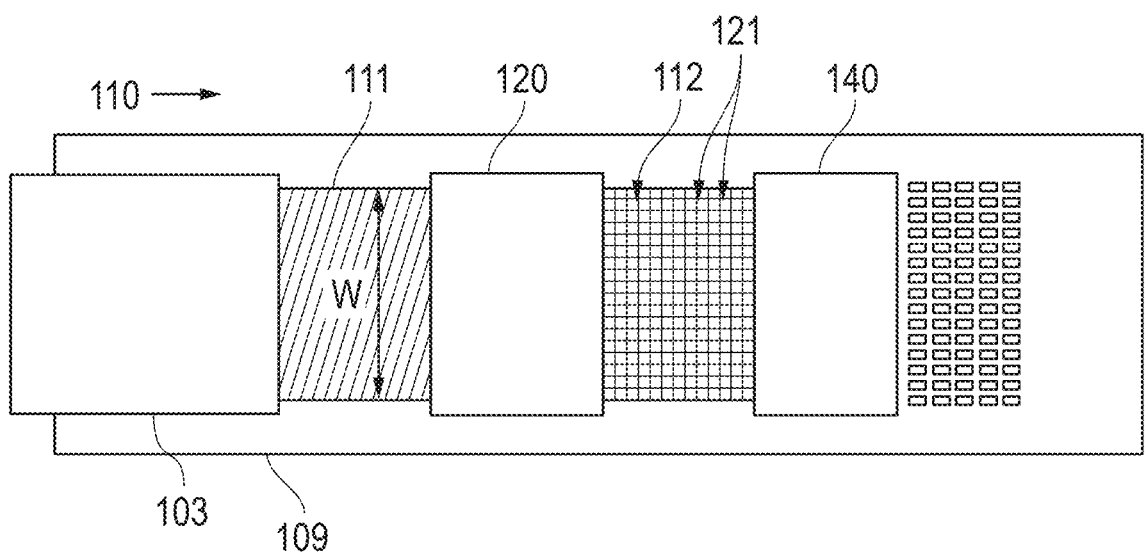
FIG. 2A includes a top-down view of the system for forming an abrasive particle according to an embodiment.

In one particular embodiment, the process of modifying can include forming a controlled distribution of features in at least a portion of the body. For example, as illustrated in FIG. 2A, which includes a top-down view of the system of FIG. 1, the upper surface 112 of the body 111 can be deformed such that a series of depressions 121 can be formed in the upper surface 112. As illustrated in FIGS. 1 and 2A, the depressions 121 can be in the form of lines extending along the width (w) and length of the body 111 and extending partially through the height 181 of the body 111. It will be appreciated that while the depressions 121 are illustrated as lines, other shapes and arrangements of the depressions 121 can be used, depending upon the desired aspects of the finally-formed abrasive particles. For example, the depressions 121 can be formed to have various shapes or contours, such as curved, straight, dots, and a combination thereof.

According to one embodiment, the controlled distribution of features can be defined as a pattern or array of features, having at least one repeating unit. In another embodiment, the controlled distribution of features can be a random distribution of features, such that there is no discernable short-range or long-range order to the arrangement of the features. Other examples of controlled distributions may include a radial pattern, a spiral pattern, a phyllotactic pattern, an asymmetric pattern, a self-avoiding random distribution, or any combination thereof.

The features of the controlled distribution may include a variety of shapes and/or structures. For example, the features may include at least one of a protrusion, a depression, an interconnected structure, a discrete and isolated structure, or any combination thereof. In at least one embodiment, the features can have various cross-sectional shapes, including for example, but not limited to, a U-shape, a V-shape, and the like. In certain instances, at least a portion of the body 111 can be formed to have a controlled distribution of features including an interconnected network of depressions, such as illustrated in FIGS. 1 and 2. In any of the embodiments, the features formed in the body 111 can be the same in shape and size with respect to each other. Still, in another embodiment, at least two features can be distinct from each other based on shape, size, contour, cross-sectional shape, and the like.

The size, shape and spacing of the features may be controlled and facilitate formation of precursor abrasive particles, and thus the finally-formed abrasive particles of a desired size. In one particular embodiment, the size, shape, and spacing between the features may facilitate formation of abrasive particles according to embodiments herein. The desired spacing between the features may influence the target average particle size of the abrasive particles to be formed. In at least one embodiment, the features may be formed to have sharp corners or a small radius of curvature, which may effectively concentrate the stress at the desired locations within the body 111 and further facilitate controlled cracking to generate the desired shape and size of abrasive particles, which can include those abrasive particles having the features of the embodiments herein.

For at least one aspect, the size of the features in the body 111 can be controlled to facilitate formation of abrasive particles according to embodiments herein. For example, the features can include at least one feature having a length (Lf), a width (Wf) and a depth (Df). In at least one embodiment, the length can be the longest dimension, the width can be the second longest dimension in the same plane as the length, and the depth can be the shortest dimension of the feature, which may be in direction perpendicular to the plane defined by the length and the width. Notably, in one embodiment Lf≥Wf≥Df. Still, in another embodiment, the body may have dimensions based on Lf≥Df≥Wf.

Figure 2B:
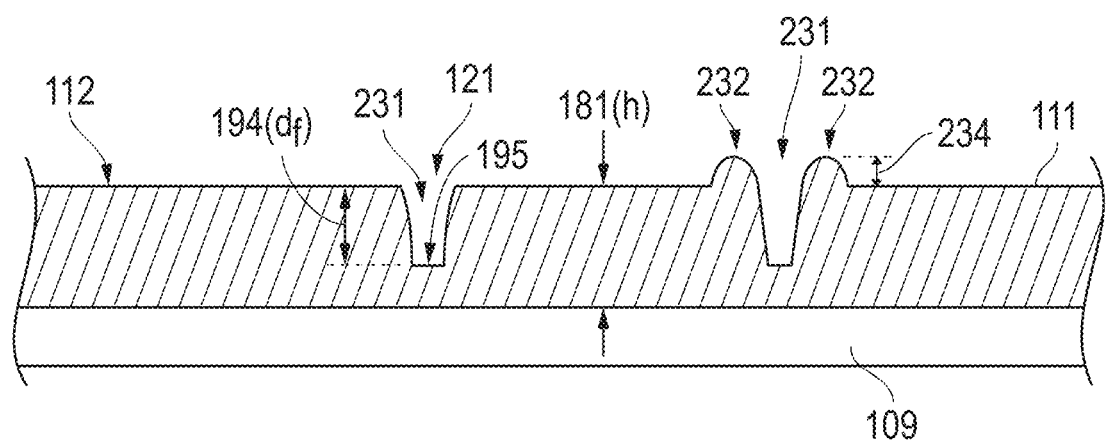
FIG. 2B includes a cross-sectional view of a portion of the body including features according to an embodiment.

According to at least one embodiment, a feature may be in the form of a depression formed within the body 111. FIG. 2B includes a cross-sectional illustration of a portion of the body 111 after forming features according to an embodiment. As illustrated, the features 121 can include depressions 231 formed within and extending into the volume of the body 111. The features 121 may also include protrusions 232 formed within the body 111, and defining regions extending above the upper surface 121 of the body 111. Notably, the depressions 231 can have an average depth 194 (df) defined as the average distance between a bottom surface 195 of the depression 231 and the upper surface 112 of the body 111. In at least one embodiment, the depressions 231 can be formed to have an average depth 194 that is at least 5% of the average height 181 of the body 111. In other instances, the average depth 194 can be greater, such as at least 10% of the average height 181 of the body 111 or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95%. Still, in one non-limiting embodiment, the average depth 194 can be not greater than 99% of the average height 181 of the body 111, such as not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5%. Still, it will be appreciated that the average depth 194 can be within a range including any of the minimum and maximum percentages noted above. Control of the average depth 194 of the depressions 231 may facilitate suitable processing and improved formation of abrasive particles having the feature of the embodiments herein. One or more of such features may be present within the finally-formed abrasive particles.

In yet another embodiment, the protrusions 232 can define regions of the body 111 extending above the upper surface 112 of the body 111. The protrusions 232 can have an average height 234 relative to the average height 181 of the body. For example, the protrusions 232 may have an average height that is at least 5% of the average height 181 of the body 111. In other instances, the average height 234 of the protrusions 232 can be greater, such as at least 10% of the average height 181 of the body 111 or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95%. Still, in one non-limiting embodiment, the average height 234 can be not greater than 99% of the average height 181 of the body 111, such as not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5%. It will be appreciated that the average height 234 can be within a range including any of the minimum and maximum percentages noted above. Control of the average height 234 of the protrusions 232 may facilitate suitable processing and improved formation of abrasive particles having the feature of the embodiments herein. One or more of such features may be present within the finally-formed abrasive particles.

The protrusions 232 may result from the modification process. In certain instances, when one or more depressions are formed the mixture of the body 111 is moved, and the protrusions 232 may result in areas around the depression 231. In other instances, the material of the body 111 may adhere to the form used to modify the surface of the body 111, and when the form is being pulled away from the body 111 some material of the body 111 may adhere to the form. Such adhesion between the form and the body 111 may cause the formation of protrusions. In certain instances, it may be desirable to limit the formation of protrusions due to adhesion between the form and the body during the modification process.

According to one embodiment, the process of modifying the body 111 can include modifying at least one surface of the body 111. As illustrated in FIG. 1, the features 121 can be formed in the upper surface 112 of the body 111. Various mechanisms may be used to form the features 121 in one or more surfaces of the body 111. For example, as illustrated in FIG. 1, a form 122 having a shaped features 124 can be translated in a direction 123 such that the shaped features 124 contact the upper surface 112 of the body 111 and deform the body 111 according to the shaped features 124. Some examples of such processes can include gravure rolling or embossing. Other suitable processes for deforming a surface of the body 111 may include pressing, punching, depositing, spraying, and the like.

In at least one embodiment, the features formed in at least a portion of the surface (e.g., the upper surface 112) of the body 111 can be created by contacting a form to the surface of the body 111 to be modified. The form can have one or more features (e.g., protrusions, walls, openings, etc.) that can be used to create corresponding features in the body 111. Referring briefly to FIG. 3, a top-down view illustration of a form is provided. As illustrated, in at least one embodiment, the form 300 can be a screen comprising portions 301 connected to each other and defining openings 302 between the portions. The form 300 can be pressed into the upper surface 112 of the body 111 and deform the body 111 in the regions contacted by the portions 301. Notably, the body 111 can be modified by the form 300, such that at least a portion of the upper surface 112 of the body 111 can be deformed to have features corresponding to the features of the form 300. In particular, the portions 301 can be pressed into the body 111 to form depressions, which can be arranged relative to each other in the same arrangement of the portions 301 of the form 300. Moreover, depending upon certain other processing parameters, the formation of the depressions 301 can simultaneously form protrusions, as the material from the depressions is pushed aside and displaced, which can result in the formation of protrusions on the upper surface 112 of the body 111. FIG. 3B includes a perspective view illustration of the form of FIG. 3A.

Figure 4E:
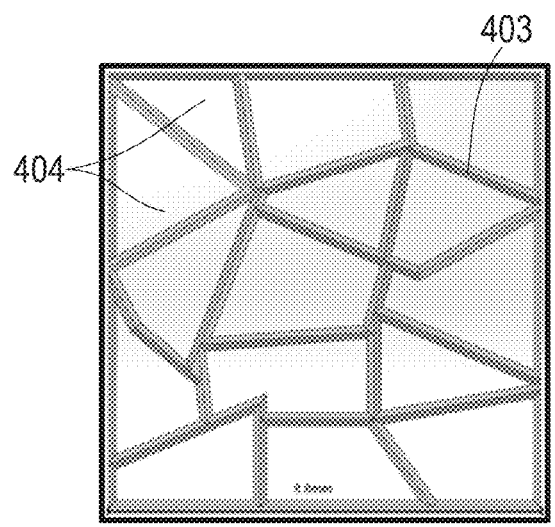
Figure 4E:
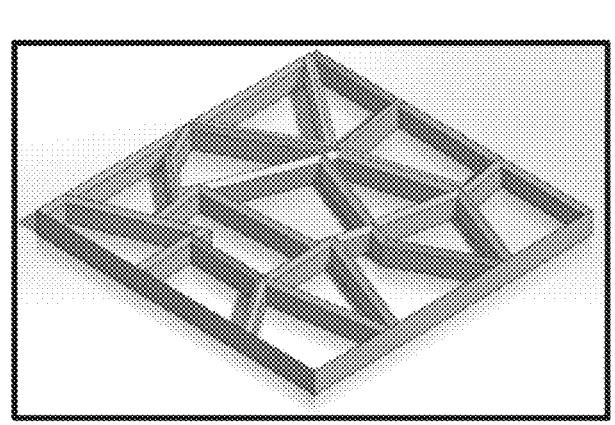
Figure 4E:
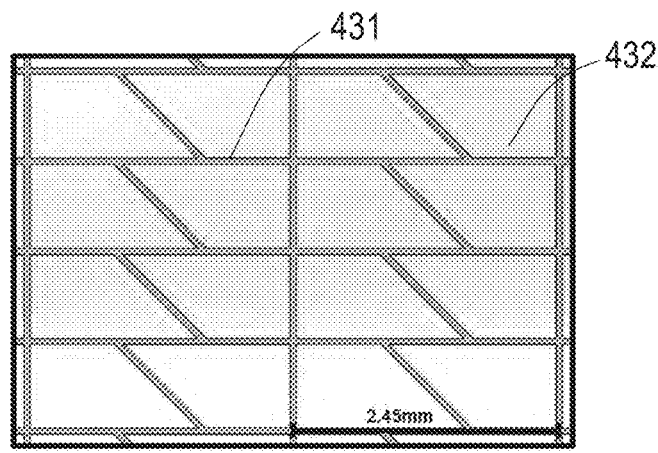

It will be appreciated that various other forms may be used with the process. The forms can generally have any combination of features. The shape, size, and arrangement of the features of the form may impact the size and shape of the abrasive particles formed. Moreover, the features of the form may influence the shape features present in the abrasive particles. Such shape features are described in embodiments herein. Certain forms may utilize a particular arrangement of projections or walls that are interconnected and define openings. FIGS. 3A, 3B, and 4A-4F include forms having interconnected protrusions or walls to define openings. For example, FIG. 4A includes a top down view illustration of a form according to an embodiment. FIG. 4B includes a perspective view illustration of the form for FIG. 4A. The form of FIG. 4A includes portions 401 in the form of walls that are connected to each other and define openings 402 having a generally quadrilateral, and more particularly, rectangular two-dimensional shape as viewed top-down.

FIG. 4C includes a top-down view illustration of a form according to an embodiment. FIG. 4D includes a perspective view illustration of the form of FIG. 4C. The form of FIG. 4C includes portions 403 in the form of walls that are connected to each other and define openings 404 having a generally irregular polygonal two-dimensional shape as viewed top-down.

Figure 4F:
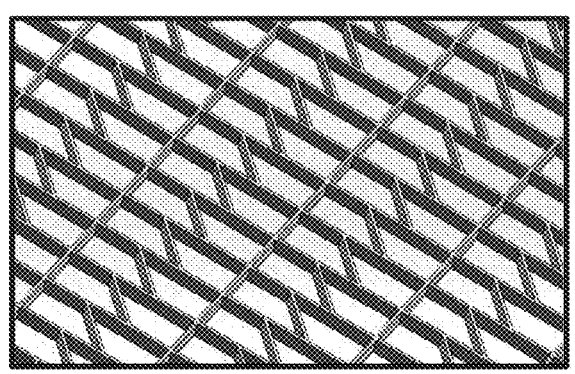
Figure 4G:
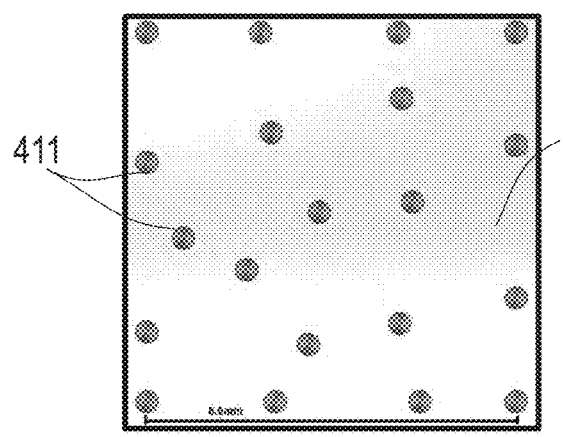
Figure 4H:
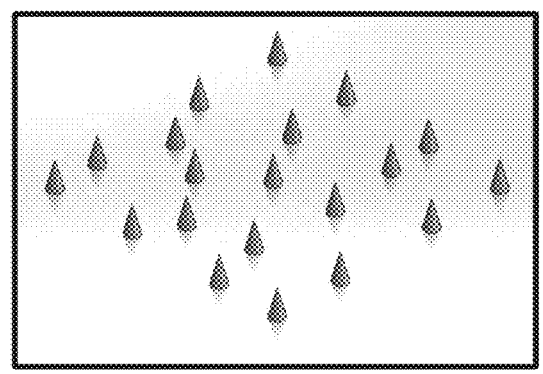

FIG. 4E includes a top-down view illustration of a form according to an embodiment. FIG. 4F includes a perspective view illustration of the form of FIG. 4E. As illustrated, the form can have portions 431, which are connected to each other and defining openings 432 between the portions 431. The openings 432 can have a quadrilateral shape, and more specifically a trapezoidal shape, and even more particularly, a right trapezoidal shape, wherein the shape of the openings 432 include at least two right angles (i.e., 90 degrees). It will be appreciated that the forms of the embodiments herein can include portions having any combination of shape, size, arrangement, contour and the like. The portions of the forms defining the openings can have a linear shape, arcuate shape, or any combination thereof. While the forms can include protrusions that are interconnected to define openings, other forms can be used that do not necessarily include protrusions that are interconnected. For example, the protrusions may include one or more discrete and separate features that can be separated from adjacent protrusions by gaps. FIGS. 4G-4H include illustrations of forms having protrusions that are not interconnected according to an embodiment.

FIG. 4G includes a top-down view illustration of another form according to an embodiment. FIG. 4H includes a perspective view illustration of the form of FIG. 4G. The form of FIG. 4G includes a plate 410 and a plurality of discrete projections or pins 411 extending from the plate 410. The pins 411 are spaced apart from each other and can be arranged in any distribution to create corresponding distribution of discrete and separate depressions in at least a portion of the body 111. The pins 411 are illustrated as having a generally conical shape. However, it will be appreciated that other shapes may be used, including for example, but not limited to, cylindrical, frustoconical, pyramidal, frustopyramidal, and the like.

While the forms of the embodiments herein have been illustrated as having generally planar shapes, it will be appreciated that the form can have various other shapes. For example, the forms can be in the shape of a roller that is configured to roll over the body 111 and impart features into the body 111. A form having such a shape may be suitable for continuous processing operations.

Figure 4I:
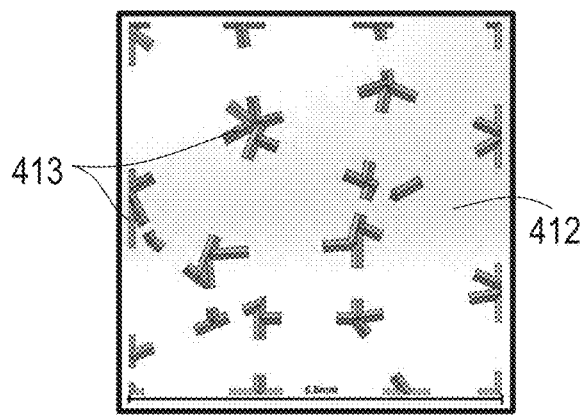
Figure 4J:
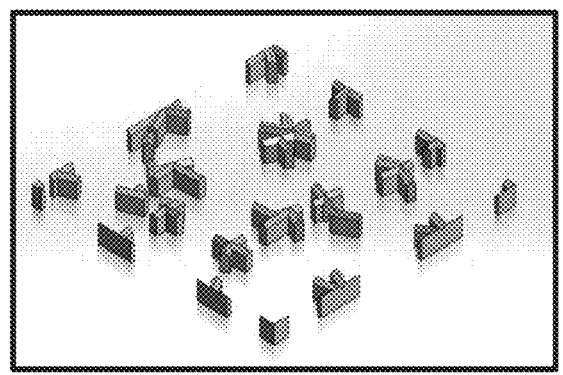

FIG. 4I includes a top-down view illustration of a form according to an embodiment. FIG. 4J includes a perspective view illustration of the form of FIG. 4I. The form of FIG. 4I includes a plate 412 and a random arrangement of protrusions 413 extending from the plate 412, which can be used to create corresponding depressions in at least a portion of the surface of the body prior to drying. The protrusions 413 have a random shape and a random spacing relative to other protrusions 413 on the plate 412.

Figure 4K:
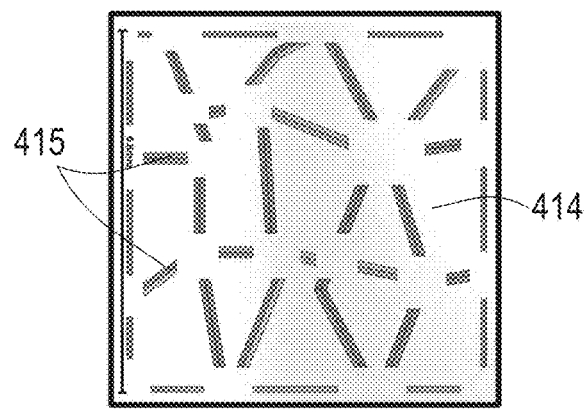
Figure 4L:
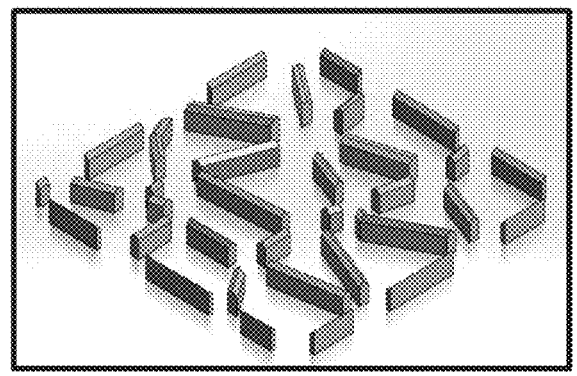

FIG. 4K includes a top-down view illustration of a form according to an embodiment. FIG. 4L includes a perspective view illustration of the form of FIG. 4K. The form of FIG. 4K includes a plate 414 and having a random arrangement of protrusions 415 extending from the plate 414, which can be used to create corresponding depressions in at least a portion of the surface of the body prior to drying. The form of FIG. 4K includes discrete protrusions 415 have a generally elongated and linear shape. The protrusions 415 have a generally random spacing and orientation relative to other protrusions 415 on the plate 414.

Moreover, as illustrated in FIGS. 4K and 4L, the upper surfaces of the protrusions 415 can have an edge extending between two chamfered surfaces. In other embodiments, the upper surface of the protrusions can be generally flat, such as illustrated in the protrusions 431 of FIG. 4E. It will be appreciated that the upper surfaces of the protrusions can be given any suitable shape to facilitate suitable modification of the body and formation of the desired abrasive particles. The upper surface may have a generally planar contour, an edge, a radiused or curved profile, or any other shape.

Any of the forms of the embodiments herein can be made of a particular material. For example, some suitable materials can include inorganic materials, organic materials, synthetic materials, natural materials, or any combination thereof. Some examples of inorganic materials can include metal, metal alloys, glass, ceramic, polycrystalline, monocrystalline, or any combination thereof. Some suitable organic materials can include polymers, such as epoxies, resins, thermosets, thermoplastics, polyimides, polyamides, or any combination thereof. The form may be a composite material including any combination of materials noted herein. The material of the form, particularly of the protrusions that will be in contact with the body, may be made of a particular material to limit the ability of the mixture to stick to the form. In certain instances, the material of the form is selected to ensure that the material of the body (i.e., the mixture) will not adhere to the material of the form, such that the features formed in the surface of the body can be made efficiently, with the proper shape and resolution. A form that limits the adhesion between the body and the form may limit unintended distortions in the body during modification, and may facilitate improved control of the shape and size of the abrasive particles formed from the controlled cracking processes.

In at least one embodiment, the surface of the form may be coated with a material prior to contacting the form to the body. Such coating materials may be permanent or temporary. The coating material can be an inorganic material, organic material, natural material, synthetic material or any combination thereof. For example, in one particular embodiment, the coating material can be an oil, such as a lubricant.

In yet another embodiment, the surface of the form, and particularly the protrusions to be contacting the portions of the body to cause the modification, may be coated with a chemical agent that will facilitate proper formation of the features in the body. The chemical agent may be a chemical element or chemical composition. The chemical agent may be an additive that can assist with modification of the body as described in embodiments herein, including for example a dopant. The chemical agent may be a permanent or temporary material added to the surface of the form. The chemical agent may be an inorganic material, organic material, natural material, synthetic material, or any combination thereof.

It will be appreciated that the features may be formed in other surfaces. For example, in an alternative embodiment, a surface of the belt 109 configured to contact the mixture 101 can be formed to have features. Accordingly, during deposition of the mixture 101 onto the belt 109, the body 111 can be formed and the features on the belt 109 can impart features into the surface of the body 111 in contact with the feature on the belt 109. As such, the process of forming the body and modifying the body are conducted substantially simultaneously. Such an alternative process may or may not be used with a separate modification zone 120 wherein other surfaces of the body 111 may be modified as described in the embodiments herein. For example, in one embodiment, the upper surface 112 of the body 111 and the lower surface of the body 111 in contact with the belt 109 may be modified according to any of the techniques described herein.

In at least one embodiment, the belt 109 can have an upper surface having a particular surface roughness. The upper surface of the belt is configured to contact the mixture 101 and the body 111. The belt 109 may not necessarily have any features, but may have a particular surface roughness that may facilitate later processing to form the abrasive particles. Notably, it has been observed that certain materials having a certain roughness may assist with drying and controlled cracking of the body 111 to facilitate formation of the abrasive particles according to embodiments herein. In at least one embodiment, forming the mixture 101 into the body 111 includes forming the mixture 101 on the belt, wherein the belt has a controlled surface roughness and surface energy relative to the mixture 101 to facilitate controlled cracking and formation of a plurality of precursor abrasive particles from the controlled cracking process.

As noted herein, in another embodiment, the processes of modifying the body 111 can include providing one or more additives to at least a portion of the body 111. Such additives may be used to physically or chemically alter the body 111, such that during later processing (e.g., drying) the additives may facilitate controlled cracking of the body to form precursor abrasive particles. The one or more additives can be applied to one or more surfaces of the body 111, including for example, any of the exterior surfaces of body 111. Some suitable processes for applying the one or more additives can include depositing, spraying, printing, blasting, scanning, ejecting, heating, and the like. The one or more additives may be added as solid particles, a liquid, a gas or a combination thereof. The one or more additives may be added as part of an additive composition, which may include the additives and other materials, such as a carrier fluid configured to contain the one or more additives for ease of processing and delivery of the additive to the body 111.

Some suitable additives can include rheology modifiers, dopants, pore formers, volatilization agents, and the like. Examples of dopants can include, but is not limited to, alkali elements, alkaline earth elements, rare-earth elements, hafnium (Hf), zirconium (Zr), niobium (Nb), tantalum (Ta), molybdenum (Mo), and a combination thereof. In particular instances, the dopant can include an element such as lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), chromium (Cr), cobalt (Co), iron (Fe), germanium (Ge), manganese (Mn), nickel (Ni), titanium (Ti), zinc (Zn), or any combination thereof. Some suitable examples of rheology modifiers can include organic materials, acids, bases, or any combination thereof. Certain additives, such as the dopants, may be added during various phases of processing. For example, the dopants may be added during the formation of the mixture. Alternatively, the dopant may be added to the precursor abrasive particles after some drying and/or some calcination of the precursor abrasive particles.

It will also be appreciated that the mixture may include seed material, such as alpha alumina seeds or iron oxide seeds, which may assist with the formation of a high temperature phase of material in the finally-formed and sintered abrasive particles.

Some suitable examples of pore formers can include hollow particles made of organic or inorganic materials, beads, spheres, glass, ceramics, glass-ceramics, natural materials, and the like. Some suitable inorganic materials can include oxides or carbon-containing materials, such as graphite, salts such as such as sodium chloride, potassium chloride, magnesium chloride, calcium chloride, sodium silicate, sodium carbonate, sodium sulfate, potassium sulfate, magnesium sulfate, or any combination thereof. In certain instances, the pore formers can include materials having low volatilization temperatures, such that upon further processing at suitable temperatures the pore formers volatilize forming a gas thereby leaving pores behind in the body 111. Some exemplary oxide-containing materials may include glasses, glass-ceramics, ceramics, and a combination thereof. Other exemplary organic pore formers can include wax, seeds, and shells, sulfosuccinates, naphthalenes, polyvinyls, ketones, polystyrenes, polyethylenes, polypropylenes, acrylics, benzene-containing polymers, alkyds, polyalkydes, epoxies, phenolics, acetals, and a combination thereof. Suitable inorganic pore formers can include hollow particles, such as beads, spheres, or the like made of materials such as glass, ceramics, glass-ceramics, or a combination thereof.

Some suitable volatilization agents can include organic materials, naturally occurring materials, or any combination thereof. Volatilization agents can be configured to volatilize at certain temperatures to form a gas phase. Such volatilization agents may be suitable for the creation of porosity within the body 111 during later processing, which can facilitate controlled cracking of the body and formation of abrasive particles having one or more features of the embodiments herein.

The one or more additives may also include the use of one or more precursor additives. A precursor additive is one or more elements or compounds that may undergo further processing to form an additive. The one or more precursor additives may be mixed to form one or more additives prior to providing the precursor to the body 111. In other instances, the one or more precursor additives may be provided to the body 111, and later processing may facilitate the formation of the additive within the body 111 (i.e., in-situ additive formation). For example, one or more precursor additives can be applied to at least a portion of the body 111, the body can undergo further processing (e.g., heating), which may facilitate the formation of one or more additives within the body from the one or more precursor additives.

In one embodiment, the additives can be selectively deposited on at least a portion of the body 111. For example, various techniques may be utilized to selectively deposit the one or more additives (or one or more precursor additives) to a portion of the body 111, such that affected portion of the body 111 can have treated areas and untreated areas. The treated areas are defined as areas where the one or more additives have been applied and the untreated areas are defined as areas of the body 111 where the one or more additives have not been applied. The creation of treated and untreated areas on the body may facilitate controlled cracking through later processing and the formation of abrasive particles having one or more features of the embodiments herein. It will be appreciated that the portions of the body 111 that may be affected can be any of the portions described in embodiments herein as being suitable for modification, including for example, any of the exterior surfaces of the body 111. The additives may be applied to the body such that the treated portions define a controlled distribution as described in the embodiments herein.

After modifying the at least one portion of the body 111, the body 111 may undergo further treatment to facilitate formation of the abrasive particles. As illustrated in FIGS. 1 and 2, the body 111 may be translated from the modification zone 120 to a drying zone 140. Within the drying zone 140, particular drying conditions can be used to facilitate controlled cracking of the body 111 and formation of precursor abrasive particles 141. In one embodiment, drying is conducted to induce cracking of the body and formation of a plurality of precursor abrasive particles. According to one embodiment, the drying process can include controlled cracking conditions configured to fracture the body into a plurality of precursor abrasive particles, wherein the controlled cracking conditions include controlled crack propagation from at least one crack initiation point.

The drying process may result in the formation of any one or more features of the abrasive particles according to embodiments herein, including such features, but not limited to, microridges, protrusions, depressions, and any combination thereof. According to one embodiment, drying the body can include forming microridges on at least a portion of a side surface of at least one of the abrasive particles. In another embodiment, drying the body can include forming microridges on at least a portion of a side surface of a majority of the abrasive particles. In still another embodiment, drying the body can include forming microridges on a majority of the side surface of a majority of the abrasive particles. For another embodiment, drying the body can include forming microridges on at least a portion of a side surface of each of the abrasive particles.

As noted herein, the process of modification may define at least one crack initiation point within the body 111, and the drying process may be conducted under certain process parameters to control the initiation of the crack and the direction of crack propagation within the body. The at least one crack initiation point may correspond to one or more features formed within the body 111, including for example, but not limited to, a protrusion, a depression, an interconnected structure, a discrete and isolated structure, or any combination thereof. In certain instances, the at least one crack initiation point can be abutting the one or more features. Moreover, drying may be conducted such that the crack propagation extends along the length of the one or more features, such that the one or more features substantially guides the direction of the crack for at least a portion of the length of the crack. As such, in certain instances, the cracking process results in the formation of precursor abrasive particles having a portion of the controlled distribution of features within the body, such as a major surface of the body on which the features were formed. It will be appreciated, that the process of modifying the body 111 may also include forming a plurality of crack initiation points, wherein each of the crack initiation points is associated with a feature formed in the body 111 or the provision of an additive within a particular region of the body 111.

According to one embodiment, the drying conditions may be coupled with certain parameters of the modification process to enable controlled cracking of the body 111 and formation of the desired abrasive particles. The process of drying may facilitate controlled cracking of the body 111, such that a crack is initiated and grows in the body, extending through the body 111, and separating the body into smaller pieces that form the precursor abrasive particles. The controlled cracking is a distinct process from conventional processes (e.g., molding, printing, crushing, mechanical sectioning and agitation or vibration), because during controlled cracking the body 111 is torn and fractured under conditions to yield precursor (i.e., green) abrasive particles of a targeted shape. In at least one embodiment, the process relies only on the processes of modifying and drying to alter the body 111 into the precursor abrasive particles. The process does not necessarily require the use of any production tools (e.g., screens or molds) to achieve the formation of the abrasive particles, and notably abrasive particles of a targeted size and shape. Such a process represents an efficient mechanism for creating abrasive particles with a high yield of targeted grains sizes and shapes. Moreover, the resulting abrasive particles are characterized by certain unique features (e.g., microridges on the side surface and/or protrusions and/or depressions, etc.) due to the forming process.

According to one embodiment, drying can include drying in an environment having a drying temperature of at least 20° C., such as at least 25° C. or at least 30° C. or at least 40° C. or at least 50° C. or at least 60° C. or at least 70° C. or at least 80° C. or at least 90° C. or at least 100° C. or at least 110° C. or at least 120° C. or at least 130° C. or at least 140° C. or at least 150° C. or at least 160° C. or at least 170° C. or at least 180° C. or at least 190° C. or at least 200° C. or at least 210° C. or at least 220° C. or at least 230° C. or at least 240° C. Still, in another non-limiting embodiment, drying can be conducted in an environment at a drying temperature of not greater than 250° C., such as not greater than 240° C. or not greater than 230° C. or not greater than 220° C. or not greater than 210° C. or not greater than 200° C. or not greater than 190° C. or not greater than 180° C. or not greater than 170° C. or not greater than 160° C. or not greater than 150° C. or not greater than 140° C. or not greater than 130° C. or not greater than 120° C. or not greater than 110° C. or not greater than 100° C. or not greater than 90° C. or not greater than 80° C. or not greater than 70° C. or not greater than 60° C. or not greater than 50° C. or not greater than 40° C. or not greater than 30° C. It will be appreciated that drying can be conducted in an environment at a drying temperature of within a range including any of the minimum and maximum temperatures noted above, including but not limited to, within a range of at least 20 C and not greater than 250, such as within a range including at least 50 C and not greater than 150 C. The temperatures noted above can be an average temperature calculated from a statistically relevant number of random positions within a drying environment.

In yet another embodiment, drying can include drying the body in an environment having a relative humidity of at least 10%, such as at least 20% or at least 30% or at least 40% or at least 50% or at least 60% or at least 70% or at least 80% Still, the relative humidity within the environment can be not greater than 90%, such as not greater than 80% or not greater than 70% or not greater than 60% or not greater than 50% or not greater than 40% or not greater than 30% or not greater than 20%. In at least one embodiment, the relative humidity within the environment can be within a range including any of the minimum and maximum percentages noted above, including for example, at least 10% and not greater than 70% or within a range of at least 10% and not greater than 70%. The relative humidity noted above can be an average relative humidity calculated from a statistically relevant number of random positions within a drying environment.

In yet another embodiment, drying can include controlling the flow rate of gases (e.g., air) within the drying environment. For example, according to one embodiment, the flow rate of the gas through the drying environment can be at least 0.1 m/s, such as at least 0.2 m/s or at least 0.5 m/s or at least 0.7 m/s or at least 1 m/s or at least 1.2 m/s or at least 1.5 m/s or at least 1.7 m/s or at least 2 m/s or at least 2.2 m/s or at least 2.5 m/s or at least 2.7 m/s or at least 3 m/s or at least 3.2 m/s or at least 3.5 m/s or at least 3.7 m/s or at least 4 m/s or at least 4.2 m/s or at least 4.5 m/s. Still, in at least one non-limiting embodiment, the flow rate of the gas (e.g., air, inert gas, oxidizing gas, reducing gas, or any combination thereof) can be not greater than 5 m/s or not greater than 4.7 m/s or not greater than 4.5 m/s or not greater than 4.2 m/s or not greater than 4 m/s or not greater than 3.7 m/s or not greater than 3.5 m/s or not greater than 3.2 m/s or not greater than 3 m/s or not greater than 2.7 m/s or not greater than 2.5 m/s or not greater than 2.2 m/s or not greater than 2 m/s or not greater than 1.7 m/s or not greater than 1.5 m/s or not greater than 1.2 m/s or not greater than 1 m/s or not greater than 0.7 m/s or not greater than 0.5 m/s. It will be appreciated that the flow rate of the gas or gases can be within a range including any of the minimum and maximum values noted above, including for example, within a range including at least 0.1 m/s and not greater than 5 m/s.

In yet another embodiment, the process of drying can include applying radiation to the body 111. The radiation may have a wavelength at least 0.1 microns or at least 0.5 microns or at least 1 micron or at least 2 microns or at least 3 microns or at least 5 microns or at least 10 microns or at least 20 microns or at least 50 microns or at least 100 microns or at least 200 microns or at least 500 microns or at least 700 micron or at least 1 mm. Still, in at least one non-limiting embodiment, the radiation can have a wavelength of not greater than 1 m, such as not greater than 0.8 m or not greater than 0.5 m or not greater than 0.1 m, or not greater than 1 cm or not greater than 1 mm or not greater than 500 microns or not greater than 100 microns or not greater than 10 microns. It will be appreciated that the radiation can have a wavelength within a range including any of the minimum and maximum values noted above. For example, in one embodiment the radiation can have a wavelength within a range of at least 0.1 microns to not greater than 1 mm. Still, in other embodiments, the radiation may have a wavelength within a range of at least 1 mm to not greater than 1 m.

In one embodiment, the process of drying to conduct controlled cracking of the body 111 and the formation of precursor abrasive particles may be conducted without the use of other processes, including but not limited to, mechanical devices (e.g., sectioning devices) intended to contact the body and separate the body into smaller pieces, ablation processes, vibratory processes, acoustic processes, and the like. In at least one embodiment, the process of forming the precursor abrasive particles from the body 111 is completed using only a drying process and controlling one or more drying conditions including the drying temperature, the relative humidity, drying rate, application of radiation, or any combination thereof. In at least one embodiment, the process of drying can include fracturing of the mixture to create a collection of abrasive particles. A collection of abrasive particles is described in more detail in the embodiments herein.

After forming the precursor abrasive particles 141, the precursor abrasive particles 141 may be translated through additional zones for further processing. Alternatively, the precursor abrasive particles 141 may be collected in a bin at the end of the belt 109 for further processing.

In accordance with an embodiment, the process of forming the abrasive particles may further comprise a calcining process, wherein the precursor abrasive particles are subject to a particular heating process to remove water and form calcined abrasive particles. In at least one embodiment, the calcining temperature used to calcine the precursor abrasive particles can be at least 600° C., such as at least 650° C. or at least 700° C. or at least 750° C. or at least 800° C. or at least 850° C. or at least 900° C. or at least 950° C. or at least 1000° C. or at least 1050° C. In still another non-limiting embodiment, the calcining temperature can be not greater than 1100° C. or not greater than 1050° C. or not greater than 1000° C. or not greater than 950° C. or not greater than 900° C. or not greater than 850° C. or not greater than 800° C. or not greater than 750° C. or not greater than 700° C. or not greater than 650° C. It will be appreciated that the calcining temperature can be within a range including any of the minimum and maximum values noted above, including for example, within a range including at least 600° C. and not greater than 1100° C.

After calcination, certain optional processes may be applied to the calcined abrasive particles. For example, an impregnation process may be used wherein one or more additives may be applied to the calcined abrasive particles. The additives can include any of the additives described in embodiments herein, including but not limited to, one or more dopants.

After conducting calcination, the calcined abrasive particles may be sintered to form abrasive particles. Sintering of the precursor abrasive particles 141 may be utilized to densify the particles. In a particular instance, the sintering process can facilitate the formation of a high-temperature phase of the ceramic material. For example, in one embodiment, the calcined abrasive particles may include alumina and sintering is conducted to form a high-temperature phase of alumina, such as alpha alumina. In at least one embodiment, sintering may be conducted at a sintering temperature within a range including at least 1100° C. to not greater than 2000° C. The duration of sintering at the sintering temperature may be within a range including at least 5 minutes to not greater than 10 hours.

Non-shaped abrasive particles are generally formed through different processes as disclosed herein and generally have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

The abrasive particles formed through embodiments herein can be controlled-height abrasive particles having controlled two-dimensional shapes as viewed top down in a plane of the length and width of the particle. Generally, the abrasive particles of the embodiments herein can have two or more surfaces, such as the first and second major surfaces that can be substantially parallel to each other and which may include features as disclosed in the embodiments herein. Notably, the arrangement of the first and second major surfaces extending parallel to each other and defining the length and width of the body generally give the particles a planar shape and a controlled height. The body of the abrasive particles may further include a side surface extending between the first and second major surfaces. The side surface can have various contours depending upon the processing conditions used to form the particles. Notably, as described herein, the process can be used to form a batch of abrasive particles, wherein the batch can include two or more different shapes of abrasive particles.

Figure 5:
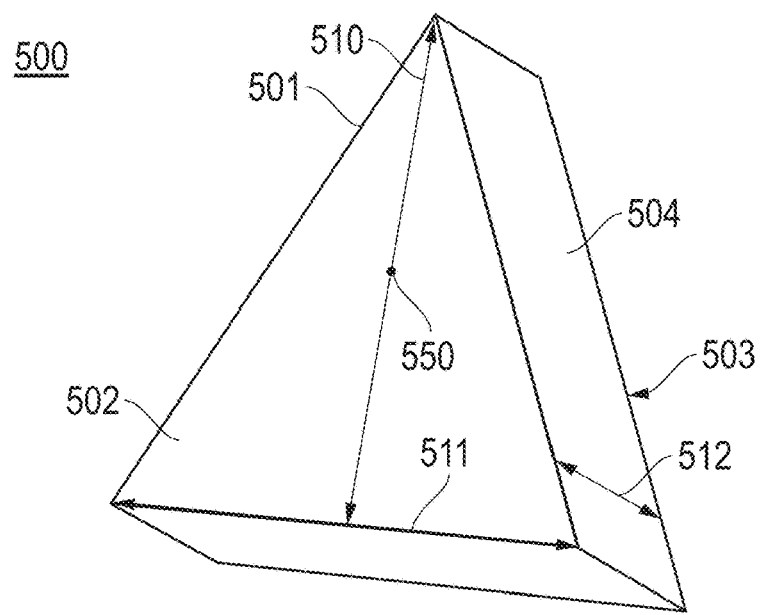
FIG. 5 includes a perspective view illustration of a shaped abrasive particle.

FIG. 5 includes a perspective view illustration of a shaped abrasive particle. Shaped abrasive particles are known to have been made through various prior art processes, including for example, molding, printing, and the like. The shaped abrasive particle 500 can include a body 501 including a major surface 502, a major surface 503, and a side surface 504 extending between the major surfaces 502 and 503. As illustrated in FIG. 5, the body 501 of the shaped abrasive particle 500 is a thin-shaped body, having a generally equilateral triangular shape, wherein the major surfaces 502 and 503 are larger than the side surface 504. Moreover, the body 501 can include an axis 510 extending from a point to a base and through the midpoint 550 on the major surface 502. The axis 510 can define the longest dimension of the major surface extending through the midpoint 550 of the major surface 502, which may be the length or width of the body depending on the geometry, but in the illustrated embodiment of FIG. 5 defines the width. The body 501 can further include an axis 511 defining a dimension of the body 501 extending generally perpendicular to the axis 510 on the same major surface 502, which in the illustrated embodiment of an equilateral triangle defines the length of the body 501. Finally, as illustrated, the body 501 can include a vertical axis 512, which in the context of thin shaped bodies can define a height (or thickness) of the body 501. For thin-shaped bodies, the length of the axis 510 is equal to or greater than the vertical axis 512. As illustrated, the height 512 can extend along the side surface 504 between the major surfaces 502 and 503 and perpendicular to the plane defined by the axes 510 and 511. Shaped abrasive particles are generally formed to remove irregularities from the shape, such that each of the shaped abrasive particles within a batch has generally the same size and shape with respect to each other.

FIG. 5 includes an illustration of a shaped abrasive particle having a two-dimensional shape as defined by the plane of the upper major surface 502 or major surface 503, which has a generally triangular two-dimensional shape, such as an equilateral triangle.

Figure 6:
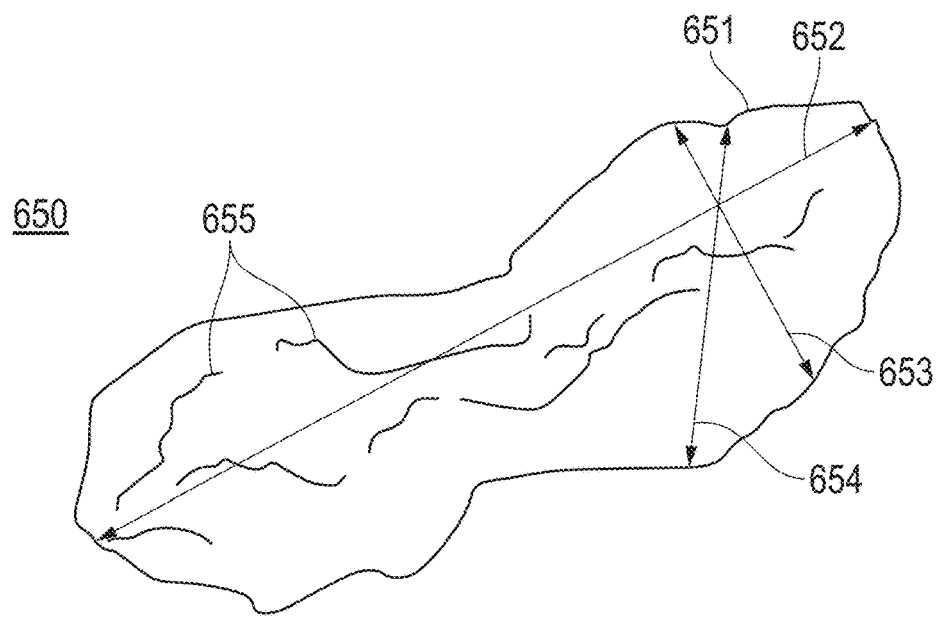
FIG. 6 includes a perspective view illustration of a randomly shaped abrasive particle.

FIG. 6 includes an illustration of an elongated particle, which is a non-shaped abrasive particle. The elongated abrasive particle can be a non-shaped abrasive particle having a body 651 and a longitudinal axis 652 defining the longest dimension of the particle, a lateral axis 653 extending perpendicular to the longitudinal axis 652 and defining a width of the particle. Furthermore, the elongated abrasive particle may have a height (or thickness) as defined by the vertical axis 654, which can extend generally perpendicular to a plane defined by the combination of the longitudinal axis 652 and lateral axis 653. As further illustrated, the body 651 of the elongated, non-shaped abrasive particle can have a generally random arrangement of edges 655 extending along and defining the exterior surface of the body 651. Moreover, the non-shaped abrasive particle does not have a readily identifiable arrangement of surfaces or surfaces having a readily identifiable shape and/or arrangement relative to each other.

As will be appreciated, the elongated abrasive particle can have a length defined by the longitudinal axis 652, a width defined by the lateral axis 653, and a vertical axis 654 defining a height. As will be appreciated, the body 651 can have a primary aspect ratio of length:width such that the length is greater than the width. Furthermore, the length of the body 651 can be greater than or equal to the height. Moreover, the width of the body 651 can be greater than or equal to the height 654.

Figure 7A:
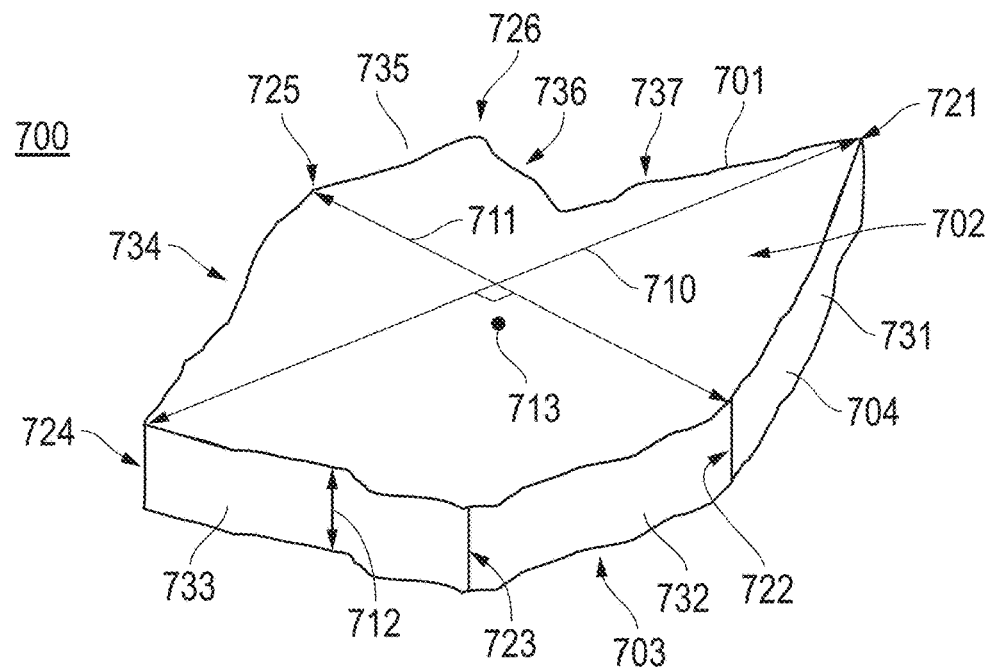
FIG. 7A includes a perspective view illustration of a controlled height abrasive particle according to an embodiment.

FIG. 7A includes a perspective view illustration of a controlled height abrasive particle according to an embodiment (CHAP). As illustrated, the CHAP 700 can include a body 701 including a first major surface 702, a second major surface 703, and a side surface 704 extending between the first and second major surfaces 702 and 703. As illustrated in FIG. 7A, the body 701 can have a thin, relatively planar shape, wherein the first and second major surfaces 702 and 703 are larger than the side surface 704 and substantially parallel to each other. Moreover, the body 701 can include an axis 710, which is the longest dimension on the first major surface 710 and defines the length. The body 701 can further include an axis 711 defining a second longest dimension of the body 701 on the first major surface 702, which extends perpendicular to the axis 710 and defines the width of the body 701. Finally, as illustrated, the body 701 can include a vertical axis 712, which can define a height (or thickness) of the body 701. For thin-shaped bodies, the length of the axis 710 can be equal to or greater than the vertical axis 712. As illustrated, the height defined by the vertical axis 712 can extend along the side surface 704 between the first and second major surfaces 702 and 703 in a direction generally perpendicular to the plane defined by the axes 710 and 711. It will be appreciated that reference herein to length, width, and height of the abrasive particles may be referenced to average values taken from a suitable sampling size of abrasive particles of a batch of abrasive particles. The body can further include a midpoint 713 on the first major surface 102 of the body, which generally defines the point within the center of the first major surface 702.

As further illustrated in FIG. 7A, the body 701 can have a side surface 704 having a generally recognizable irregular polygonal (heptagon) two-dimensional shape as viewed in the plane of the first or second major surfaces 702 or 703. An irregular polygonal shape is one in which all sides are not of equal length to each other. Notably, the body 701 has six external corners 721, 722, 723, 724, 725, and 726 (721-726). The external corners 721-726 are portions that would cause significant deflection of an imaginary rubber band around the side surface 704 of the body 701 by at least 10 degrees or greater. Notably, while the body 701 has readily identifiable external corners 721-726 and seven side surface portions 731, 732, 733, 734, 735, 736, and 737 (731-737) extending between the external corners 721-726, the side surface portions 731-737 can have a substantial waviness within the contours, such that the side surface portions 731-737 are not completely planar. Moreover, the edges joining the side surface portions 731-737 to the first and second major surfaces 702 and 703 can have some irregular contours.

It will be appreciated that the CHAP are not so limited and can include other two-dimensional shapes. For example, the abrasive particles of the embodiments herein can include particles having a body with a two-dimensional shape as defined by a major surface of the body from the group of shapes including polygons, irregular polygons, irregular polygons including arcuate or curved sides or portions of sides, complex shapes having a combination of polygons shapes, star shapes, shapes with arms extending from a central region (e.g., cross-shaped bodies) and a combination thereof. The processes disclosed herein can be used to form shaped abrasive particles having the features described herein.

Figure 7B:
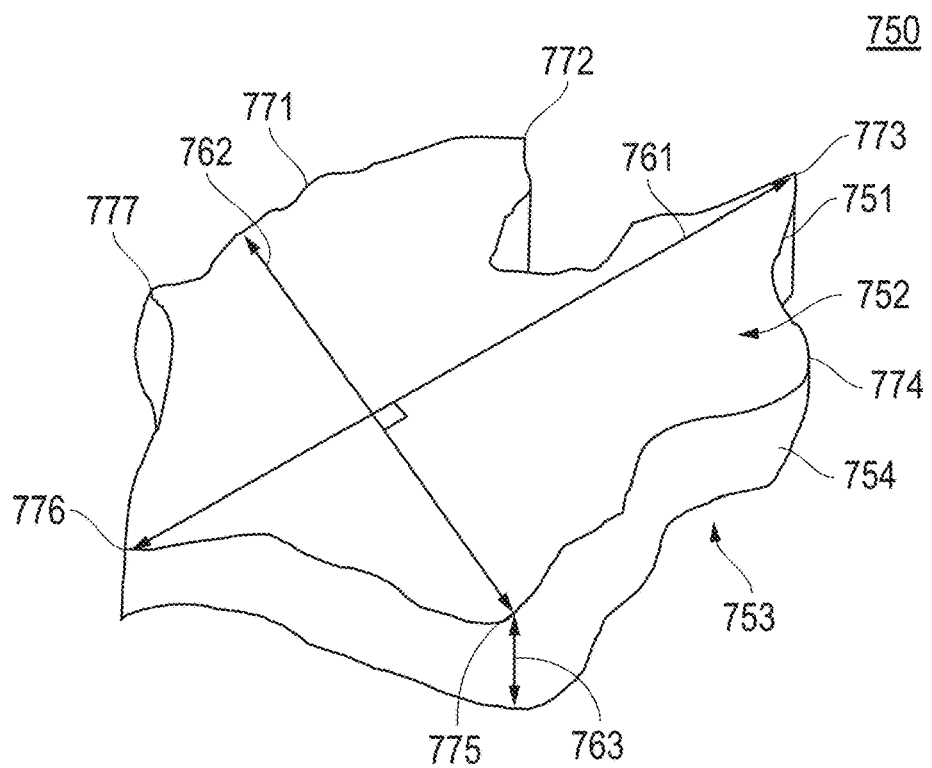
FIG. 7B includes a perspective view illustration of a controlled height abrasive particle according to an embodiment.

FIG. 7B includes a perspective view illustration of another abrasive particle according to an embodiment. Notably, the abrasive particle 750 has is a controlled height abrasive particle (CHAP) having a body 751 including a first major surface 752, a second major surface 753, and a side surface 754 extending between the first and second major surfaces 752 and 753. As illustrated in FIG. 7B, the body 751 can have a thin, relatively planar shape, wherein the first and second major surfaces 752 and 753 are larger than the side surface 754 and substantially parallel to each other. Moreover, the body 751 can include an axis 761, which is the longest dimension on the first major surface 752 and defines the length of the body 751. The body 751 can further include an axis 762 defining a second longest dimension of the body 701 on the first major surface 702, which extends perpendicular to the axis 761 and defines the width of the body 751. Finally, as illustrated, the body 751 can include a vertical axis 763, which can define a height (or thickness) of the body 701. For thin-shaped bodies, the length of the axis 761 can be equal to or greater than the vertical axis 763. As illustrated, the height defined by the vertical axis 763 can extend along the side surface 754 between the first and second major surfaces 752 and 753 in a direction generally perpendicular to the plane defined by the axes 761 and 762. It will be appreciated that reference herein to length, width, and height of the abrasive particles may be referenced to average values taken from a suitable sampling size of abrasive particles of a batch of abrasive particles.

As further illustrated, the body 751 of the abrasive particle 750 can have a side surface 754 having an irregular two-dimensional shape as viewed in the plane of the first or second major surfaces 752 or 753. An irregular two-dimensional shape is one in which the shape does not have a recognizable shape, such as a polygonal shape. The irregular two-dimensional shape is characterized by a side surface 754 that can have a random or unpredictable contour. Such an abrasive particle can be formed according to the processes of the embodiments herein. The body 751 can have seven external corners 771, 772, 773, 774, 775, 776, and 777 (771-777). The external corners 771-777 are portions that would cause significant deflection of an imaginary rubber band around the side surface 754 of the body 751 by at least 10 degrees or greater.

Figure 7C:
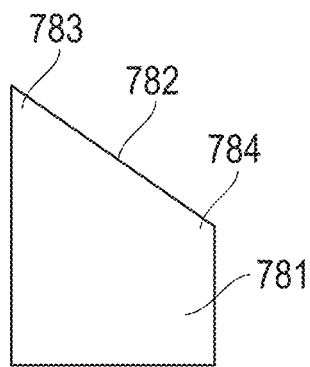
FIG. 7C includes a top-down view illustration of an abrasive particle according to an embodiment.
Figure 7D:
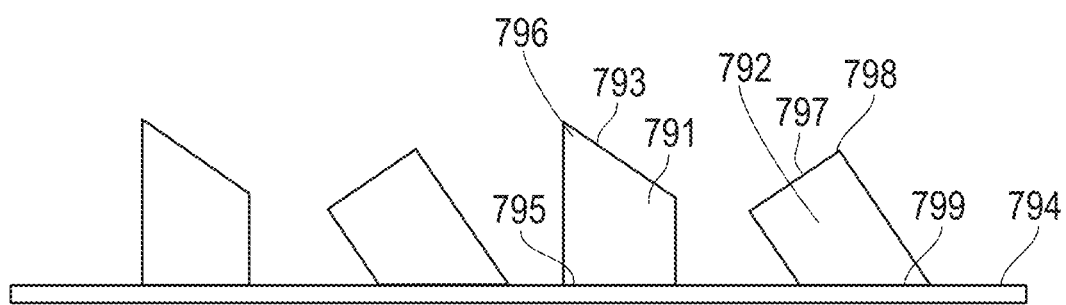
FIG. 7D includes a side view illustration of a portion of a coated abrasive according to an embodiment.

FIG. 7C includes a top-down view illustration of an abrasive particle according to an embodiment. FIG. 7D includes a side view illustration of a portion of a coated abrasive according to an embodiment. As illustrated, the body 781 of the abrasive particle can have a polygonal two-dimensional shape as viewed top down. The body 781 can have a quadrilateral two-dimensional shape, and more specifically, a right trapezoid two-dimensional shape. The shape of the body 781 includes a side surface portion 782 that is angled to the adjoining side surface portions to create an acute angle 783 and obtuse angle 784 between the side surface portion 782 and abutting side surface portions. As illustrated in FIG. 7D, the shape of the particles 791 and 792 may be advantageous in the context of coated abrasives, since there are multiple orientations of the particles 791 and 792 where a point of the particles is pointing away from the backing 794. For example, in the orientation of the abrasive particle 791, the tilted surface 793 of the abrasive particle 791 is furthest from the backing 794 and the base surface 795 is closest to the backing 794. Thus the point 796 is furthest from the backing 794 and presents a suitable point on the abrasive particle 796 to initiate material removal operations. Regarding the orientation of the abrasive particle 792, the tilted surface 799 of the abrasive particle 792 is closest to the backing 794 and the base surface 797 is furthest from the backing 794. Thus the point 798 is furthest from the backing 794 and presents a suitable point on the abrasive particle 792 to initiate material removal operations.

According to any of the abrasive particles of the embodiments herein, the body of the abrasive particle can have a primary aspect ratio of length:width that can be at least 1.1:1, such as at least 1.2:1 or at least 1.5:1 or at least 1.8:1 or at least 2:1 or at least 3:1 or at least 4:1 or at least 5:1 or at least 6:1 or even at least 10:1. In another non-limiting embodiment, the body can have a primary aspect ratio of length:width of not greater than 100:1, such as not greater than 50:1 or not greater than 10:1 or not greater than 6:1 or not greater than 5:1 or not greater than 4:1 or not greater than 3:1 or even not greater than 2:1. It will be appreciated that the primary aspect ratio of the body can be with a range including any of the minimum and maximum ratios noted above.

Furthermore, the body of any of the shaped abrasive particles of the embodiments herein can have a secondary aspect ratio of width:height that can be at least 1.1:1, such as at least 1.2:1 or at least 1.5:1 or at least 1.8:1 or at least 2:1 or at least 3:1 or at least 4:1 or at least 5:1 or at least 8:1 or even at least 10:1. Still, in another non-limiting embodiment, the secondary aspect ratio width:height can be not greater than 100:1, such as not greater than 50:1 or not greater than 10:1 or not greater than 8:1 or not greater than 6:1 or not greater than 5:1 or not greater than 4:1 or not greater than 3:1 or even not greater than 2:1. It will be appreciated the secondary aspect ratio of width:height can be with a range including any of the minimum and maximum ratios of above.

In another embodiment, the body of any of the abrasive particles can have a tertiary aspect ratio of length:height that can be at least 1.1:1, such as at least 1.2:1 or at least 1.5:1 or at least 1.8:1 or at least 2:1 or at least 3:1 or at least 4:1 or at least 5:1 or at least 8:1 or even at least 10:1. Still, in another non-limiting embodiment, the tertiary aspect ratio length:height can be not greater than 100:1, such as not greater than 50:1 or not greater than 10:1 or not greater than 8:1 or not greater than 6:1 or not greater than 5:1 or not greater than 4:1 or not greater than 3:1. It will be appreciated that the tertiary aspect ratio can be with a range including any of the minimum and maximum ratios and above.

The abrasive particles of the embodiments herein can have a body including a crystalline material, and more particularly, a polycrystalline material. Notably, the polycrystalline material can include abrasive grains. In one embodiment, the body of the abrasive particle can be essentially free of an organic material, including for example, a binder. In at least one embodiment, the abrasive particles can consist essentially of a polycrystalline material.

The abrasive grains (i.e., crystallites) contained within the body of the abrasive particles may have an average grain size that is generally not greater than 20 microns, such as not greater than 18 microns or not greater than 16 microns or not greater than 14 microns or not greater than 12 microns or not greater than 10 microns or not greater than 8 micron or not greater than 5 microns or not greater than 2 microns or not greater than 1 micron or not greater than 0.9 microns or not greater than 0.8 microns or not greater than 0.7 microns or even not greater than 0.6 microns. Still, the average grain size of the abrasive grains contained within the body of the abrasive particles can be at least 0.01 microns, such as at least 0.05 microns or at least 0.06 microns or at least 0.07 microns or at least 0.08 microns or at least 0.09 microns or at least 0.1 microns or at least 0.12 microns or at least 0.15 microns or at least 0.17 microns or at least 0.2 microns or even at least 0.5 microns. It will be appreciated that the abrasive grains can have an average grain size within a range including any of the minimum and maximum values noted above.

In accordance with an embodiment, the body of the abrasive particle can have an average particle size, as measured by the largest dimension measurable on the body (i.e., the length), of at least 100 microns. In fact, the body of the abrasive particle can have an average particle size of at least 150 microns, such as at least 200 microns or at least 300 microns or at least 400 microns or at least 500 microns or at least 500 microns or at least 600 microns or at least 800 microns or even at least 900 microns. Still, the body of the abrasive particle can have an average particle size that is not greater than 5 mm, such as not greater than 3 mm or not greater than 2 mm or even not greater than 1.5 mm. It will be appreciated that the body of the abrasive particle can have an average particle size within a range including any of the minimum and maximum values noted above.

In yet another embodiment, the particulate material can have a body having an average particle size, which may be selected from a group of predetermined sieve sizes. For example, the body can have an average particle size of not greater than about 5 mm, such as not greater than about 3 mm, not greater than about 2 mm, not greater than about 1 mm, or even not greater than about 0.8 mm. Still, in another embodiment, the body may have an average particle size of at least about 0.1 microns or at least 1 micron or at least 0.1 mm or at least 0.5 mm. It will be appreciated that the body may have an average particle size within a range between any of the minimum and maximum values noted above.

Particles for use in the abrasives industry are generally graded to a given particle size distribution before use. Such distributions typically have a range of particle sizes, from coarse particles to fine particles. In the abrasive art, this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, PI 80, P220, P320, P400, P500, P600, P800, P1000, and P1000. JIS grade designations include JIS8, JIS12, JIS 16, JIS24, JIS36, JIS46, JIS54, JIS60, JIS80, JIS 100, JIS150, JIS180, JIS220, JIS240, JIS280, JIS320, JIS360, JIS400, JIS600, JIS800, JIS 1000, JIS 1500, JIS2500, JIS4000, JIS6000, JIS8000, and JIS10,000. Alternatively, the abrasive particles can graded to a nominal screened grade using U.S.A. Standard Test Sieves conforming to ASTM E-1 1 "Standard Specification for Wire Cloth and Sieves for Testing Purposes." ASTM E-1 1 prescribes the requirements for the design and construction of testing sieves using a medium of woven wire cloth mounted in a frame for the classification of materials according to a designated particle size. A typical designation may be represented as −18+20 meaning that the particles pass through a test sieve meeting ASTM E-1 1 specifications for the number 18 sieve and are retained on a test sieve meeting ASTM E-1 1 specifications for the number 20 sieve. In various embodiments, the particulate material can have a nominal screened grade comprising: −18+20, −20/+25, −25+30, −30+35, −35+40, −40+45, −45+50, −50+60, −60+ 70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100. The body of the particulate material may be in the form of a shaped abrasive particle, as described in more detail herein.

Some suitable materials for use in the body of the abrasive particle can include of nitrides, oxides, carbides, borides, oxynitrides, oxyborides, oxycarbides, carbon-based materials, diamond, naturally occurring minerals, rare-earth-containing materials, natural minerals, synthetic materials, or any combination thereof. In particular instances, the abrasive particles can include an oxide compound or complex, such as aluminum oxide, zirconium oxide, titanium oxide, yttrium oxide, chromium oxide, strontium oxide, silicon oxide, magnesium oxide, rare-earth oxides, or any combination thereof. In one particular embodiment, the body can include at least 95 wt % alumina for the total weight of the body. In at least one embodiment, the body can consist essentially of alumina. Still, in certain instances, the body can include not greater than 99.5 wt % alumina for the total weight of the body. In accordance with an embodiment, the body may consist essentially of alpha alumina. In certain instances, the body may be formed such that it includes not greater than about 1 wt % of any low-temperature alumina phases. As used herein, low temperature alumina phases can include transition phase aluminas, bauxites or hydrated alumina, including for example gibbsite, boehmite, diaspore, and mixtures containing such compounds and minerals. Certain low temperature alumina materials may also include some content of iron oxide. Moreover, low temperature alumina phases may include other minerals, such as goethite, hematite, kaolinite, and anastase.

Moreover, in particular instances, the body of the abrasive particles can be formed from a seeded sol-gel. In at least one embodiment, the body of any of the abrasive particles of the embodiments herein may be essentially free of iron, rare-earth oxides, and a combination thereof. Reference herein to a body having a certain features (e.g., composition) will also be understood to refer to a batch of abrasive particles that can have the same feature (e.g., composition).

In accordance with certain embodiments, certain abrasive particles can be compositional composites, such that at least two different types of grains are contained within the body of the abrasive particle. It will be appreciated that different types of grains are grains having different compositions with regard to each other. For example, the body of the abrasive particle can be formed such that it includes at least two different types of grains, wherein the types of grains are selected from the group of nitrides, oxides, carbides, borides, oxynitrides, oxyborides, oxycarbides, carbon-based materials, diamond, naturally occurring minerals, rare-earth-containing materials, natural minerals, synthetic materials, and a combination thereof.

The body of the abrasive particles may include additives, such as dopants, which may be in the form of elements or compounds (e.g., oxides). Certain suitable additives can include any of the materials described herein. The body of an abrasive article may include a specific content of one or more additives (e.g., dopant). For example, the body may include not greater than about 30 wt % additives for the total weight of the body. In still other embodiments, the amount of additives may be less, such as not greater than about 25 wt % or not greater than about 20 wt % or not greater than about 18 wt % or not greater than about 15 wt % or not greater than about 12 wt % or not greater than about 10 wt % or not greater than about 8 wt % or not greater than 5 wt % or not greater than 2 wt %. Still, the amount of additives can be at least about 0.5 wt % for a total weight of the body, such as at least about 1 wt %, at least about 2 wt % or at least about 3 wt % or at least about 4 wt % or at least about 5 wt % or at least about 8 wt % or even at least about 10 wt %. It will be appreciated that the amount of additive within the body may be within a range including any of the minimum and maximum percentages noted above.

The body of the abrasive particle may be particularly dense. For example, the body may have a density of at least about 95% theoretical density, such as at least about 96% or even at least about 97% theoretical density.

Figure 8A:
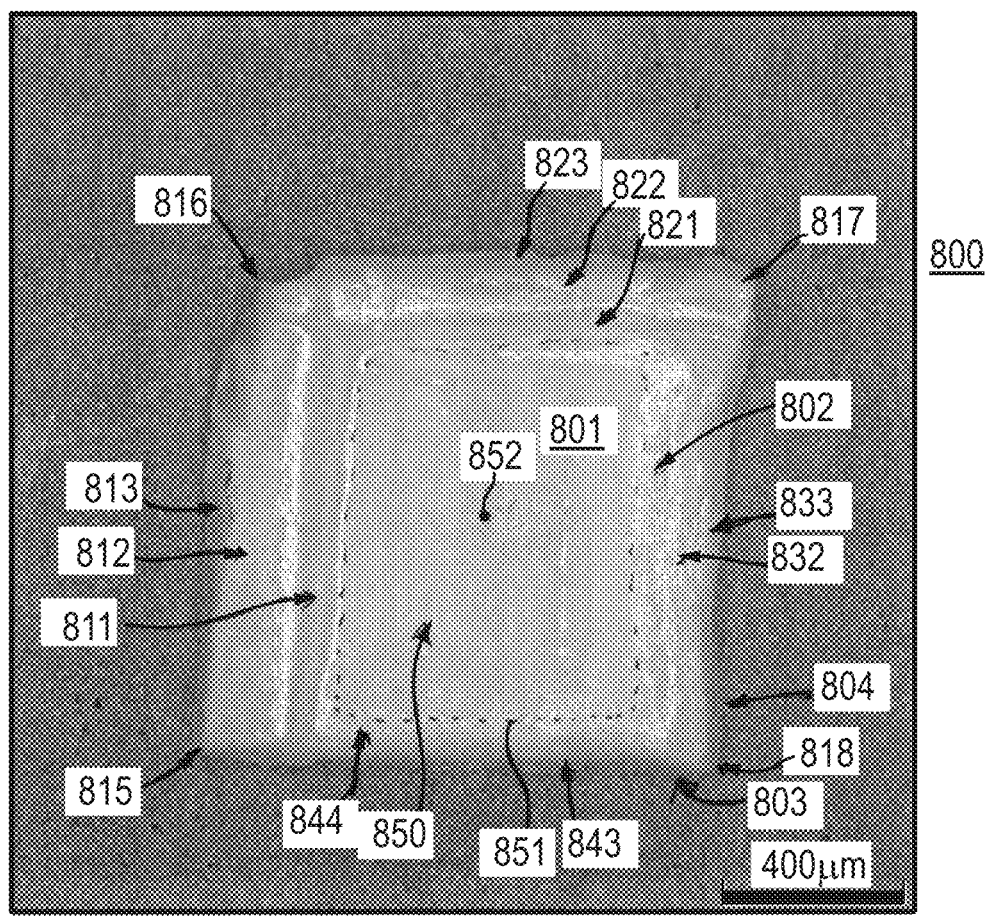
FIG. 8A includes an image of an abrasive particle according to an embodiment.

FIG. 8A includes a top-down image of an abrasive particle according to an embodiment. As illustrated, the abrasive particle 800 includes a body 801 including a first major surface 802, a second major surface 803, and a side surface 804 extending between the first and second major surfaces 802 and 803. As illustrated in FIG. 8A, the body 801 can have a thin, relatively planar shape, wherein the first and second major surfaces 802 and 803 are larger than the side surface 804. The body 801 may have a substantially quadrilateral two-dimensional shape as viewed top-down in the plane of the first major surface 802.

The body 801 can have a side surface 804 that can include multiple side surface portions that are separated from each other by exterior corners of the body. The first side surface portion 813 can define a fraction of the side surface 804 that can be disposed between a first external corner 815 and a second external corner 816. As illustrated and according to an embodiment, the first side surface portion 813 can be a fraction of the total length of the side surface 804 defining the perimeter of the body 801.

According to one embodiment, the body 801 can include a plurality of side surface portions, wherein each of the side surface portions extend for a length of at least 5% of a total length of the body, such as at least 10% or at least 15% or at least 20% or at least 25%. In another non-limiting embodiment, each of the side surface portions can extend for a length of not greater than 80% of a length of the body, such as not greater than 70% or not greater than 60% or not greater than 50% or not greater than 40% or not greater than 30%. It will be appreciated that the length of the side surface portions can be within a range including any of the minimum and maximum percentages noted above.

As further illustrated in FIG. 8A, the body 801 can include one or more features arranged on the first major surface 802 relative to one or more side surface portions of the side surface 804. As further illustrated and according to one embodiment, the first major surface 802 can further include a first side surface region 812 disposed between the first side surface portion 813 and a first protrusion 811. The first protrusion 811 can be abutting the first side surface region 812 and the first side surface portion 813. The first protrusion 811 can extend along the first side surface portion 813 and the first sides surface region 812. As illustrated, the first protrusion 811 can define a raised portion in the upper surface extending vertically above the height of the first major surface 802, the first side surface region 812, and/or an untextured region 850 extending through a central region 851 of the body 801. The first protrusion 811 may be formed during the modification process. For example, the first protrusion 811 can be a protrusion that can be a result of moving of the mixture to form a nearby depression during the modification process. Alternatively, the first protrusion 811 can be result due to adhesion between the form and the mixture forming the body, such that upon removal of the form from the body, a portion of the body adheres to the form and is pulled upward to create the first protrusion 811.

In at least one embodiment, the first protrusion 811 can extend for a fraction of the total length of the side surface 804 defining the perimeter of the body 801. In one particular embodiment, the first protrusion 811 can extend for at least 30% of the total length of the first side surface portion 813, which is measured as the distance between the first external corner 815 and the second external corner 816. In another embodiment, the first protrusion 811 can extend for at least 40% of the total length of the first side surface portion 813 or at least 50% or at least 60% or at least 70% or at least 80% or even at least 90% of the total length of the first side surface portion 813. In one particular embodiment, the first protrusion 811 can extend parallel to each other for the entire length of the first side surface portion 813. Still, in another non-limiting embodiment, the first protrusion 811 can extend for not greater than 99% of the total length of the first side surface portion 813, such as not greater than 95% or not greater than 90% or not greater than 80% or not greater than 70% or not greater than 60% or not greater than 50% or not greater than 40% or not greater than 30% of the total length of the first side surface portion 813. It will be appreciated that the first protrusion 811 can extend for length within a range including any of the minimum and maximum percentages noted above.

According to one embodiment, the first major surface 802 surface can include the untextured region 850 that extends through the central region 851 of the body. The untextured region 850 can include the midpoint 852 of the first major surface 802 of the body 801. Notably, the first protrusion 811 can be abutting a portion the untextured region 850.

Notably, in certain instances, the features (e.g., depressions and protrusions) on the first major surface 802 can be positioned near the perimeter of the body 801, such that the body 801 includes at least one untextured region 850 within the central region 851 of the body. Still, in at least one embodiment, at least a portion of the untextured region 850 can be abutting a portion of the side surface (e.g., the fourth side surface portion 843), such that there are no features intervening between the untextured region 850 and at least one portion of the side surface. In another embodiment, the first protrusion 811 can be spaced apart from the untextured region 850 of the first major surface 802.

In yet another embodiment, the untextured region 850 may have a two-dimensional shape that is substantially the same as the two-dimensional shape of the body 801. For example, as illustrated in FIG. 8A, the body 801 can have a generally quadrilateral shape as defined by the perimeter of the side surface 804, and the untextured region 850 can also have a generally quadrilateral shape. It will be appreciated that in certain instances, the body 801 can have a generally recognizable two-dimensional polygonal shape, and the untextured region 850 can have the same generally recognizable two-dimensional polygonal shape as viewed top down in a plane defined by the length and width of the body. Still, other instances, the two-dimensional shape of the untextured region 850 and the two-dimensional shape of the body 801 can be different compared to each other.

In at least one embodiment, the untextured region 850 can define a significant portion of the first major surface 802, including for example, at least a majority of the surface area of the first major surface 802. In at least one embodiment, the untextured region 850 can occupy at least 10%, such as at least 20% or at least 30% or at least 40% or at least 50% or at least 60% or at least 70% or even at least 80% of the total surface area of the first major surface. Such an evaluation may be made by viewing the particle using an optical microscope at a suitable magnification (e.g., as shown in FIG. 8A) and using imaging analysis software (e.g., ImageJ) to measure the surface area of the first major surface 802 and the surface area of the untextured region 850. In one non-limiting embodiment, the untextured region 850 can occupy not greater than 95% of the surface area of the first major surface 802, such as not greater than 90% or not greater than 80% or not greater than 70% or not greater than 60% or not greater than 50% or not greater than 40% or not greater than 30%. It will be appreciated that the untextured region 850 can occupy a percentage of the surface area of the first major surface 850 within a range including any of the minimum and maximum values noted above.

The untextured region 850 may have a notably distinct waviness and/or surface roughness. For example, the untextured region 850 can have a waviness (Rw) that is distinct from the waviness within the region of the first major surface 802 associated with the first depression 811 and the first protrusion 812. Moreover, in at least one embodiment, the untextured region 850 can have a surface roughness (Ra) that is distinct from the surface roughness of the first major surface 802 associated with the first protrusion 811.

In certain instances, any of the features in the first major surface 802 can abut the untextured region 850. For example, the first protrusion 811 can abut the untextured region 850. The untextured region is a region that is absent the features (e.g., protrusions and/or depressions) formed during the process of modifying the body. The untextured region 850 can have some surface contours, such as a curvature (e.g., concave curvature), but is generally absent the features formed in the body near the side surface portions. Moreover, in certain embodiments, the untextured region 850 may have a substantially planar contour.

According to another embodiment, the first side surface portion 813 and the first protrusion 811 can have substantially the same contour as viewed in the plane of the first major surface 802. For example, as illustrated in FIG. 8A, the first side surface portion 813 and the first protrusion 811 can have a generally linear shape and extend parallel to each. In other embodiments, the first side surface portion 813 may have a significantly distinct contour compared to the contour of the first protrusion 811.

As further illustrated in FIG. 8A, the body 801 can have a second side surface portion 823 that is distinct from the first side surface portion 813. In particular, the second side surface portion 823 can be separated from the first side surface portion by at least one external corner, such as the second external corner 816. The second side surface portion 823 can extend between the second external corner 816 and a third external corner 817. As illustrated in FIG. 8A, the first side surface portion 813 can be abutting one side of the second external corner 816 and the second side surface portion 823 can be abutting the second external corner 816 opposite the first side surface portion 813. An external corner can be defined according to the hypothetical rubber band test, wherein the external corner is any corner on the side surface 804 around which a rubber band would be significantly deflected (e.g., defining an angle of deflection of at least 10 degrees or greater) if it were wrapped around the side surface of the body 804.

In at least one embodiment, any protrusions or depressions can intersect one or more side surface portions. For example, the first protrusion 811 can be formed such that it intersects the second side surface portion 823. Moreover, as illustrated in FIG. 8A, the first protrusion 811 can intersect the second external corner 816.

The first major surface 802 can include a second protrusion 821 extending in a direction parallel to the second side surface portion 823. As illustrated and according to an embodiment, the second side surface portion 823 can be a fraction of the total length of the side surface 804 defining the perimeter of the body 801. As further illustrated and according to one embodiment, the first major surface 802 can further include a second side surface region 822 disposed between the second side surface portion 823 and the second protrusion 821. The second side surface region 822 can be abutting and extending along the second side surface portion 823.

The second protrusion 821 can be abutting the second side surface region 822. As illustrated and according to one embodiment, the second protrusion 821 and the second side surface region 822 can extend parallel to each other and parallel to the second side surface portion 823. In at least one embodiment, the second protrusion 821 and the second side surface region 822 can extend parallel to each other for at least a portion of the second side surface portion 823. The second protrusion 821 and the second side surface region 822 can extend for a fraction of the total length of the side surface 804 defining the perimeter of the body 801. In one particular embodiment, the second protrusion 821 can extend for at least 30% of the total length of the second side surface portion 823, which is measured as the distance between the second external corner 816 and the third external corner 817. In another embodiment, the second protrusion 821 can extend for at least 40% of the total length of the second side surface portion 823 or at least 50% or at least 60% or at least 70% or at least 80% or even at least 90% of the total length of the second side surface portion 813. In one particular embodiment, the second protrusion 821 can extend for the entire length of the second side surface portion 823. Still, in another non-limiting embodiment, the second protrusion 821 can extend for not greater than 99% of the total length of the second side surface portion 823, such as not greater than 95% or not greater than 90% or not greater than 80% or not greater than 70% or not greater than 60% or not greater than 50% or not greater than 40% or not greater than 30% of the total length of the second side surface portion 823. It will be appreciated that the second protrusion 821 can extend for length within a range including any of the minimum and maximum percentages noted above.

According to another embodiment, the second side surface portion 823 and the second protrusion 821 can have substantially the same contour compared to each other as viewed in the plane of the first major surface 802. For example, as illustrated in FIG. 8A, the second side surface region 822 and the second protrusion 821 can have a generally linear shape and extend parallel to each other along the direction of the second side surface portion 823. In other embodiments, at least the second protrusion 821 and the second side surface region 822 can have substantially different contour as viewed in the plane of the first major surface 802. That is, the second side surface portion 823 may have a significantly distinct contour compared to the contour of the second protrusion 821 and the second side surface region 822.

According to one embodiment, any of the features on the major surfaces of the body can intersect each other. For example, as illustrated in FIG. 8A, the first protrusion 811 can intersect the second protrusion 821. Notably, the first protrusion 811 and the second protrusion 821 can intersect each other proximate to an external corner, such as the second external corner 816, which separate the first side surface portion 813 and second side surface portion 823. As further illustrated in FIG. 8A, the second side surface region 822 can intersect and abut the first protrusion 811. Moreover, according to one embodiment, the first side surface region 812 can intersect and abut the second protrusion 821.

In at least one embodiment, the first major surface 802 may include a third portion of a side surface 833. The third side surface portion 833 can be distinct from the first side surface portion 813 and the second side surface portion 823. In particular, the third side surface portion 833 can be separated from the first side surface portion 813 and the second side surface portion 823 by at least one external corner. According to the illustrated embodiment of FIG. 8A, the third side surface portion 833 can be separated from the first side surface portion by the second and third external corners 816 and 817. The third side surface portion 833 can be separated from the second side surface portion 823 by the third external corner 817. The third side surface portion 833 can extend between the third external corner 817 and a fourth external corner 818.

In at least one embodiment, the second protrusion 821 and the second side surface region 822 can intersect the third side surface portion 833 proximate the third external corner 817. In particular, the third side surface portion 833 may be distinct from the first and second portions of the side surface 813 and 823 in that there is no third protrusion extending along the third side surface portion 833. The first major surface 802 does include a third side surface region 832 extending along and abutting the third side surface portion 833. The third side surface region 832 can have any of the features of the other side surface regions described herein. The third side surface region 832 may be in the form of a ridge extending vertically above the surface of the untextured region 850 and may have any feature of the protrusions described in embodiments herein. Moreover, as illustrated, the third side surface region 832 can be abutting the untextured region 850 extending through the central region 851 of the body 801. Additionally, the third side surface region 832 can intersect the second protrusion 821 proximate the third external corner 817.

In at least one embodiment, the first major surface 802 may include a fourth portion of a side surface 843. The fourth side surface portion 843 can be distinct from the first side surface portion 813, the second side surface portion 823, and the third side surface portion 833. In particular, the fourth side surface portion 843 can be separated from the first side surface portion 813, the second side surface portion 823, and the third side surface portion 833 by at least one external corner. According to the illustrated embodiment of FIG. 8A, the fourth side surface portion 843 can be separated from the first side surface portion 813 by the first external corner 815. The fourth side surface portion 843 can be separated from the second side surface portion 823 by all of the external corners 815, 816, 817 and 818. The fourth side surface portion 843 can be separated from the third side surface portion 833 by the fourth external corner 818. The fourth side surface portion 843 can extend between the fourth external corner 818 and the first external corner 815.

In at least one embodiment, the fourth side surface portion 843 can be distinct from the other portions of the side surface 813, 823, and 833, in that it defines an unfeatured edge 844. The unfeatured edge 844 defines a joint between the first major surface 802 and the fourth side surface portion 843 and does not include any features, such as protrusions and/or depressions, which are generally formed during the forming process. More particularly, in one embodiment, the unfeatured edge 844 can abut the untextured region 850 extending through the central region 851 of the first major surface 802 of the body 801. Accordingly, there are no intervening features (e.g., protrusions or depressions) between the untextured region 850 of the central region 851 and the fourth side surface portion 843. It will be appreciated that the abrasive particles of the embodiments herein may include one or more unfeatured edges that can intersect one or more featured edges, wherein a featured edge comprises at least one feature (e.g., a protrusion or depression) extending along a portion of the side surface as described in embodiments herein.

As further illustrated, certain features from the abutting side surface portions can intersect the fourth side surface portion 843. For example, the first protrusion 811 can intersect the fourth side surface portion 843 proximate the first external corner 815.

Figure 8B:
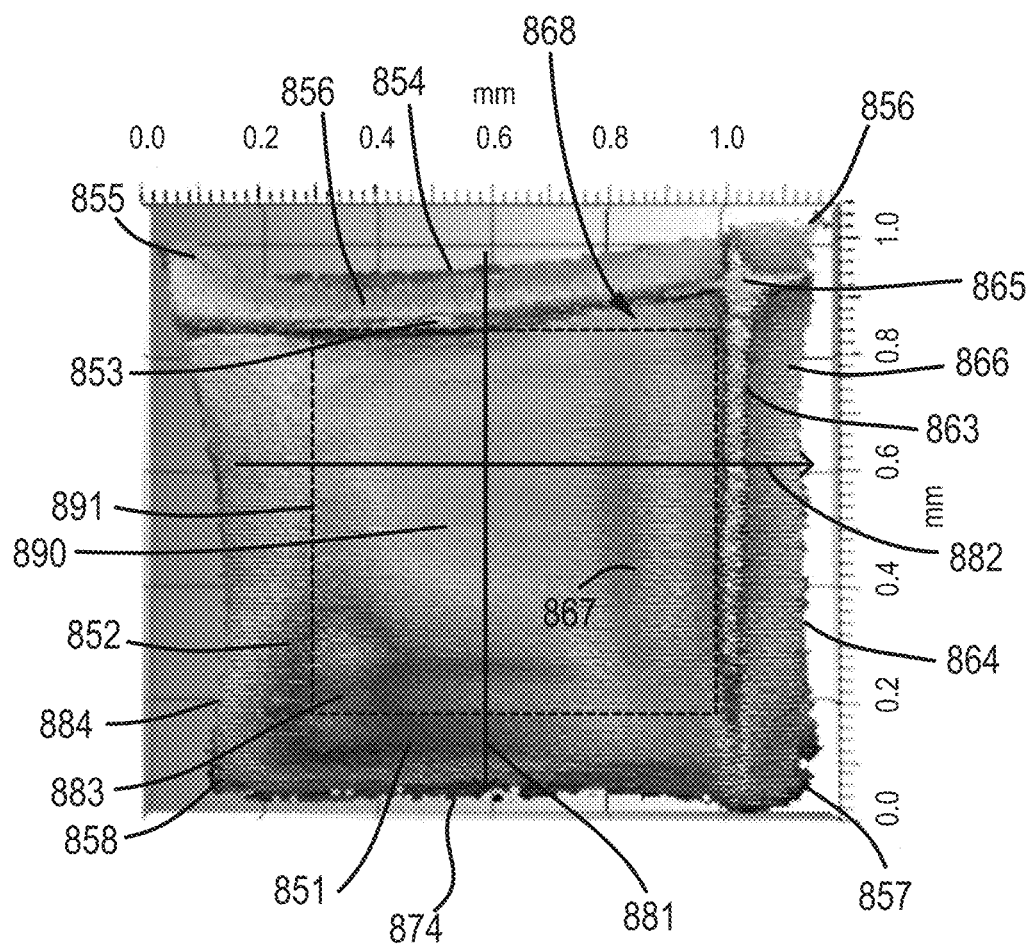
FIG. 8B includes top-down image of an abrasive particle according to an embodiment.
Figure 8C:
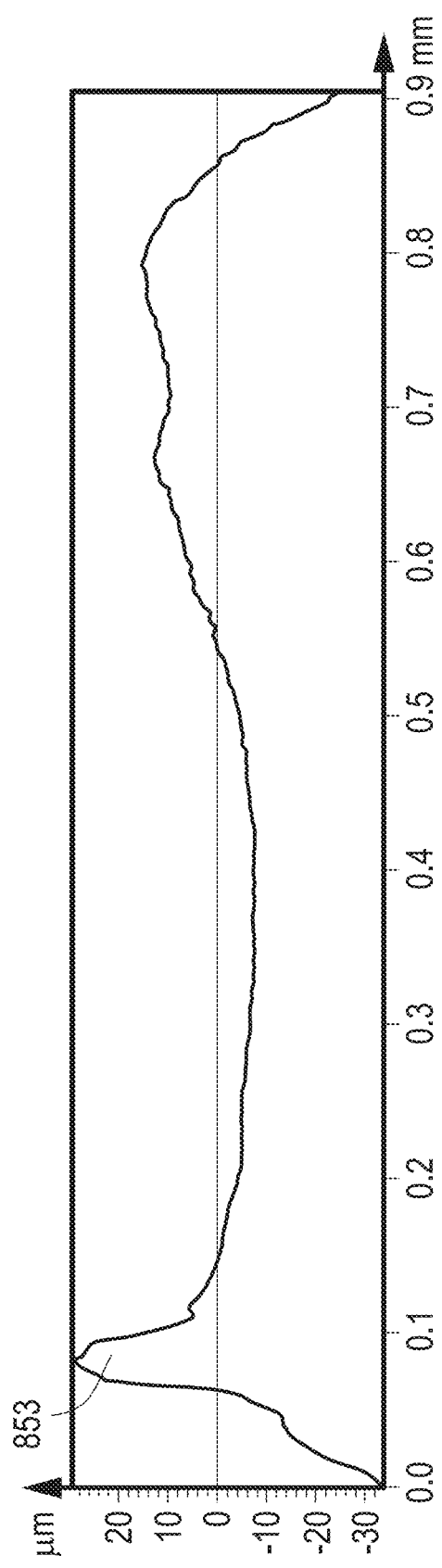
FIG. 8C includes a surface profile plot for a portion of the major surface of the abrasive particle of FIG. 8B.
Figure 8D:
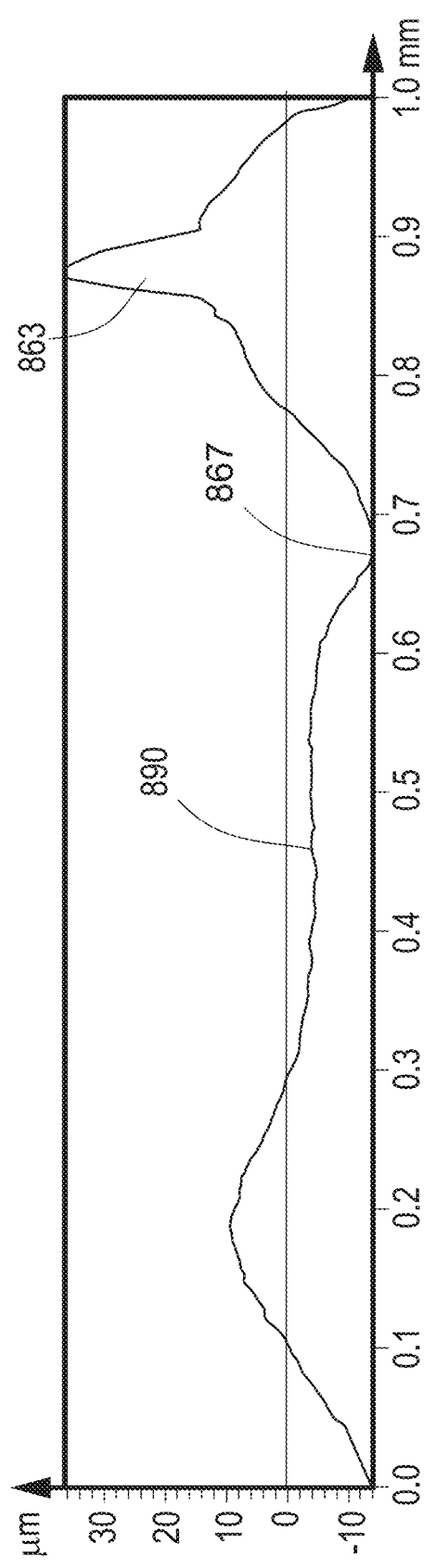
FIG. 8D includes a surface profile plot for a portion of the major surface of the particle of FIG. 8B.

FIG. 8B includes a top-down image of an abrasive particle according to an embodiment. FIG. 8C includes a surface profile plot for a portion of the major surface of the abrasive particle of FIG. 8B. FIG. 8D includes a surface profile plot for a portion of the major surface of the particle of FIG. 8B. The image of FIG. 8B was obtained using a Nanovea 3D Surface Profilometer using a white light chromatic aberration technique. For each profile (either at X constant or Y constant), the Y-step size was 5.00 µm (in the case of X constant) and the X-step size was 5.00 µm (in the case of Y constant). The Z resolution was 7.28 nm. Total probed length depends on the grain size, and is measured using the scale bar provided with the line scans.

As illustrated, the abrasive particle 850 includes a body 851 including a first major surface 852, a second major surface (not illustrated), and a side surface (not illustrated in the view of FIG. 8B) extending between the first major surface 852 and second major surfaces. As illustrated in FIG. 8B, the body 851 has a substantially quadrilateral two-dimensional shape as viewed top-down in the plane of the first major surface 852.

As further illustrated in FIG. 8B, the body 851 can include one or more features arranged on the first major surface 852 relative to one or more side surface portions of the side surface. For example, the first major surface 852 can include a first protrusion 853 extending in a direction parallel to a first side surface portion 854. The first side surface portion 854 can define a fraction of the side surface that can be disposed between a first external corner 855 and a second external corner 856. As illustrated and according to an embodiment, the first side surface portion 853 can be a fraction of the total length of the side surface defining the perimeter of the body. The first protrusion 853 can be abutting the first side surface portion 854 and extend along the first side surface portion 854. As illustrated, the first protrusion 852 can define a raised portion in the first major surface 852 extending vertically above the height of the first major surface 852 and an untextured region 890 extending through a central region 891 of the body 851. The first protrusion 853 can have any of the features of the protrusions described in the embodiments herein. The upper surface 852 can further include a first side surface region 856 disposed between the first protrusion 853 and the first side surface portion 854.

Notably, FIG. 8C includes a surface profile plot of the first major surface 852 along the axis 881. The surface profile plot was obtained using a Nanovea 3D Surface Profilometer using a white light chromatic aberration technique. For each profile (either at X constant or Y constant), the Y-step size was 5.00 µm (in the case of X constant) and the X-step size was 5.00 µm (in the case of Y constant). The Z resolution was 7.28 nm. Total probed length depends on the grain size, and is measured using the scale bar provided with the line scans.

As illustrated in the plot, the first protrusion 853 extends above the first major surface 852. As illustrated, the first protrusion 853 can be in direct contact with the untextured region 890. The first protrusion 853 can extend along the entire length of the first side surface portion 854 between the first external corner 855 and the second external corner 856. Moreover, the first protrusion 853 can have substantially the same contour as viewed top-down (as provided in FIG. 8B) as the first side surface portion 854. The first protrusion 853 and the first side surface portion 854 can have an arcuate contour as illustrated in FIG. 8B. It should be noted that not all abrasive particles of the embodiments herein will include each of the features depicted in certain abrasive particles, and the abrasive particles may include different combinations of certain features.

As further illustrated in FIG. 8B and according to one embodiment, the body 851 can further include a second protrusion 863 extending above the first major surface 852. The second protrusion 863 can extend in a direction parallel to a second side surface portion 864. The second side surface portion 864 can define a fraction of the side surface that can be disposed between the second external corner 856 and a third external corner 857. As illustrated and according to an embodiment, the second side surface portion 863 can be a fraction of the total length of the side surface defining the perimeter of the body 851. The second protrusion 863 can be abutting the second side surface portion 864 and extend along the second side surface portion 864. As illustrated, the second protrusion 862 can define a raised portion in the first major surface 852 extending vertically above the height of the first major surface 852 and the untextured region 890 that extends through a central region 891 of the body 851. The second protrusion 863 can have any of the features of the protrusions described in the embodiments herein. The upper surface 852 can further include a second side surface region 866 disposed between the second protrusion 863 and the second side surface portion 864.

Notably, FIG. 8D includes a surface profile plot of the first major surface 852 along the axis 882 and was obtained using the same technique used to create the plot of FIG. 8C.

According to the illustrated embodiment of FIG. 8B, the second protrusion 863 can extend along the entire length of the second side surface portion 864 between the second external corner 856 and the third external corner 857. Moreover, the second protrusion 863 can have substantially the same contour as viewed top-down (as provided in FIG. 8B) as the second side surface portion 864. The second protrusion 863 and the second side surface portion 864 can each have a generally planar contour and extend in a generally linear direction as illustrated in FIG. 8B. In the illustrated embodiment of FIG. 8B, the first protrusion 853 and the second protrusion 863 intersect each other at region 865, which is proximate to the second external corner 856.

The first major surface 852 of the body 851 can further include a first depression 867, which can be adjacent to the second protrusion 863 and extend along a majority of the length of the second protrusion 863. The first depression 867 can be positioned between the second protrusion 863 and the untextured region 890. The first depression 867 can further extend along the direction of the second protrusion 863 and the second side surface portion 864. Moreover, in the embodiment, of FIG. 8B, the first depression 867 can extend in a direction parallel to the second protrusion 863 and the second side surface portion 864. Additionally, the second protrusion 863 can be disposed between the second side surface portion 864 and the first depression 867.

The second protrusion 863 can further be abutting the first depression 867. As illustrated and according to one embodiment, the second protrusion 863 and the first depression 867 can extend for a fraction of the total length of the side surface defining the perimeter of the body 801. In one particular embodiment, the second protrusion 863 and/or the first depression 867 can extend for not greater than 30% of the total length of the second side surface portion 864, which is measured as the distance between the external corners 856 and 857. In another embodiment, the second protrusion 863 and/or the first depression 867 can extend parallel to each other for at least 40% of the total length of second side surface portion 864 or at least 50% or at least 60% or at least 70% or at least 80% or even at least 90% of the total length of the second side surface portion 864. In one particular embodiment, the second protrusion 863 and/or the first depression 867 can extend parallel to each other for the entire length of the second side surface portion 864. Still, in another non-limiting embodiment, the second protrusion 863 and/or the first depression 867 can extend parallel to each other for not greater than 99% of the total length of the second side surface portion 864, such as not greater than 95% or not greater than 90% or not greater than 80% or not greater than 70% or not greater than 60% or not greater than 50% or not greater than 40% or not greater than 30% of the total length of the second side surface portion 864. It will be appreciated that the second protrusion 863 and/or the first depression 867 can extend parallel to each other for length within a range including any of the minimum and maximum percentages noted above.

It will be appreciated that other abrasive particles can include more than one depression. For example, particles of the embodiments herein may have one or more depressions on the surface, and such depressions can be associated with and abutting more than one other portions of the upper surface of the body, including for example, one or more protrusions, the untextured region, and the like. One or more protrusions can be disposed between a depression and a side surface portion. Likewise, one or more depressions can be disposed between a protrusion and the untextured region.

As illustrated in FIG. 8D, the first depression 867 can have a notable depth that defines a portion of the first major surface 852 that is positioned vertically below the first major surface associated with the untextured region 890 and the portion of the first major surface 852 associated with the second protrusion 863. As further illustrated, the first depression 867 can intersect and abut a portion of the first protrusion 853 in the region 868. Notably, the first depression 867 can terminate at the intersection of the first protrusion 853.

As further illustrated in FIG. 8B, the first major surface 852 of the body 851 can include a third side surface portion 874 extending between the third external corner 857 and a fourth external corner 858. The body can further include a fourth side surface portion 884 extending between the fourth external corner 858 and the first external corner 855, such that the body can have a generally four-sided shape, wherein the first side surface portion 854 and the fourth side surface portion 884 have an arcuate contour. The second side surface portion 864 and the third side surface portion 874 can have substantially planar contours and extend in a generally linear direction. It should be noted that the second side surface portion 864 and the third side surface portion 874 can have some minor irregularities in the contours of the edge.

The first major surface 852 can further include a third protrusion 883 located proximate to the fourth external corner 858. The third protrusion 883 can extend for a fraction of the length of the fourth side surface portion 884. As further illustrated in FIG. 8B, the third protrusion 883 can have a rounder shape compared to the first and second protrusions 853 and 863. Moreover, the third protrusion 883 can be abutting the untextured region 890.

FIGS. 9A-9E include images of other abrasive particles according to embodiments herein. FIGS. 9A-9E provide details on other features of the abrasive particles of the embodiments herein. For example, FIG. 9A includes an abrasive particle 900 including a body 901 having a first major surface 902, a second major surface 903, and a side surface 904 extending between the first and second major surfaces 902 and 903. In particular, in certain embodiments, a feature may intersect a portion of a side surface along which that feature extends. For example, the first major surface 902 includes a first protrusion 911 that extends along a portion of the first side surface portion 913. As illustrated, the first protrusion 911 can intersect the first side surface portion 913. As further illustrated, the first protrusion 911 can have a different contour compared to the first side surface portion 913, which further facilitates the intersection between the first protrusion 911 and the first side surface portion 913. In particular, the first depression 911 can have a generally linear contour and the first side surface portion 913 can have a curved contour including a concave portion that causes the first side surface portion 913 to intersect the first protrusion 911.

FIG. 9B includes an abrasive particle 920 including a body 921 having a first major surface 922, a second major surface 923, and a side surface 924 extending between the first and second major surfaces 922 and 923. In particular, in certain embodiments, an edge between one of the major surfaces and the side surface may have an irregular contour defining jagged and sharp regions. For example, the second major surface 923 and the side surface 924 can be joined at the edge 925, which is characterized by an irregular contour defining jagged and sharp regions.

Moreover, in one embodiment, the first major surface 922 can have a first surface area (A1) and the second major surface 923 can have a second surface area (A2). According to one embodiment, the first surface area can be different than the second surface area. Notably, in at least one instance, A1 can be less than A2. In more particular instances, the difference between the first surface area (A1) and the second surface area (A2) can be defined by a ratio (A1/A2), wherein A1/A2 can be not greater than 1, such as not greater than 0.9 or not greater than 0.8 or not greater than 0.7 or not greater than 0.6 or not greater than 0.5 or not greater than 0.4 or not greater than 0.3 or not greater than 0.3 or not greater than 0.2 or not greater than 0.1. Still, in another non-limiting embodiment, the ratio (A1/A2) can be at least 0.01, such as at least 0.05 or at least 0.1 or at least 0.2 or at least 0.3 or at least 0.4 or at least 0.5 or at least 0.6 or at least 0.7 or at least 0.8 or even at least 0.9. It will be appreciated that the ratio (A1/A2) can be within a range including any of the minimum and maximum values noted above.

While all of the images of the abrasive particles of FIGS. 8A-8D and 9A-9E have included particles having a generally rectangular two-dimensional shape, it will be appreciate that any of the features described in association with these particles can be applied to particles having an irregular two-dimensional shape, such irregular planar abrasive particles.

Moreover, reference herein to any dimensional characteristic (e.g., length, width, height, etc.) can be reference to a dimension of a single particle, a median value, or an average value derived from analysis of a suitable sampling of particles. Unless stated explicitly, reference herein to a dimensional characteristic can be considered reference to a median value that is based on a statistically significant value derived from a random sampling of suitable number of particles. Notably, for certain embodiments herein, the sample size can include at least 10, and more typically, at least 40 randomly selected particles from a batch of particles. A batch of particles may include, but need not necessarily be limited to, a group of particles that are collected from a single process run. In yet another instance, a batch of abrasive particles can be a group of abrasive particles of an abrasive article, such as a fixed abrasive article. For example, a batch of particles may include an amount of abrasive particles suitable for forming a commercial grade abrasive product, such as at least about 20 lbs. of particles.

Figure 15A:
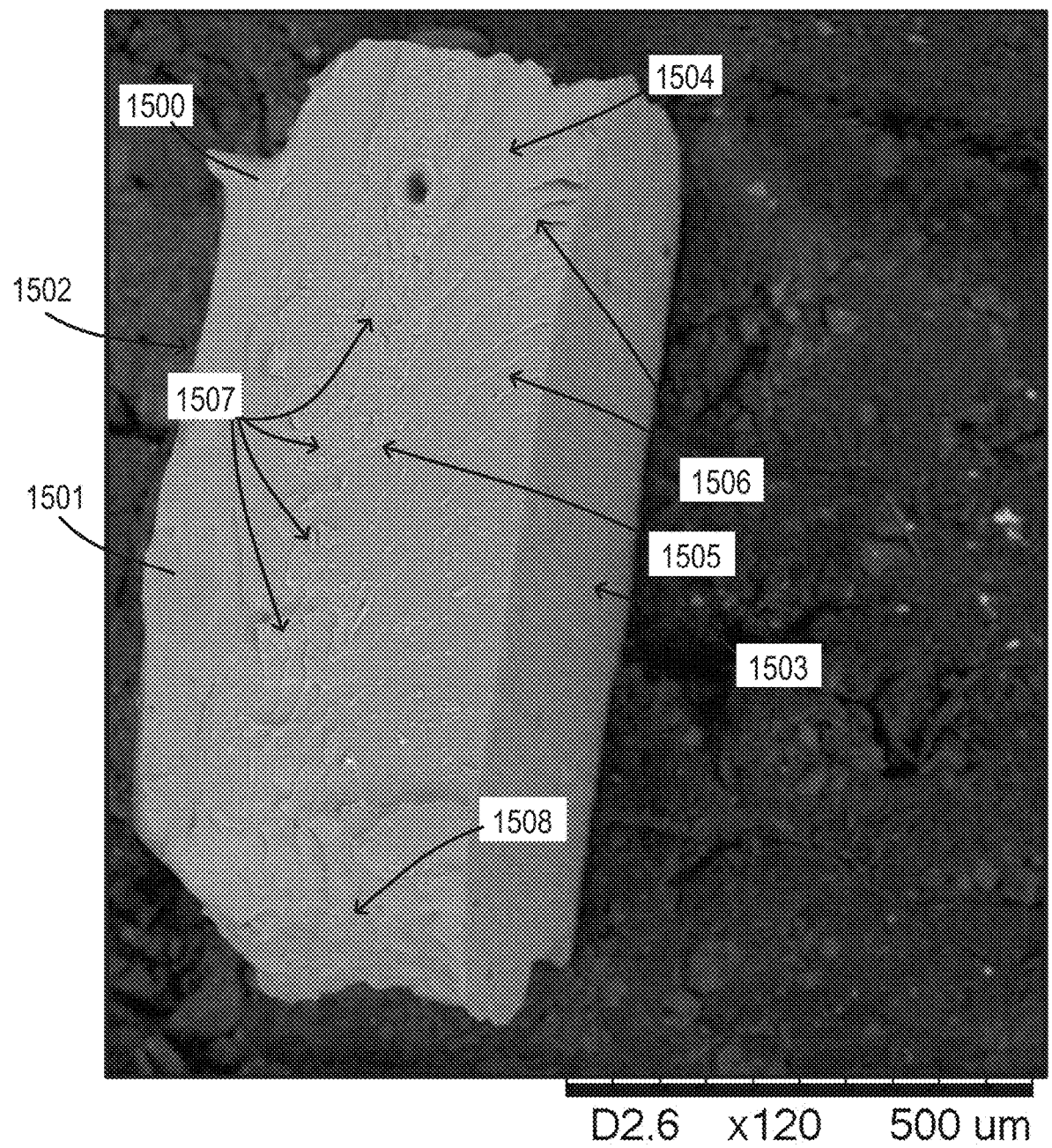
FIG. 15A includes an image of an abrasive particle including a plurality of microridges on a side surface according to an embodiment.

FIG. 15A includes an image of a side surface of an abrasive particle including a plurality of microridges according to an embodiment. As illustrated, the abrasive particle 1500 includes a body 1501 including a first major surface 1502, a second major surface 1503, and a side surface 1504 extending between the first and second major surfaces 1502 and 1503. The body 1501 can have a thin, relatively planar shape, wherein the first and second major surfaces 1502 and 1503 are larger than the side surface 1504.

According to one embodiment, a majority of the side surface can include a plurality of microridges. For example as illustrated in the image of FIG. 15A, the side surface 1504 includes a plurality of microridges 1505. Notably, the plurality of microridges 1505 on the side surface 1504 create an entirely distinct appearance and texture compared to a surface in contact with a surface (e.g., a molded) surface as represented by the second major surface 1503, which has a planar contour and is free of microridges 1505. In certain instances, the plurality of microridges 1505 create a surface having jagged surface features, representative of an unpolished ceramic surface.

The plurality of microridges 1505 appear to have multiple, distinct morphologies or types. A first type of microridge can include isolated microridges 1506, which can be defined by microridges extending out the side surface and along the side surface. The isolated microridges 1506 can be separated by generally smooth planar regions. The second type of microridge can include scaled microridges 1507, which may have a scaled or layered appearance. Another type of includes expanding microridges, which includes a plurality microridges extending outward from a focal region. Such microridges are described in accordance with FIG. 17. Without wishing to be tied to a particular theory, the plurality of microridges 1505 appears to be an artifact of the forming processes described in the embodiments herein. Notably, it is thought that the plurality of microridges 1505 is formed during the controlled cracking and fracturing of the body used to form the abrasive particles. Accordingly, the plurality of microridges 1505 may be characterized as conchoidal or subconchoidal fracturing features formed as the body was fractured into smaller portions that ultimately formed the abrasive particles based on the process as described herein. Moreover, it is theorized that the different types of microridges may be associated with different conditions during processing. Such features appear to be distinct from the side surfaces of particles formed according to other conventional processes used to form abrasive particles, such as molding, printing, cutting and the like. Region 1508 of the side surface 1504 in FIG. 15A provides a perspective view image of the roughened and irregular features exhibited by the plurality of microridges.

In one embodiment, an abrasive particle can have a side surface, wherein at least 51% of the total surface area of the side surface includes the plurality of microridges 1505. In another embodiment, a greater percentage of the side surface 1504 can include the plurality of microridges 1505, including for example, but not limited to, at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 92% or at least 94% or at least 96% or at least 98% or even at least 99% of the total surface area of the side surface. In another non-limiting embodiment, not greater than 99% of the total surface area of the sides surface 1504 can include the plurality of microridges 1505, such as not greater than 98% or not greater than 96% or not greater than 94% or not greater than 92% or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52%. It will be appreciated that the total surface area of the side surface covered by the plurality of microridges 1505 can be within a range including any of the minimum and maximum percentages noted above.

As noted in other embodiments, the side surface may include a plurality of side surface portions, wherein each side surface portion is defined as a portion of the side surface extending between the external corners of the body. According to one embodiment, at least 45% of the side surface portions for a given abrasive particle can include the plurality of microridges. In still other embodiments, the percentage can be greater, including for example, at least 52% of the side surface portions of the body include the plurality of microridges, or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 92% or at least 94% or at least 96% or at least 98% or at least 99%. In at least one embodiment, all of the side surface portions of the side surface for a given abrasive particle can include the plurality of microridges.

While it will be understood that the two-dimensional shape of the body as viewed top-down will determine the number of side surface portions for an abrasive particle, in at least one embodiment, the body can include at least three side surface portions including the plurality of microridges. In other embodiments, the number of side surface portions including the plurality of microridges can be greater, such as at least four or at least five or at least six or at least seven or at least eight. Still, it will be appreciated that in at least one embodiment, an abrasive particle may be formed such that at least one side surface portion does not include the plurality of microridges.

Figure 15B:
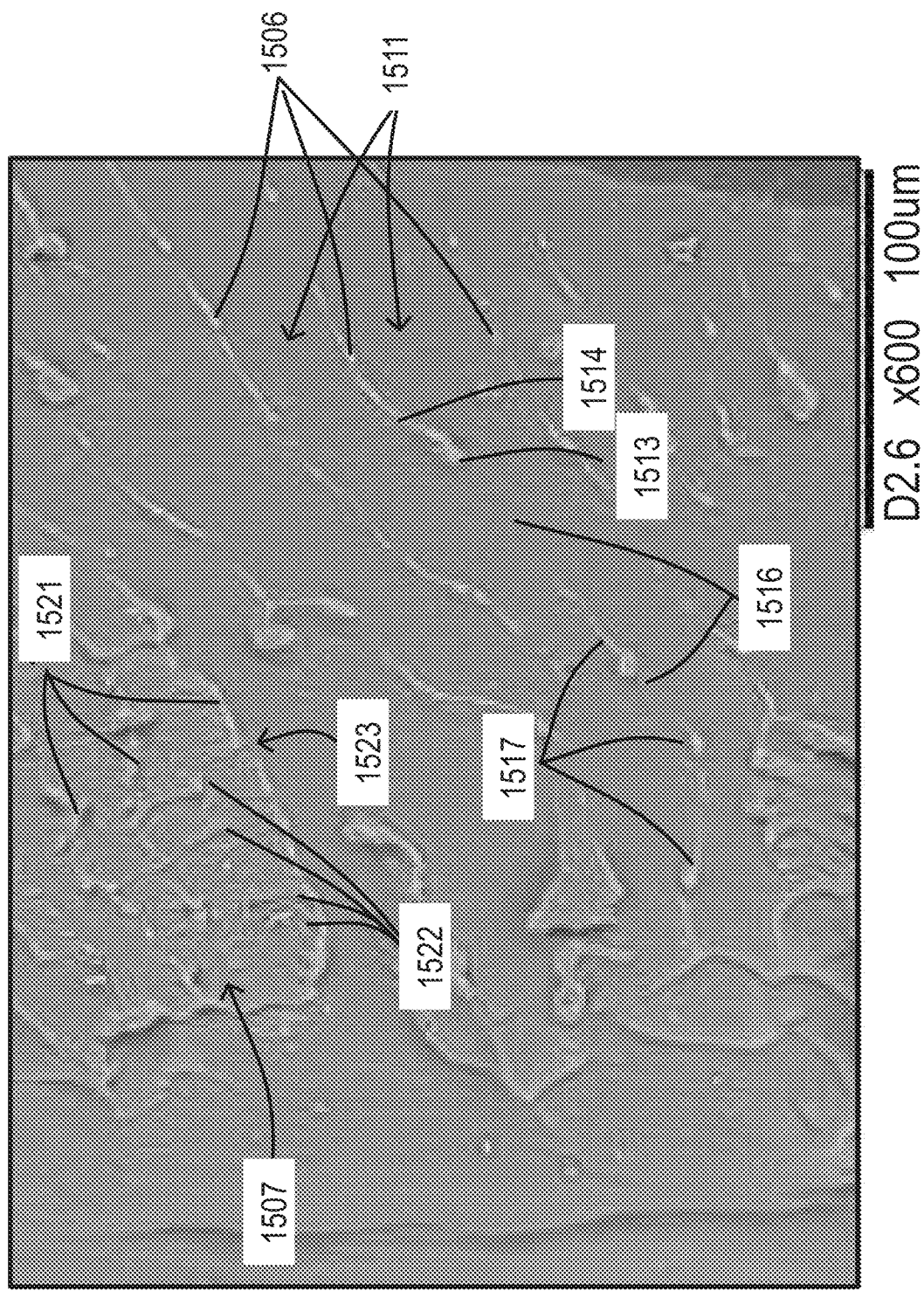
FIG. 15B includes an image of the side surface of the abrasive particle of FIG. 15A according to an embodiment.

FIG. 15B includes a magnified image of a portion of the abrasive particle of FIG. 15A. FIG. 15B more clearly depicts the two different types of microridges that have been observed on the abrasive particles of the embodiments herein. As depicted, the first type of microridges can include a plurality of isolated microridges, which can include the isolated microridges 1506 separated from each other by the smooth planar regions 1511. As further illustrated, the isolated microridges 1506 can extend along the side surface in an irregular path. The path of the isolated microridges 1506 may be irregular but characterized by some coordination when compared to each other. For example, as illustrated in FIG. 15B, the isolated microridges 1506 can extend along the side surface in an irregular path, but can have generally the same irregular path relative to each other. According to one embodiment, at least a portion of a group of isolated microridges 1506, which can be adjacent to each other, can extend in a generally coextensive manner, such that they define the same pathway relative to each other, but are separated by the smooth planar regions 1511. Such an arrangement appears similar to lanes on a highway.

In another embodiment, at least one of the isolated microridges of the plurality of isolated microridges 1506 can be made up of different regions having different shapes. For example, at least one of the isolated microridges can include a head region 1513 and a tail region 1514 connected to and extending from the head region 1513. As depicted and according to one embodiment, the head region 1503 can have a rounded shape. The tail region 1514 can have an elongated shape. In at least one embodiment, an isolated microridge can include a series of these regions linked together and separated by one or more gaps 1516. The gaps 1516 can define an interruption in the isolated microridges

1506. The gaps 1516 can define smooth regions positioned along the irregular path of the one or more isolated microridges 1506. In at least one embodiment, the irregular path of an isolated microridge 1506 can include a plurality of gaps 1516, and thus the isolated microridge may be characterized as a series of isolated microridge portions 1517 extending along an irregular path. Any of the isolated microridge portions can include a head region and tail region.

The plurality of isolated microridges 1506 may extend along the side surface for a significant distance. For example, at least one of the isolated microridges 1506 can extend for at least 10% of the average height of the side surface 1504. In other embodiments, the length of one or more isolated microridges 1506 on the side surface 1504 can be at least 20% or at least 30% or at least 40% or at least 50% or at least 60% or at least 70% or at least 80% or at least 90% or at least 95% of the average height of the side surface 1504. In still another non-limiting embodiment, the length of one or more isolated microridges 1506 on the side surface 1504 can be not greater than 99% or not greater than 90% or not greater than 80% or not greater than 70% or not greater than 60% or not greater than 50% or not greater than 40% of the average height of the side surface. It will be appreciated that the length of one or more of the isolated microridges 1506 along the side surface 1504 can be within a range including any of the minimum and maximum percentages noted above.

In certain instances, one or more of the plurality of isolated microridges 1506 can have a total length of at least 100 microns, such as at least 150 microns or at least 200 microns or at least 300 microns or at least 400 microns. Still, depending upon the height of the abrasive particle, the total length of at least one of the isolated microridges 1506 may be not greater than 2 mm, such as not greater than 1 mm or even not greater than 500 mm.

The plurality of isolated microridges 1506 may have a very small thickness, particularly in the tail region 1514, wherein the thickness is measured in a direction transverse to the microridge and the direction defining the length of the microridge. As depicted in FIG. 15B, the tail region 1514 of any one of the isolated microridges 1506 may have a thickness of less than 10 microns, such as less than 8 microns or not greater than 6 microns or not greater than 4 microns or not greater than 2 microns. Still, it appears that the tail region 1514 of the isolated microridges 1506 may have a thickness of at least 0.01 microns or at least 0.1 microns. The thickness of the tail region 1514 is the maximum thickness measured in the tail region 1514.

The plurality of isolated microridges 1506 may have a thickness in the head region 1513 that is greater than the thickness in the tail region 1514. As depicted in FIG. 15B, the head region of any one of the isolated microridges 1506 may have a thickness of less than 50 microns, such as less than 40 microns or not greater than 30 microns or not greater than 20 microns. Still, it appears that the head region 1513 of the isolated microridges 1506 may have a thickness of at least 1 micron or at least 1 micron. The thickness of the head region 1513 is the maximum thickness measured in the head region 1513 for a given isolated microridge 1514.

As further depicted in FIG. 15B, at least a portion of the plurality of microridges 1505 can include a plurality of scaled microridges 1507. The plurality of scaled microridges 1507 can have a different morphology compared to the isolated microridges 1506. As illustrated, the plurality of scaled microridges 1507 can include a plurality of raised portions with irregular shapes and wrinkles extending between the raised portions. More particularly, the plurality of scaled microridges 1507 can include one or more primary ridges 1521 defining raised portions and a plurality of wrinkles 1522 extending from the one or more primary ridges 1521. In certain instances, the plurality of wrinkles 1522 can extend between and/or across two or more primary ridges 1521.

According to one embodiment, and as depicted in FIG. 15B, the one or more primary ridges 1521 of the scaled microridges 1507 can extend along the side surface of the body in an irregular path. The irregular path generally includes a random combination of linear and arcuate sections joined together. As further illustrated, the one or more primary ridges 1521 can be laterally spaced apart from each other but may have some coordination relative to each other, such that portions of the primary ridges 1521, including for example, those primary ridges that are adjacent to each other, can extend in a coextensive manner, like the isolated microridges 1506.

In one aspect, the primary ridges 1521 can have any of the features with respect to size and direction as described in accordance with the isolated microridges. For example, the primary ridges 1521 may extend along the side surface 1504 for a significant distance. For example, at least one of the primary ridges 1521 can extend for at least 10% of the average height of the side surface 1504. In other embodiments, the length of one or more primary ridges 1521 on the side surface 1504 can be at least 20% or at least 30% or at least 40% or at least 50% or at least 60% or at least 70% or at least 80% or at least 90% or at least 95% of the average height of the side surface. In still another non-limiting embodiment, the length of one or more primary ridges 1521 on the side surface 1504 can be not greater than 99% or not greater than 90% or not greater than 80% or not greater than 70% or not greater than 60% or not greater than 50% or not greater than 40% of the average height of the side surface 1504. It will be appreciated that the length of one or more primary ridges 1521 along the side surface 1504 can be within a range including any of the minimum and maximum percentages noted above.

In certain instances, one or more of the primary ridges 1521 can have a total length of at least 100 microns, such as at least 150 microns or at least 200 microns or at least 300 microns or at least 400 microns. Still, depending upon the height of the abrasive particle, the total length of at least one of the primary ridges 1521 may be not greater than 2 mm, such as not greater than 1 mm or even not greater than 500 mm. It will be appreciated that the total length of at least one of the primary ridges 1521 can be within a range including any of the minimum and maximum values noted above.

As further depicted in FIG. 15B, the scaled microridges 1507 can include a plurality of wrinkles 1522, which can extend along the side surface in an irregular pathway from one or more primary ridges 1521. Generally, at least a significant portion of the plurality of wrinkles 1522 can extend along a curved path on the side surface of the body. In certain instances, the wrinkles can define grooves extending along the side surface 1504 along an irregular path. Certain embodiments of the scaled ridges 1507 may include a greater number of wrinkles 1522 compared to the number of primary ridges 1521.

As further depicted in FIG. 15B and according to one embodiment, the plurality of wrinkles 1522 can extend in a different direction compared to one or more primary ridges 1521. For example, the plurality of wrinkles 1522 may extend from, between, and/or across one or more primary ridges 1521. The plurality of wrinkles 1522 may extend transversely to the length of the primary ridges 1521. The plurality of wrinkles 1522 may be in the form or grooves extending into the body at the side surface.

In certain embodiments, the plurality of wrinkles 1522 may define cuts through the primary ridges 1521, which may form gaps 1523 or regions of reduced height in the primary ridges 1521. According to one embodiment, one of more of the primary ridges 1521 can include at least one gap 1523 between elongated portions defining the primary ridge 1521. The gap 1523 may be associated with and/or connected to one or more wrinkles 1522 extending from the gap 1523.

As noted herein, the scaled microridges 1507 can have a scaled or scaly appearance. Unlike the isolated microridges 1506, the scaled microridges 1507 appear to have a greater waviness and/or roughness. Moreover, the region of the side surface having the scaled microridges 1507 can define a region of the side surface having a greater roughness compared to the region of the side surface including the isolated microridges 1506. The scaled microridges 1506 and isolated microridges 1507 may also be distinguished from each other based on one or more other surface features, including for example, but not limited to, waviness, maximum surface roughness, and the like.

As further depicted in FIG. 15B, the scaled microridges 1507 can be abutting the isolated microridges 1506. In certain instances, the scaled microridges 1507 and isolated microridges 1506 can be coordinated, such that the primary ridges 1521 of the scaled microridges 1507 and the isolated microridges 1506 can have portions that are coextensive, despite having an irregular pathway across the side surface of the body. Without wishing to be tied to a particular theory, it is thought that the isolated microridges 1506 and scaled microridges 1507 may occur from the same process, such as fracturing during formation, but the conditions during formation of the isolated microridges 1506 may differ slightly from the conditions during formation of the scaled microridges 1507.

Figure 16:
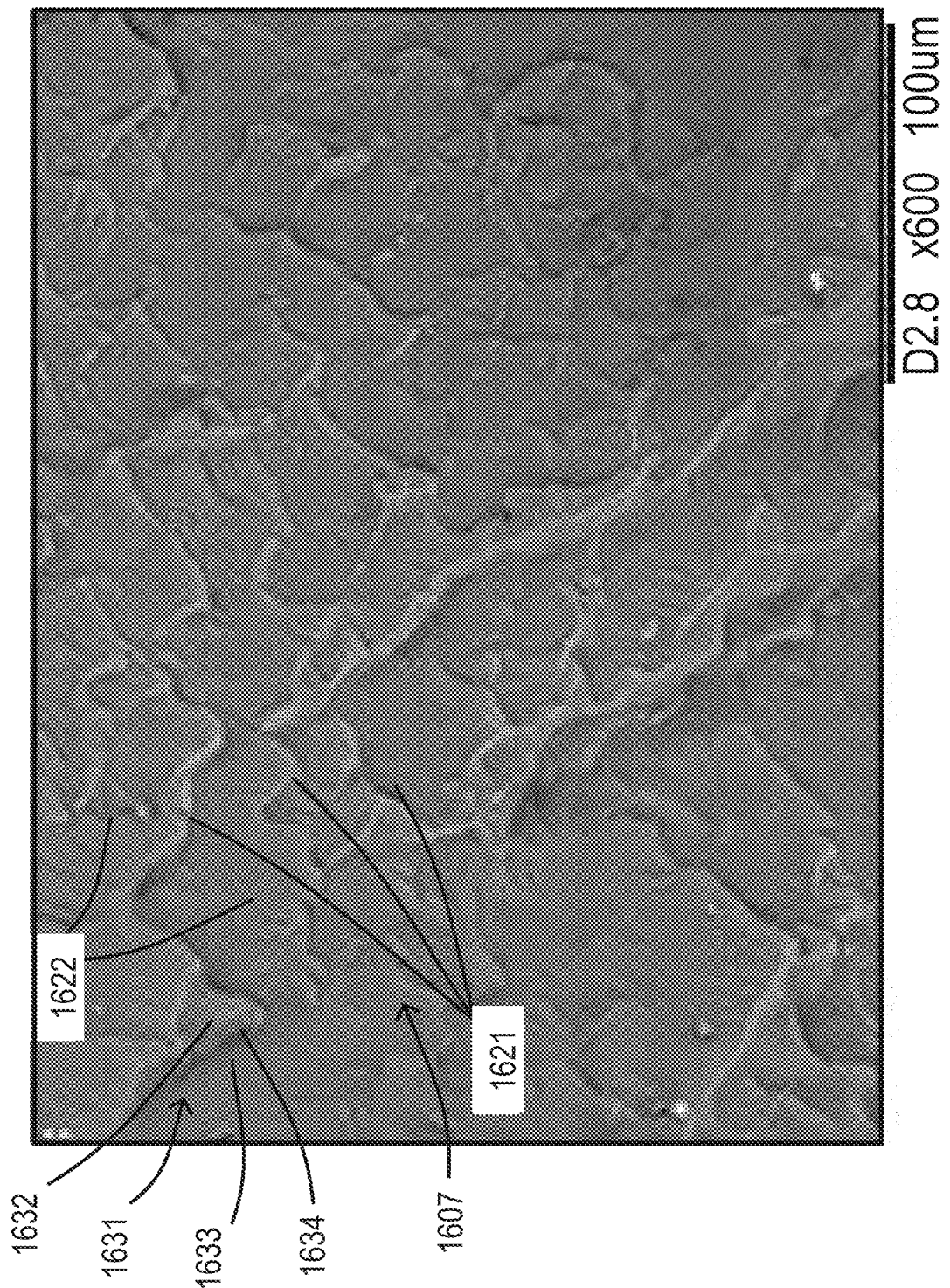
FIG. 16 includes an image of a portion of a side surface of an abrasive particle including scaled microridges according to an embodiment.

FIG. 16 includes an image of a portion of a side surface including scaled microridges according to an embodiment. As depicted, the scaled microridges 1607 can include a plurality of primary ridges 1621 extending in an irregular pathway and a plurality of wrinkles 1622 extending from, between, and/or across the plurality of primary ridges 1621. According to the embodiment depicted in FIG. 16, the scaled microridges 1607 can have a layered appearance, such that the surface appears to be made of a plurality of layers overlying each other. It will be appreciated that the scaled microridges 1607 may not actually include a plurality of layers, but the morphology of the scaled microridges 1607 provides such an appearance.

According to another embodiment, and as illustrated in FIG. 16, the scaled microridges 1607 may include one or more precipice regions 1631. The precipice regions 1631 can include a portion of the primary ridges or other raised portions of the scaled microridges 1607 that appear to rise sharply and away from the side surface and be separated from an underlying region by a shear face. The precipice regions 1631 may include, but need not necessarily include, an overhang or outcropping that may hang in space over the underlying region, like the crest of a wave. For example, the precipice region 1631 can include a raised portion 1632 that extends above an underlying region 1633. The raised portion 1632 and the underlying region 1633 can be separated from each other by a shear face 1634.

Figure 17:
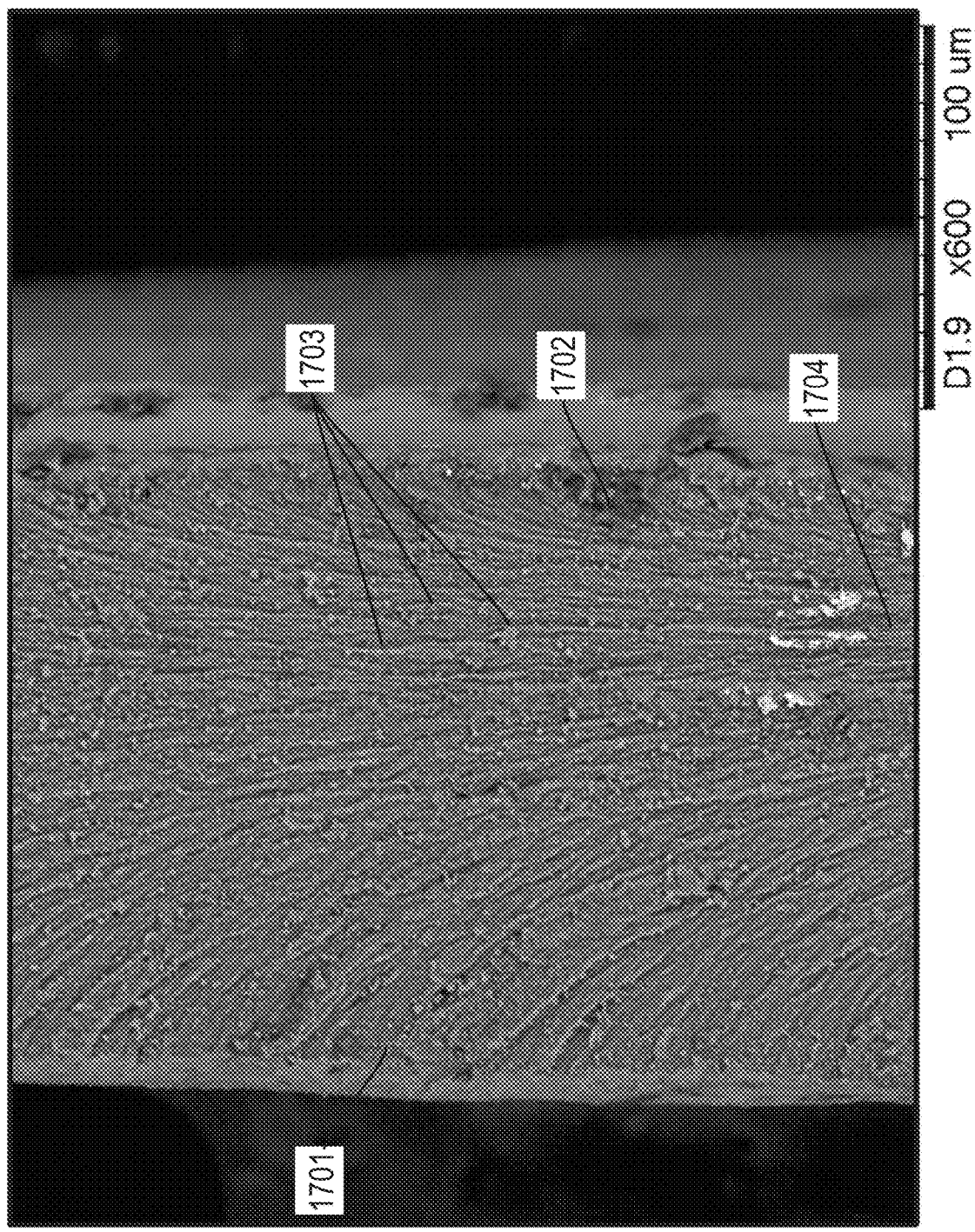
FIG. 17 includes an image of a portion of a side surface of an abrasive particle including expanding microridges according to an embodiment.

FIG. 17 includes an image of a side surface of an abrasive particle including another type of microridges according to an embodiment. The abrasive particle 1701 can include a side surface 1702 including a plurality of extending microridges 1703. As depicted, the plurality of extending microridges 1703 can be a different type of microridge compared to the isolated and scaled microridges in terms of their morphology. For example, as provided in FIG. 17, the plurality of extending microridges 1703 appears to be extending from a focal region 1704. That is, the plurality of extending microridges 1703 appears to be quite elongated, extending for significant distances along the side surface 1702 and extending away from a focal region 1704. The plurality of extending microridges 1703 can include tightly packed microridges compared to the scaled and isolated types of microridges. That is, the average distance between immediately adjacent microridges for the extending microridges 1703, can be smaller than the average distance between the isolated microridges or scaled microridges, where the average distance is measured as the average of the smallest distance between two immediately adjacent ridges. In at least one embodiment, the plurality of extending microridges 1703 can extend in multiple direction from the focal region 1704. Without wishing to be tied to a particular theory, the plurality of extending microridges 1703 may be formed during a high energy fracturing mode, wherein fracturing is initiated in the focal region 1704 and extends rapidly outward in all directions from the focal region 1704, thus facilitating the formation of the plurality of extending microridges 1703. Moreover, the fracturing conditions occurring during the formation of the plurality of extending microridges 1703 may be distinct from the fracturing conditions during the formation of other types of microridges, such as the isolated or scaled microridges.

Figure 18:
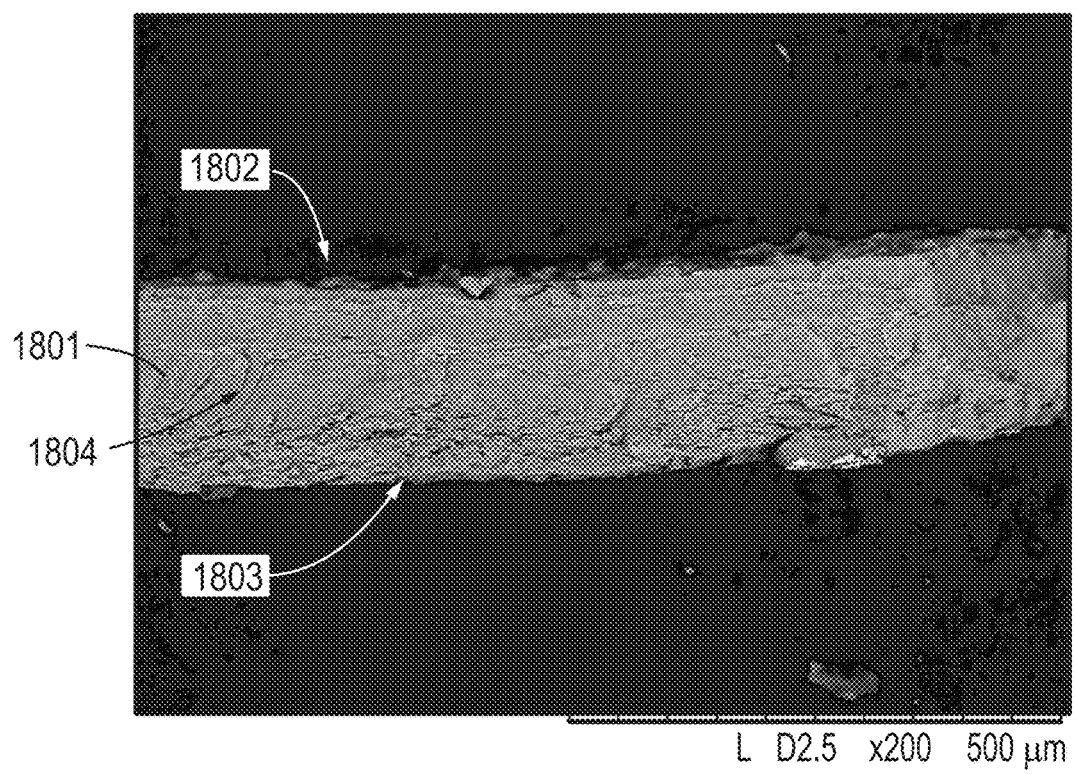
FIG. 18 includes a side view scanning electron microscope (SEM) image of an abrasive particle according to an embodiment.
Figure 19:
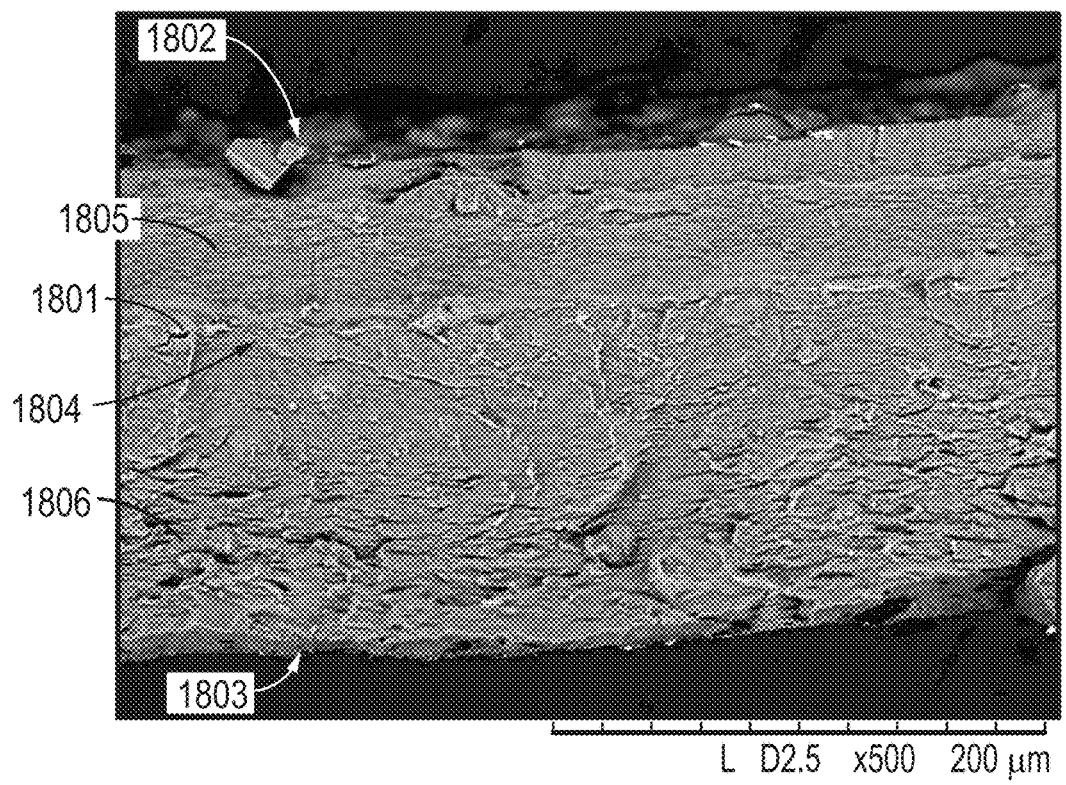
FIG. 19 includes a magnified SEM image of the side wall of the abrasive particle of FIG. 18.
Figure 20:
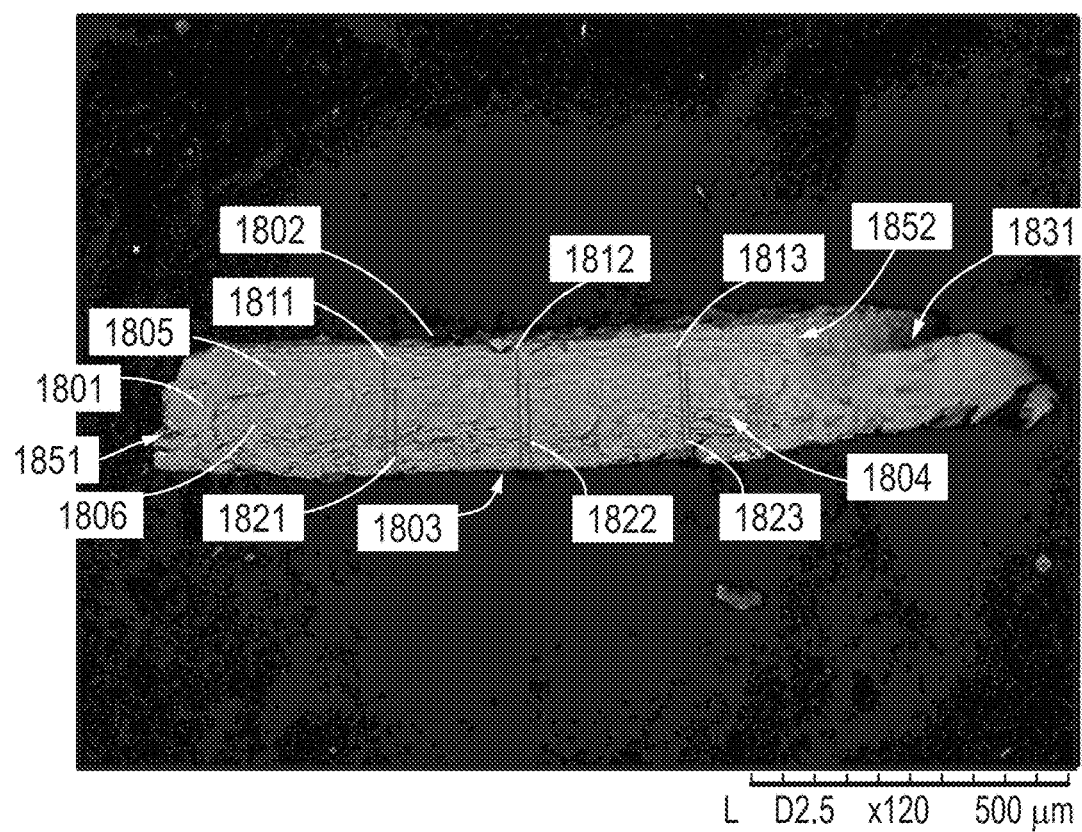
FIG. 20 includes the side view image of FIG. 18 marked for measurement of the height of the body and the second region.

In addition to or as an alternative to any of the features described herein, the abrasive particles formed through the methods described herein can have particular features, which may be associated with the side surface or portions of the side surface. FIG. 18 includes a side view image of an abrasive particle according to an embodiment. FIG. 19 includes a magnified image of a portion of the sidewall from FIG. 18. FIG. 20 includes the side view image of FIG. 18 marked for measurement of the height of the body and the second region. In one aspect, the body 1801 of the abrasive particle can include a first major surface 1802, a second major surface 1803 opposite the first major surface 1802, and a side surface 1804 extending between the first major surface 1802 and the second major surface 1803. Reference herein to a major surface of an abrasive particle may be reference to a surface that is larger than the other surfaces of the body. However, it is not necessary that one or more major surfaces always be the surface of the greatest area. In one embodiment, the side surface 1804 comprises a particular Mean Anisotropy Factor (MAF). The MAF can be associated with a single particle or a collection of particles. The MAF is an analysis technique used to measure the unique fracture signature associated with the side surface of particles formed according to the embodiments herein. Without wishing to be tied to a particular theory, it is suggested that the combination of parameters of the methods disclosed herein result in the formation of shaped abrasive particles with unique textures on portions of the sidewall that can be quantified by the MAF. MAF is measured by analyzing a side surface or portion of a side surface and taking a scanning electron micrograph image of approximately 1000× magnification with an appropriate contrast and resolution to clearly distinguish the features, such as provided in FIG. 18. Notably, if a portion of the sidewall appears to have greater texture than another portion, the analysis should be focused in this region (e.g., the region 1806 as provided in FIG. 19). The image is then analyzed with a Fourier Transform according to the equations provided below.

The definition of the Fourier Transform (FT) is given below:

$$FT: (u, v) \rightarrow \sum_{x,y=0}^{N-1} f(x, y) \cdot e^{-j 2\pi \cdot \frac{u \cdot x + v \cdot y}{N}}$$

It is implied that "f" is the original image and (x,y) its horizontal and vertical axes, and "F" is the Fourier Transform of the original image, and (u,v) its axis in the frequency space.

And where $j=\sqrt{-1}$ and "N" is the size of the original image in pixel.

By definition, we have FTi(FT(f))=f. The Fourier Transform F of the original image "f" can be written as follows:

$$F = A \times e^{-j\varphi}$$

Where:

$$A = \sqrt{\text{Re}(F)^2 + \text{Im}(F)^2} \text{ and } \varphi = \tan^{-1}\frac{\text{Re}(F)}{\text{Im}(F)}$$

We call "A" the magnitude of the Fourier Transform, and φ its phase. To calculate MAF we focus on the variable "A", as it is the magnitude that contains the information of interest.

A Principle Component Analysis (PCA) technique is then used to evaluate the image that is analyzed by the Fourier Transform. The Fourier Transform "F" may be considered as a probability distribution. Hence, "F" is normalized as follows:

$$p(u, v) = \frac{F(u, v)}{\sum_{u,v=1}^{N} F(u, v)} \text{ for } (u, v) \in [\![1, N]\!]$$

Now, let $$U = \begin{pmatrix} u \\ v \end{pmatrix}.$$

We compute the covariance COV of U:

$$COV = E[(U - E(U)) \times (U - E(U))^T]$$

Where E is defined as:

$$E: \begin{pmatrix} u \\ v \end{pmatrix} \rightarrow \sum_{u,v=1}^{N} p(u, v) \times \begin{pmatrix} u \\ v \end{pmatrix}$$

As F is symmetric, it follows that E(U)=0. Hence, we have:

$$COV = E(U \times U^T)$$

COV is symmetric and positive-definite matrix. Hence, it can be written as:

$$COV = M \begin{pmatrix} \sigma_1 & 0 \\ 0 & \sigma_2 \end{pmatrix} M^T \text{ with}$$

$$MM^T = Id$$

$\sigma_1$ and $\sigma_2$ are the principal components of F. We define the anisotropy factor γ as:

$$AF = \frac{\max(\sigma_1, \sigma_2) - \min(\sigma_1, \sigma_2)}{\min(\sigma_1, \sigma_2)} \times 100$$

A suitable programming language, such as Python (version 2.7), can be used to generate the Fourier Transform image from the original image. The computer program can also be used to calculate the Anistropy Factor (AF).

Figure 21A:
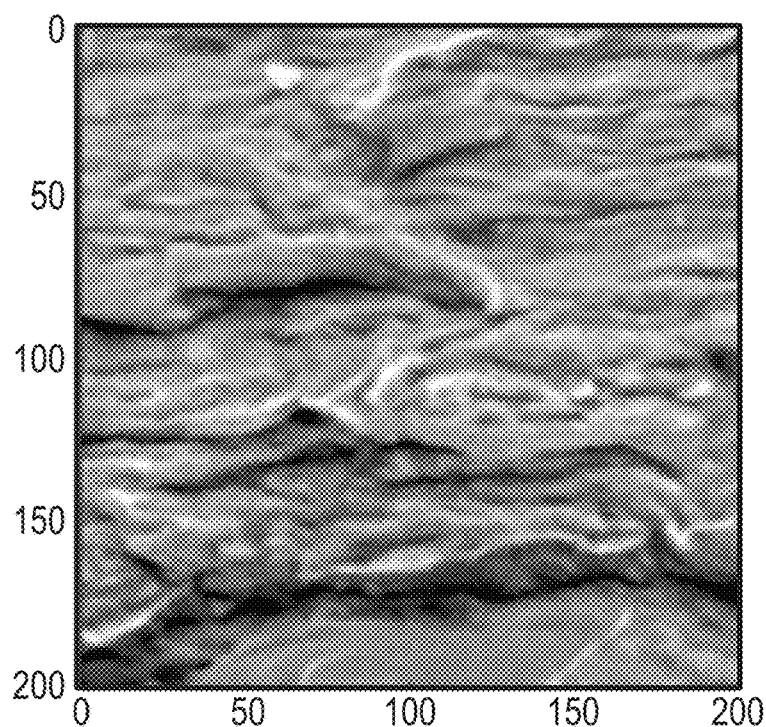
FIG. 21A includes a scanning electron microscope (SEM) image of a portion of a sidewall.

FIG. 21A includes an image of a portion of a side surface of a particle formed according to an embodiment. FIG. 21B includes an image of the application of the Fourier Transform to the image of FIG. 21A. As can be seen, the surface of FIG. 21A includes ridges having a predominate direction in the horizontal (i.e., left to right) direction. Such ridges may be the same as the microridges described in various embodiments herein. The Fourier Transform analyzes these features and creates the image of FIG. 21B, wherein a white cloud is presented that has more intense values in the vertical direction (up and down) compared to the horizontal direction. The PCA technique allows us to analyze and quantify the cloud depicted in FIG. 21B.

An abrasive particle of an embodiment herein may have a particular MAF, such as at least 1.25 or at least 1.30 or at least 1.40 or at least 1.50 or at least 1.60 or at least 1.70 or at least 1.80 or at least 1.90 or at least 2.00 or at least 2.10 or at least 2.20 or at least 2.30 or at least 2.40 or at least 2.50 or at least 2.60 or at least 2.70 or at least 2.80 or at least 2.90 or at least 3.00 or at least 3.10 or at least 3.20 or at least 3.30 or at least 3.40 or at least 3.50 or at least 3.60 or at least 3.70. Still, according to one non-limiting embodiment, an abrasive particle may have a MAF of not greater than 20, such as not greater than 15 or not greater than 12 or not greater than 10 or not greater than 8 or not greater than 7 or not greater than 6 or not greater than 5 or not greater than 4. It will be appreciated that the MAF can be within a range including any of the minimum and maximum values noted above. Such values and ranges of values are relevant to a collection of abrasive particles formed according to an embodiment.

In another embodiment, the Anisotropy Factor (AF) described in the equations above can be plotted for one or more grains to create a histogram of AF value versus frequency. From the histogram, one can calculate an Anisotropy Factor Standard Deviation (i.e., first standard deviation of the AF histogram). According to one embodiment, the Anisotropy Factor Standard Deviation can be at least 0.75, such as at least 0.8 or at least 0.85 or at least 0.90 or at least 1.00 or at least 1.05 or at least 1.10 or at least 1.20. Still, in another non-limiting embodiment, the Anisotropy Factor Standard Deviation can be not greater than 10, such as not greater than 9 or not greater than 8 or not greater than 7 or not greater than 6 or not greater than 5 or not greater than 4 or not greater than 3 or not greater than 2. It will be appreciated that the Anisotropy Factor Standard Deviation can be within a range including any of the minimum and maximum values noted above. Such values and ranges of values are relevant to a collection of abrasive particles formed according to an embodiment.

As noted herein, the MAF and Anisotropy Factor Standard Deviation can be generated for a single abrasive particle or a collection of abrasive particles. To quantify MAF and Anisotropy Factor Standard Deviation for a single abrasive particle, a suitable number of regions of the side surface should be sampled (e.g., at least 3 distinct regions) to generate a statistically relevant sample set. The MAF and Anisotropy Factor Standard Deviation should be measured at those regions that appear to have the greatest texture (e.g., microridges) to the extent that such regions are large enough for sampling. In some instances, such regions may be associated with controlled cracking during processing. As will be described in embodiments herein the MAF and Anisotropy Factor Standard Deviation can also be used to analyze a collection of abrasive particles. To calculate these values based on a collection of abrasive particles, at least 8 abrasive particles are randomly selected from the collection and three randomly selected regions of the side surface are analyzed. To the extent that certain regions of the side surface demonstrate greater texture, such as illustrated in FIG. 21A, such regions can be measured first presuming they are large enough for analysis.

According to another aspect, certain abrasive particles of the embodiments herein can have distinct regions, which may have a significantly different MAF and Anisotropy Factor Standard Deviation with respect to each other. For example as illustrated in FIG. 19, the side surface 1804 can have first region 1805 and a second region 1806. The first region 1805 and second region 1806 can abut one another on the side surface 1804. The first region 1805 can extend from the first major surface 1802 and the second region 1806 can extend from the second major surface 1803. According to one embodiment, the second region can have a MAF that is greater than the MAF of the first region. As will be appreciated, such a comparison requires that the MAF analysis be done separately on each of the regions 1805 and 1806 and then compared to each other. As noted in FIG. 19, the first region 1805 appears to have a smoother texture as compared to the second region 1806. The first region 1805 may be associated with the patterning process. The second region 1806 appears to have a rougher texture compared to the first region 1806, which may be associated with one or more processing variables including patterning leading to compression and/or controlled cracking. According to one embodiment, the difference in the MAF (i.e., MAFΔ=MAF2/MAF1, wherein MAF2 is the MAF of second region 1806 and MAF1 is the MAF of the first region 1805) between the first region 1805 and the second region 1806 can be at least 1, such as at least 1.2 or at least 1.4 or at least 1.6 or at least 1.8 or at least 2 or at least 2.2 or at least 2.4 or at least 2.6 or at least 2.8 or at least 3 or at least 3.5 or at least 4 or at least 5 or at least 6 or at least 7 or at least 8. Still, in one non-limiting embodiment, the different in MAF can be not greater than 1000 or not greater than 500 or not greater than 100 or not greater than 50 or not greater than 10 or not greater than 5. It will be appreciated that the difference in MAF between the first region 1805 and the second region 1806 can be within a range including any of the minimum and maximum values noted above. Such values and range of values are relevant to a collection of abrasive particles according to embodiments herein.

According to one embodiment, the first region 1805 of an abrasive particle can have a particular MAF. For example, the MAF can be not greater than 1.20, such as not greater than 1.10 or not greater than 1.00 or not greater than 0.90 or not greater than 0.80 or not greater than 0.70 or not greater than 0.60 or not greater than 0.50 or not greater than 0.40 or not greater than 0.30. Still, in one non-limiting embodiment, the MAF of the first region 1805 of an abrasive particle can be at least 0.30 or at least 0.40 or at least 0.50 or at least 0.60 or at least 0.70 or at least 0.80 or at least 0.90 or at least 1.00 or at least 1.10. It will be appreciated that the MAF of the first region 1805 can be within a range including any of the minimum and maximum values noted above. Such values and ranges of values are relevant to a collection of abrasive particles formed according to an embodiment.

In yet another aspect, the second region 1806 of an abrasive particle can have a particular MAF, such as at least 1.30 or at least 1.40 or at least 1.50 or at least 1.60 or at least 1.70 or at least 1.80 or at least 1.90 or at least 2.00 or at least 2.10 or at least 2.20 or at least 2.30 or at least 2.40 or at least 2.50 or at least 2.60 or at least 2.70 or at least 2.80 or at least 2.90 or at least 3.00 or at least 3.10 or at least 3.20 or at least 3.30 or at least 3.40 or at least 3.50 or at least 3.60 or at least 3.70. In another non-limiting embodiment, the MAF of the second region 1806 of an abrasive particle can be not greater than 20 or not greater than 15 or not greater than 12 or not greater than 10 or not greater than 8 or not greater than 7 or not greater than 6 or not greater than 5 or not greater than 4. It will be appreciated that the MAF of the second region 1806 of an abrasive particle can be within a range including any of the minimum and maximum values noted above. Such values and ranges of values are relevant to a collection of abrasive particles formed according to an embodiment.

As noted above, FIG. 20 includes a side view image of an abrasive particle according to an embodiment including markings indicating the relative height of the body at three places and the relative height of the second region 1806 at the same three places. Abrasive particles herein are described by a length, a width, and a height. The length is the longest dimensions, the width is the second longest dimension extending perpendicular to the length and within the same plane as the length, and the height of the body is the shortest dimension extending perpendicular to the length and perpendicular to the plane of the length and width. Identifying and measuring the length, width, and height of shaped abrasive particles and constant height abrasive particles is straightforward. Identifying and measuring the length, width, and height of crushed or irregularly shaped abrasive particles is not as simple. Accordingly, to measure the height of irregularly shaped abrasive particles, a randomly selected sample of the abrasive particles is placed on a surface and vibrated. The abrasive particles are presumed to have aligned with their longest axis parallel to the surface and thus the height is presumed to be the dimension extending perpendicular to the surface and the length. After vibrating the abrasive particles to identify the side surfaces, the abrasive particles are transferred to an adhesive surface using tweezers such that the side surface is visible when viewed top-down. The grains are then prepared for imaging analysis (e.g., optical microscope, SEM, etc.)

As illustrated in FIG. 20, in certain instances, the second region 1806 may have a particular average height relative to the average height of the body 1801 and relative to the average height of the first region 1805. For example, in one embodiment the second region 1806 can extend for a greater percentage of the height as compared to the first region 1805. The average height of the body 1801 or any regions (e.g., first and second regions 1805 and 1806) can be measured using an image as illustrated in FIG. 20 and an imaging processing software such as ImageJ. A first line 1812 is drawn approximately in the middle of the side surface 1804 between the two exterior corners 1851 and 1852. The first line 1811 is drawn to be approximately perpendicular to at least one of the first and second major surfaces 1802 and 1803. A second line 1811 is drawn to the left of the first line 1812 at a distance approximately midway between the first exterior corner 1851 and the first line 1812. A third line 1813 is drawn to the right of the first line 1812 at a distance approximately midway between the second exterior corner 1852 and the first line 1812. The lengths of the lines 1811, 1812, and 1813 are then averaged to define the average height of the body 1801. The same process can be completed to measure the average height of the second region 1806 as illustrated by the lines 1821, 1822, and 1823.

According to one embodiment, the first region 1805 can have an average height of not greater than 90% of the height of the body 1801, such as not greater than 80% or not greater than 70% or not greater than 60% or not greater than 50% or not greater than 40% or not greater than 30% or not greater than 20% or not greater than 10% or not greater than 5%. Still, in another embodiment, the first region 1805 can have an average height of at least 1% of the height of the body or at least 2% or at least 5% or at least 8% or at least 10% or at least 15% or at least 20% or at least 30% or at least 40% or at least 50% or at least 60% or at least 70% or at least 80%. It will be appreciated that the first region 1805 can have an average height within a range including any of the minimum and maximum percentages noted above. In instances where the side surface clearly has only a first and second region (e.g., FIG. 20), the average height of the first region 1805 can be calculated by subtracting the average height of the second region 1806 from the average height the body 1801. Alternatively, one may measure the average height of the first region 1805 using the same process as described to measure the height of the second region 1806, except taking care to measure only that portion relevant to the first region 1805.

In another embodiment, the second region 1806 can have an average height of not greater than 90% of the height of the body 1801 or not greater than 80% or not greater than 70% or not greater than 60% or not greater than 50% or not greater than 40% or not greater than 30% or not greater than 20% or not greater than 10% or not greater than 5%. In still another non-limiting embodiment, the second region 1806 can have an average height of at least 5% of the height of the body or at least 8% or at least 9% or at least 10% or at least 12% or at least 15% or at least 20% or at least 25% or at least 30% or at least 40% or at least 50% or at least 60% or at least 70% or at least 80% or at least 90%. It will be appreciated that the second region 1806 can have an average height within a range including any of the minimum and maximum percentages noted above. Such values and range of values are relevant to a collection of abrasive particles according to embodiments herein.

In certain instances, the abrasive particles of the embodiments herein can have a particular shape on the side surface. As illustrated in FIGS. 18 and 20, the sidewall 1804 can have a first region 1805 and a second region 1806 that can define a stepped region on the side surface of the body 1801. That is, the second region 1806 can extend away from the body further than the first region 1805, defining a step surface 1831 that may have a least a portion extending substantially parallel to the first major surface 1802 and/or the second major surface 1803.

As is evidence from the images provided in FIGS. 18-20, the second region 1806 of the side surface 1804 may have a texture that can be in the form of a plurality of microridges as described in other embodiments herein. In certain instances, the plurality of microridges can extend in substantially the same direction relative to each other. It will be appreciated that any of the particles of any of the embodiments herein can include one or more of a variety of features described in any of the embodiments herein.

As described in more detail herein, any one of the features described in the embodiments herein can be associated with a collection of abrasive particles. Moreover, it will be appreciated that various combinations of the other features described in embodiments herein can be present in a collection of abrasive particles. A collection of abrasive particles can be a plurality, and more particularly, a portion of abrasive particles present in a fixed abrasive article. The collection can be, but need not necessarily be, formed according to an embodiment. The collection of abrasive particles may in some circumstances include all particles that are part of a fixed abrasive. Alternatively, a collection of abrasive particles may be a portion of free abrasive particles that are not part of a fixed abrasive article.

In one aspect, a collection of abrasive particles can include abrasive particles having a body including a first major surface, a second major surface opposite the first major surface, and a side surface extending between the first major surface and the second major surface. The collection of abrasive particles may have a particular Mean Non-Convexity Factor (MNCF). The MNCF is used to describe the two-dimensional shape of the abrasive particles and is a mean value generated from evaluating the non-convexity factor, which is calculated from a two-dimensional, top-down image of the abrasive particles. It should be noted that a randomly selected abrasive particles are placed on a surface and vibrated. The abrasive particles are presumed to have aligned with their longest axis parallel to the surface and the particles are imaged in such a position or transferred carefully to a suitable surface, being careful to maintain the orientation obtained after vibration, to be mounted for imaging.

As an example, FIGS. 22A, 22B and 22C include top-down images of the first major surface of an abrasive particle according to an embodiment. The image of FIG. 22A was obtained using X-ray microscopy, but one may use other suitable techniques to obtain a clear top-down image of the abrasive particles. After obtaining a suitable image as shown in FIG. 22A, a binary image (i.e., only black and white) can be created by choosing an appropriate threshold gray scale value that distinguishes black and white and clearly delineate the edge of the particle from the back ground. Imaging software such as ImageJ may be used. The original area of the abrasive particle is calculated by the imaging software using the binary image. Using the imaging software, a convex hull image is created as shown in FIG. 22C. The convex hull defines the maximum area of the two-dimensional image by identifying the exterior corners and drawing straight lines between those corners. The convex hull area is measured using the image of FIG. 22C. The non-convexity factor (NCF) is then calculated according to the equation NCF=(1−(original area/convex hull area))×100. This process can be repeated for a suitable number of randomly sampled particles of the collection and then plotted as a histogram of non-convexity factor versus frequency. The MNCF can be calculated from the histogram by identifying the mean value.

According to one aspect, a collection of abrasive particles according to an embodiment can have a MNCF of at least 3.5, such as at least 3.75 or at least 4.0 or at least 4.5 or at least 5.0 or at least 5.5 or at least 6.0 or at least 6.5 or at least 7.0 or at least 7.5 or at least 8.0 or at least 8.5 or at least 9.0. Still, in another non-limiting embodiment, the MNCF can be not greater than 30 or not greater than 25 or not greater than 20 or not greater than 18 or not greater than 15 or not greater than 14 or not greater than 13 or not greater than 12 or not greater than 11 or not greater than 10.5. The MNCF can be within a range including any of the minimum and maximum values noted above. It should be noted that the MNCF of the abrasive particles of the embodiments herein may differ significantly from those of shaped abrasive particles, which are formed through different processes and typically have a higher degree of shape fidelity and lower MNCF compared to each other.

Using the histogram of NCF versus frequency one may also evaluate the Non-Convexity Factor Standard Deviation (NCFSD) of the sampling of abrasive particles from the collection of abrasive particles. The NCFSD is a first standard deviation measurement presuming a Gaussian distribution of the data and may indicate the variation in the non-convexity values. According to one embodiment, the abrasive particles of the collection can have a NCFSD of at least 2.4, such as at least 2.5 or at least 2.6 or at least 2.7 or at least 2.8 or at least 2.9 or at least 3.0 or at least 3.1 or at least 3.2 or at least 3.3 or at least 3.4 or at least 3.5. Still, in one non-limiting embodiment, the abrasive particles of the collection can have a NCFSD that is not greater than 30, such as not greater than 25 or not greater than 20 or not greater than 15 or not greater than 10 or not greater than 8 or not greater than 6 or not greater than 4. The NCFSD can be within a range including any of the minimum and maximum values noted above.

The collection of abrasive particles can have any of the features noted in other embodiments, including for example, but not limited to MAF, Anisotropy Factor Standard Deviation, difference in MAF between a first and second region of the side surface, average height of a first region, average height of a second region, difference in relative average heights of the first and second regions to each other, the average height of the first region relative to the average height of the body, the average height of the second region relative to the average height of the body or any combination thereof. The values of any of the features of embodiments herein can be equally applicable to a collection of abrasive particles, with the difference being that any features are measured from a suitable sampling of randomly selected abrasive particles as opposed to a single abrasive particle.

According to one embodiment, the collection of abrasive particles may have a particular standard deviation of height. The height is measured as noted herein along the side surface in a direction substantially perpendicular to at least one of the first or second major surfaces. The forming processes of the embodiments herein may facilitate formation of abrasive particles having a controlled height and particular standard deviation of height, such as not greater than 100 microns or not greater than 90 microns or not greater than 85 microns or not greater than 80 microns or not greater than 75 microns or not greater than 70 microns or not greater than 65 microns or not greater than 60 microns or not greater than 55 microns or not greater than 50 microns or not greater than 45 microns or not greater than 40 microns or not greater than 35 microns. Still, in one non-limiting embodiment, the abrasive particles of the collection can have a standard deviation of height of at least 1 micron, such as at least 5 microns or at least 10 microns or at least 15 microns or at least 20 microns or at least 25 microns or at least 30 microns or at least 35 microns. It will be appreciated that the standard deviation of height for the collection of abrasive particles can be within a range including any of the minimum and maximum values noted above.

Figure 10:
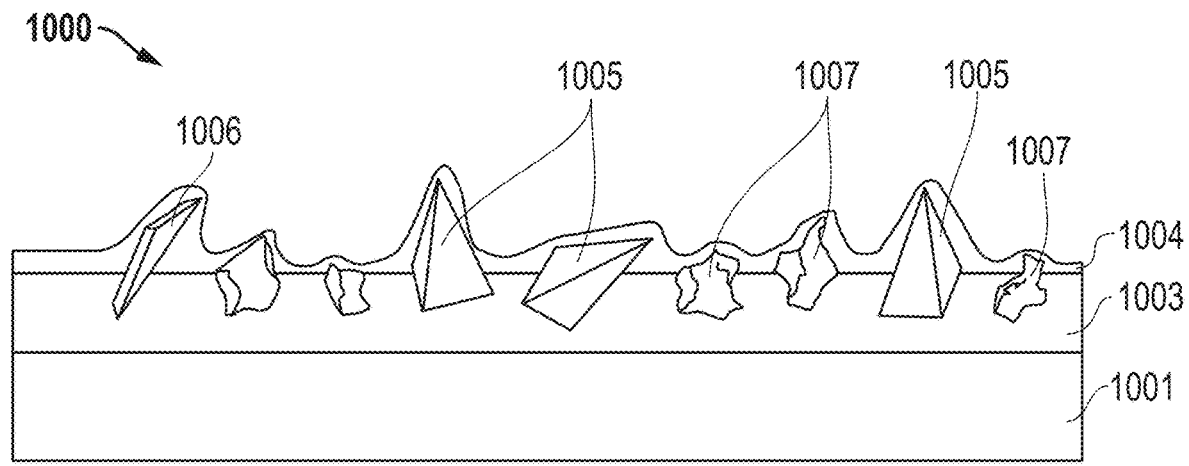
FIG. 10 includes a cross-sectional illustration of a coated abrasive article according to an embodiment.

FIG. 10 includes a cross-sectional illustration of a coated abrasive article incorporating the abrasive particulate material in accordance with an embodiment. Notably, the plurality of abrasive particles on the one or more surfaces of the abrasive particles are not illustrated, but will be appreciated as being present in accordance with embodiments herein. As illustrated, the coated abrasive 1000 can include a substrate 1001 and a make coat 1003 overlying a surface of the substrate 1001. The coated abrasive 1000 can further include a first type of abrasive particulate material 1005 in the form of a first type of abrasive particle (e.g., shaped, CHAP, unshaped or irregular, etc.), a second type of abrasive particulate material 1006 in the form of a second type of abrasive particle (e.g., shaped, CHAP, unshaped or irregular, etc.), and a third type of abrasive particulate material in the form of diluent abrasive particles, which may have a random shape. The coated abrasive 1000 may further include size coat 1004 overlying and bonded to the abrasive particulate materials 1005, 1006, 1007, and the make coat 1004.

According to one embodiment, the substrate 1001 can include an organic material, inorganic material, and a combination thereof. In certain instances, the substrate 1001 can include a woven material. However, the substrate 1001 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1003 can be applied to the surface of the substrate 1001 in a single process, or alternatively, the abrasive particulate materials 1005, 1006, 1007 can be combined with a make coat 1003 material and applied as a mixture to the surface of the substrate 1001. Suitable materials of the make coat 1003 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 1003 can include a polyester resin. The coated substrate can then be heated in order to cure the resin and the abrasive particulate material to the substrate. In general, the coated substrate 1001 can be heated to a temperature of between about 100° C. to less than about 250° C. during this curing process.

Moreover, it will be appreciated that the coated abrasive article can include one or more collections of various types of abrasive particles, including the abrasive particulate materials 1005, 1006, and 1007, which may represent the abrasive particles of the embodiments herein. The embodiments herein can include a fixed abrasive article (e.g., a coated abrasive article) having a first collection of abrasive particles (e.g., abrasive particulate materials 1005) representative of the abrasive particles of the embodiments herein. Any fixed abrasive may further employ a second collection of abrasive particles therein, which may be representative of another type of abrasive particle according to the embodiments herein, which may be distinct in one or more manners from the abrasive particles of the first collection, including but not limited to, one or more abrasive characteristics as described herein. The same features may be utilized in a bonded abrasive article.

The abrasive particulate materials 1005, 1006, and 1007 can include different types of abrasive particles according to embodiments herein. The different types of abrasive particles can differ from each other in composition, two-dimensional shape, three-dimensional shape, size, and a combination thereof as described in the embodiments herein. As illustrated, the coated abrasive 1000 can include a first type of abrasive particle 1005 and a second type of shaped abrasive particle 1006. The coated abrasive 1000 can include different amounts of the first type and second type of abrasive particles 1005 and 1006. It will be appreciated that the coated abrasive may not necessarily include different types of abrasive particles, and can consist essentially of a single type of abrasive particle. As will be appreciated, the abrasive particles of the embodiments herein can be incorporated into various fixed abrasives (e.g., bonded abrasives, coated abrasive, non-woven abrasives, thin wheels, cut-off wheels, reinforced abrasive articles, and the like), including in the form of blends, which may include different types of shaped abrasive particles, shaped abrasive particles with diluent particles, and the like. Moreover, according to certain embodiments, a batch of particulate material may be incorporated into the fixed abrasive article in a predetermined orientation, wherein each of the abrasive particles can have a predetermined orientation relative to each other and relative to a portion of the abrasive article (e.g., the backing of a coated abrasive).

The abrasive particles 1007 can be diluent particles different than the first and second types of abrasive particles 1005 and 1006. For example, the diluent particles can differ from the first and second types of abrasive particles 1005 and 1006 in composition, two-dimensional shape, three-dimensional shape, size, and a combination thereof. For example, the abrasive particles 1007 can represent conventional, crushed abrasive grit having random shapes. The abrasive particles 1007 may have a median particle size less than the median particle size of the first and second types of abrasive particles 1005 and 1006.

After sufficiently forming the make coat 503 with the abrasive particulate materials 1005, 1006, 1007 contained therein, the size coat 1004 can be formed to overlie and bond the abrasive particulate materials 1005, 1006, 1007 in place. The size coat 1004 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 11:
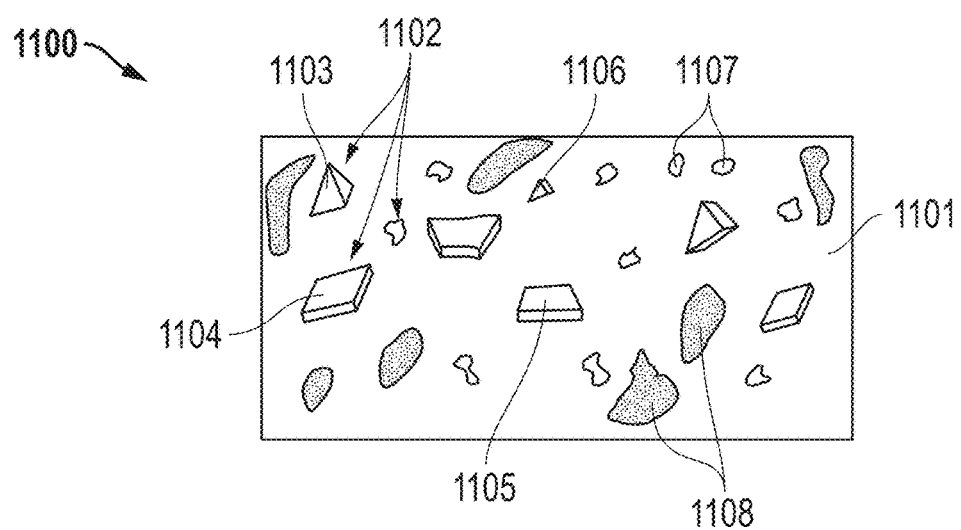
FIG. 11 includes a cross-sectional illustration of a bonded abrasive article according to an embodiment.
Figure 12A:
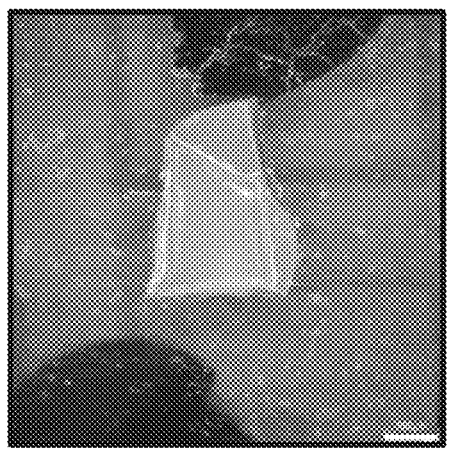
FIGS. 12A-12J include top-down images of abrasive particles from a collection of abrasive particles according to an embodiment.
Figure 12B:
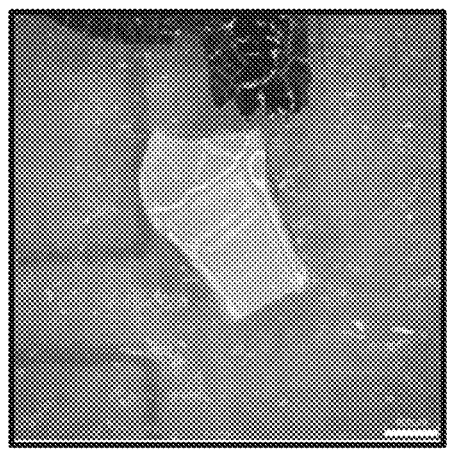
Figure 12C:
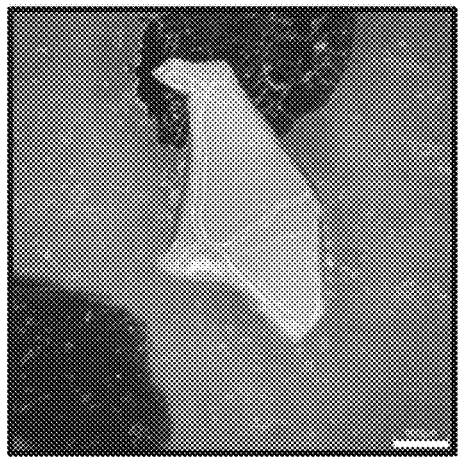
Figure 12D:
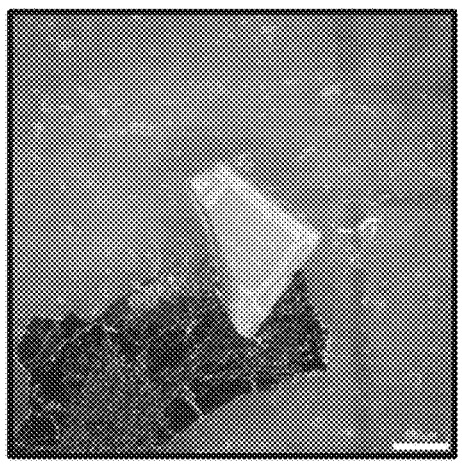
Figure 12E:
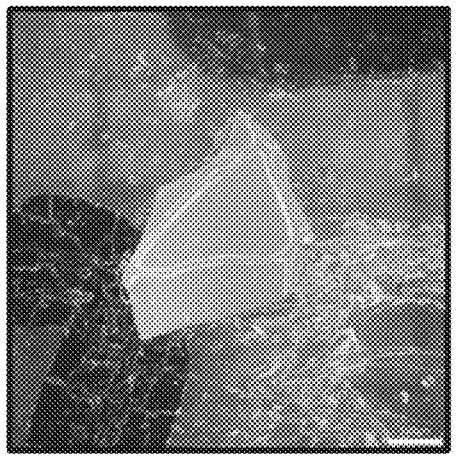
Figure 12F:
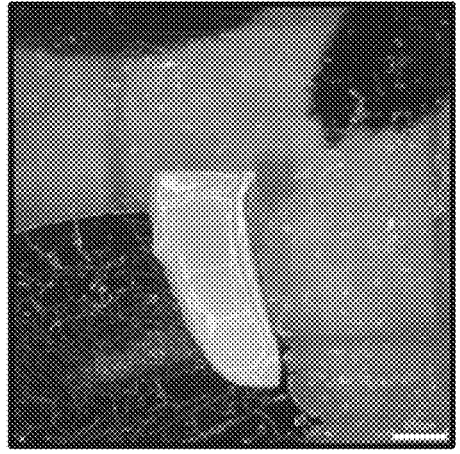
Figure 12G:
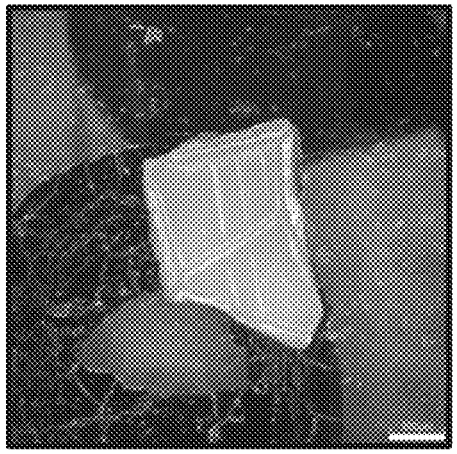
Figure 12H:
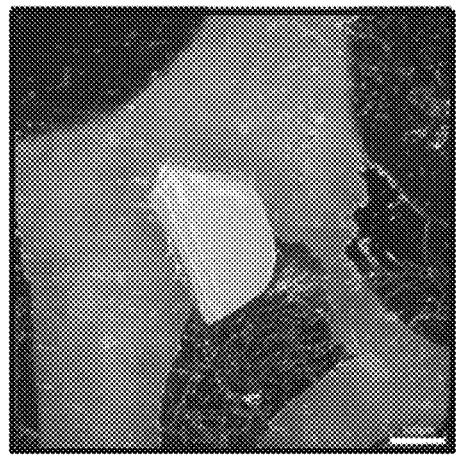
Figure 12I:
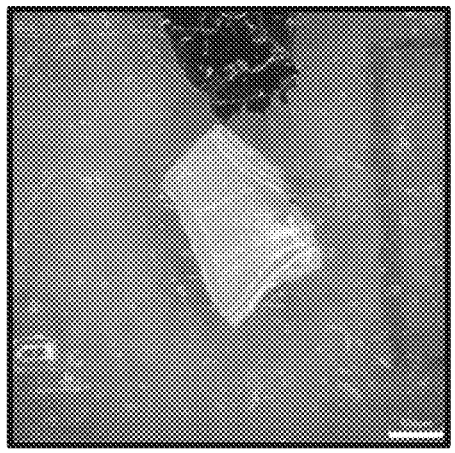
Figure 12J:
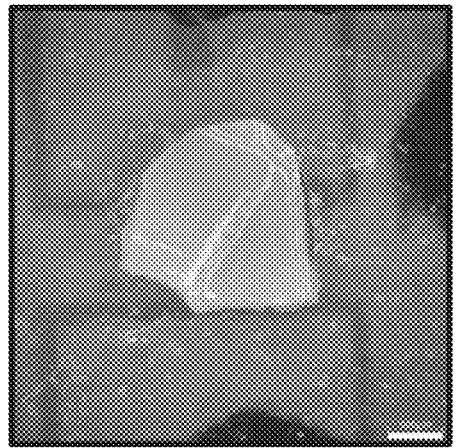

FIG. 11 includes an illustration of a bonded abrasive article incorporating the abrasive particulate material in accordance with an embodiment. As illustrated, the bonded abrasive 1100 can include a bond material 1101, abrasive particulate material 1102 contained in the bond material, and porosity 1108 within the bond material 1101. In particular instances, the bond material 1101 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

The abrasive particulate material 1102 of the bonded abrasive 1100 can include different types of abrasive particles 1103, 1104, 1105, and 1106, which can have any of the features of different types of abrasive particles as described in the embodiments herein (e.g., shaped, CHAP, etc.). Notably, the different types of abrasive particles 1103, 1104, 1105, and 1106 can differ from each other in composition, two-dimensional shape, three-dimensional shape, size, and a combination thereof as described in the embodiments herein.

The bonded abrasive 1100 can include a type of abrasive particulate material 1107 representing diluent abrasive particles, which can differ from the different types of abrasive particles 1103, 1104, 1105, and 1106 in composition, two-dimensional shape, three-dimensional shape, size, and a combination thereof.

The porosity 1108 of the bonded abrasive 1100 can be open porosity, closed porosity, and a combination thereof. The porosity 1108 may be present in a majority amount (vol %) based on the total volume of the body of the bonded abrasive 1100. Alternatively, the porosity 1108 can be present in a minor amount (vol %) based on the total volume of the body of the bonded abrasive 1100. The bond material 1101 may be present in a majority amount (vol %) based on the total volume of the body of the bonded abrasive 1100. Alternatively, the bond material 1101 can be present in a minor amount (vol %) based on the total volume of the body of the bonded abrasive 1100. Additionally, abrasive particulate material 1102 can be present in a majority amount (vol %) based on the total volume of the body of the bonded abrasive 1100. Alternatively, the abrasive particulate material 1102 can be present in a minor amount (vol %) based on the total volume of the body of the bonded abrasive 1100.

FIGS. 12A-12J include images of abrasive particles formed according to the processes herein and define a collection of abrasive particles. A collection of abrasive particles can include a group of particles that are associated with a single abrasive article. In other instances, a collection of abrasive particles may include a plurality of particles produced in the same batch according to the same processing conditions.

According to one embodiment, a collection of abrasive particles can include at least a first abrasive particle and a second abrasive particle, wherein the first abrasive particle has a different two-dimensional shape compared to the two-dimensional shape of the second abrasive particle. The two-dimensional shape is the shape of the particle as viewed top-down in the plane defined by the length and width of the particle body. For example, the particle of FIG. 12A has a different two-dimensional shape as compared to the two-dimensional shape of the particle of FIG. 12B. Notably, the abrasive particles of FIGS. 12A and 12B have irregular two-dimensional shapes characterized by side surface portions that have a combination of linear and arcuate shapes. The other abrasive particles of the collection, some of which are illustrated in FIGS. 12C-12J can also have the same distinct two-dimensional shapes with respect to each other.

Moreover, as illustrated in FIGS. 12A-12J and according to one embodiment, the abrasive particles of the collection can include any combination of features of other abrasive particles described in the embodiments herein. For example, the abrasive particles of FIGS. 12A-12J can include one or more surface features (e.g., protrusions and/or depressions), untextured regions, planar surfaces, linear or arcuate edges, or any combination thereof. Moreover, the arrangement of the surface features between the particles within the collection of abrasive particles can vary. As illustrated in FIGS. 12A-12J, each of the particles has a different arrangement of protrusions on the first major surface compared to the other particles of the collection.

The collection of abrasive particles can be incorporated into fixed abrasive, such as a coated abrasive, bonded abrasive, and the like. Within a collection there may be groups of particles. Groups of particles are particles that have the same two-dimensional shape with respect to each other. For example, a collection of abrasive particles can include a first group of abrasive particles, wherein each of the particles of the first group has substantially the same two-dimensional shape. Referring again to FIGS. 8A-8B and 9A-9E, each of the particles in the illustrated images has a generally quadrilateral two-dimensional shape and therefore can belong to the same group of abrasive particles. Particles of the same group may have, but need not necessarily have, the same arrangement of surface features (e.g., protrusions, depressions, untextured regions, etc.). Suitable examples of the various two-dimensional shapes include any of the two-dimensional shapes noted in the embodiments herein, including for example, but not limited to an irregular shape, a polygonal shape, a regular polygonal shape, an irregular polygonal shape, numerals, Greek alphabet characters, Latin alphabet characters, Russian alphabet characters, complex shapes having a combination of polygonal shapes, a shape with linear and curved portions, or any combination thereof.

It will be appreciated that the embodiments herein also include a collection of abrasive particles including at least one abrasive particle having a plurality of microridges along the side surface of the body. Reference herein to the microridges will be understood to be reference to any type of the microridges or a combination of types of microridges. More particularly, in one embodiment, a majority of the abrasive particles of the collection of abrasive particles can include a plurality of microridges on at least a portion of the side surfaces. For example, in at least one aspect, at least 51% of the abrasive particles of the collection of abrasive particles include the plurality of microridges on at least a portion of their side surface, such as at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 92% or at least 94% or at least 96% or at least 98% or at least 99% of the abrasive particles of the collection of abrasive particles. Still, in at least one non-limiting embodiment, not greater than 99% of the abrasive particles of the collection of abrasive particles may include the plurality of microridges on at least a portion of the side surface, such as, not greater than 98% or not greater than 96% or not greater than 94% or not greater than 92% or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52% of the abrasive particles of the collection of abrasive particles. It will be appreciated that the percentage of abrasive particles in the collection of abrasive particles including the plurality of microridges on at least a portion of the side surfaces can be within a range including any of the minimum and maximum percentages noted above.

In yet another embodiment, a majority of the total surface area of the side surfaces of the abrasive particles in the collection can include a plurality of microridges. For example, at least 51% of the total surface area of the side surfaces of the abrasive particles of the collection can include the plurality of microridges or at least 52% or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 92% or at least 94% or at least 96% or at least 98% or at least 99%. In one non-limiting embodiment, not greater than 99% of the total surface area of the sides surfaces of the abrasive particles of the collection can include the plurality of microridges, such as, not greater than 98% or not greater than 96% or not greater than 94% or not greater than 92% or not greater than 90% or not greater than 88% or not greater than 86% or not greater than 84% or not greater than 82% or not greater than 80% or not greater than 78% or not greater than 76% or not greater than 74% or not greater than 72% or not greater than 70% or not greater than 68% or not greater than 66% or not greater than 64% or not greater than 62% or not greater than 60% or not greater than 58% or not greater than 56% or not greater than 54% or not greater than 52%. It will be appreciated that the total surface area of the side surface of the abrasive particles in the collection including the plurality of microridges can be within a range including any of the minimum and maximum percentages noted above.

In yet another aspect, the side surfaces of the bodies of the abrasive particles having side surface portions, where each side surface portion is that portion of the side surface extending between external corners of the body. Generally, each abrasive particle has at least three side surface portions extending around the peripheral surface of the body between the first and second major surfaces. For at least one embodiment, the collection of abrasive particles can be formed such that at least one abrasive particle in the collection has at least 45% of the side surface portions of the body including the plurality of microridges. In another embodiment, at least 10% of the abrasive particles of the collection have at least 45% of the side surface portion of the body including the plurality of microridges. In other instances, the percentage of abrasive particles in the collection having at least 45% of the side surface portions of the body including the plurality of microridges can be greater, such as at least 20% or at least 30% or at least 40% or at least 50% or at least 60% or at least 70% or at least 80% or at least 90% or at least 95% It will be appreciated that in one embodiment, each of the abrasive particles of the collection can include at least 45% of the side surface portions of the body including the plurality of microridges. Still, in one non-limiting embodiment, the percentage of abrasive particles of the collection including at least 45% of the side surface portions of the body including the plurality of microridges can be not greater than 98% or not greater than 90% or not greater than 80% or not greater than 70% or not greater than 60% or not greater than 50% or not greater than 40% or not greater than 30% or not greater than 20% or not greater than 10%. It will be appreciated that the percentage of abrasive particles of the collection having at least 45% of the side surface portions of the body including the plurality of microridges can be within a range including any of the minimum and maximum values noted above.

In still another embodiment, the collection of abrasive particles can include abrasive particles having a greater percentage of the side surface portions including the plurality of microridges. For example, at least 52% of the side surface portions of the body include the plurality of microridges, or at least 54% or at least 56% or at least 58% or at least 60% or at least 62% or at least 64% or at least 66% or at least 68% or at least 70% or at least 72% or at least 74% or at least 76% or at least 78% or at least 80% or at least 82% or at least 84% or at least 86% or at least 88% or at least 90% or at least 92% or at least 94% or at least 96% or at least 98% or at least 99% of the side surface portions of the body include the plurality of microridges. It will be appreciated that the percentage of side surface portions including the plurality of microridges can be combined with any of the foregoing percentages of particle in the collection identified as having the plurality of microridges. For example, it is contemplated that in certain embodiments, at least 10% of the abrasive particles of the collection can have at least 50% of their side surface portions having the plurality of microridges. In another example, at least 50% of the abrasive particles of the collection may have at least 50% of their side surface portions having the plurality of microridges. And as a further example, in another embodiment, it may be noted that at least 70% of the abrasive particles of the collection may have at least 60% of their side surface portions having the plurality of microridges. And yet in another embodiment, each of the abrasive particles of the collection can have all side surface portions including the plurality of microridges.

The formation of a collection of abrasive particles, which may or may not have discrete groups of abrasive particles in the collection may be controlled by one or more process parameters, including but not limited to, the shape of the form used to modify the mixture, the modification process, the drying process, and the like. It will be appreciated that a collection of abrasive particle can include a plurality of groups of abrasive particles, and particularly, more than two distinct groups of abrasive particles.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A method for making abrasive particles comprising:
forming a mixture into a body, wherein the mixture comprises a ceramic;
deforming at least a portion of the body to create at least one crack initiation point; and
drying the body under controlled cracking conditions to fracture the body into a plurality of precursor abrasive particles, wherein controlled cracking conditions include controlled crack propagation from the at least one crack initiation point.

Embodiment 2

A method for making abrasive particles comprising:
forming a mixture into a body having a major surface area of at least 10 cm2, wherein the mixture comprises a ceramic;
forming a controlled distribution of features in at least a portion of the body; and
drying to induce cracking of the body and formation of a plurality of precursor abrasive particles, wherein at least a portion of the plurality of precursor abrasive particles have a portion of the controlled distribution of features formed in the body.

Embodiment 3

A method for making abrasive particles comprising:
forming a mixture into a body, wherein the mixture comprises a ceramic;
modifying the body to change the stress within the body; and
drying the body to induce cracking of the body and formation of a plurality of precursor abrasive particles.

Embodiment 4

The method of any one of embodiments 1, 2, and 3, wherein drying the body comprises forming microridges on at least a portion of a side surface of at least one of the abrasive particles.

Embodiment 5

The method of any one of embodiments 1, 2, and 3, wherein drying the body comprises forming microridges on at least a portion of a side surface of a majority of the abrasive particles.

Embodiment 6

The method of any one of embodiments 1, 2, and 3, wherein drying the body comprises forming microridges on a majority of the side surface of a majority of the abrasive particles.

Embodiment 7

The method of any one of embodiments 1, 2, and 3, wherein drying the body comprises forming microridges on at least a portion of a side surface of each of the abrasive particles.

Embodiment 8

The method of embodiment 1, wherein deforming at least a portion of the body includes forming a controlled distribution of features in at least a portion of the body.

Embodiment 9

The method of embodiment 3, wherein modifying the body includes deforming at least a portion of the body.

Embodiment 10

The method of embodiment 9, wherein modifying includes changing a physical feature of the body.

Embodiment 11

The method of embodiment 9, wherein modifying includes changing a chemical composition of the body.

Embodiment 12

The method of embodiment 9, wherein modifying includes changing a rheological property of the body.

Embodiment 13

The method of embodiment 9, wherein modifying includes applying at least one additive to at least a portion of the body.

Embodiment 14

The method of embodiment 9, wherein modifying includes forming a controlled distribution of features in at least a portion of the body.

Embodiment 15

The method of any one of embodiments 2, 8, and 14, wherein the controlled distribution of features includes a random distribution of features.

Embodiment 16

The method of any one of embodiments 2, 8, and 14, wherein the controlled distribution of features includes an array of features having at least one repeating unit.

Embodiment 17

The method of any one of embodiments 2, 8, and 14, wherein the controlled distribution of features includes at least one protrusion or depression within the body.

Embodiment 18

The method of any one of embodiments 2, 8, and 14, wherein the controlled distribution of features includes an interconnected network of depressions formed in at least a portion of the body.

Embodiment 19

The method of any one of embodiments 2, 8, and 14, wherein the controlled distribution of features includes at least one depression extending partially into the body.

Embodiment 20

The method of any one of embodiments 2, 8, and 14, wherein the controlled distribution of features includes a discontinuous distribution of depressions extending partially into the body.

Embodiment 21

The method of any one of embodiments 2, 8, and 14, wherein the controlled distribution of features include at least one feature having a length>width>depth.

Embodiment 22

The method of any one of embodiments 1, 2, and 3, wherein drying includes drying at a drying temperature within a range of at least 20° C. and not greater than 250° C.

Embodiment 23

The method of any one of embodiments 1, 2, and 3, wherein drying includes drying at a relative humidity within a range of at least 10% and not greater than 90%.

Embodiment 24

The method of any one of embodiments 1, 2, and 3, wherein drying includes applying radiation to the body, the radiation having a wavelength within a range of at least 700 microns to not greater than 1 mm.

Embodiment 25

The method of any one of embodiments 1, 2, and 3, wherein drying includes applying radiation to the body, the radiation having a wavelength within a range of at least 1 mm to not greater than 1 m.

Embodiment 26

The method of any one of embodiments 1, 2, and 3, wherein drying includes controlling a flow rate within the drying environment within a range of at least 0.1 m/s and not greater than 5 m/s.

Embodiment 27

The method of any one of embodiments 1, 2, and 3, wherein drying includes creating controlled cracking conditions in the body by controlling at least one of:
a drying temperature within a range of at least 20° C. and not greater than 250° C.;
a relative humidity within a range of at least 10% and not greater than 90%;
a flow rate within a range of at least 0.1 m/s and not greater than 5 m/s; or
any combination thereof.

Embodiment 28

The method of any one of embodiments 1, 2, and 3, wherein forming comprises a process selected from the group consisting of printing, extruding, depositing, pressing, punching, casting, and a combination thereof.

Embodiment 29

The method of any one of embodiments 1, 2, and 3, wherein forming comprises depositing the mixture onto a belt within a deposition zone and translating the mixture and belt from the deposition zone to a drying zone.

Embodiment 30

The method of any one of embodiments 1, 2, and 3, wherein the body is in the form of a layer having a first major surface, a second major surface, and a side surface, and wherein the first major surface defines a width (w), the side surface defines a height (h), and wherein the layer has an aspect ratio (w:h) of at least 10:1.

Embodiment 31

The method of embodiment 30, wherein the first major surface has a surface area of at least 10 cm2.

Embodiment 32

The method of any one of embodiments 1, 2, and 3, further comprising sintering the plurality of precursor abrasive particles to form abrasive particles.

Embodiment 33

The method of embodiment 32, wherein the abrasive particles comprise a ceramic.

Embodiment 34

The method of embodiment 32, wherein the abrasive particles comprise alpha alumina.

Embodiment 35

The method of embodiment 32, wherein the abrasive particles comprise a polycrystalline material having an average grain size of not greater than 20 microns.

Embodiment 36

The method of embodiment 32, further comprising incorporating the abrasive particles into a fixed abrasive article.

Embodiment 37

The method of any one of embodiments 1, 2, and 3, wherein the body comprises an average height of at least 50 microns or at least 100 microns or at least 200 microns or at least 300 microns or at least 400 microns or at least 500 microns or at least 600 microns or at least 700 microns or at least 800 microns or at least 900 microns or at least 1 mm or at least 1.2 mm or at least 1.4 mm or at least 1.6 mm or at least 1.8 mm.

Embodiment 38

The method of any one of embodiments 1, 2, and 3, wherein the body comprises an average height of not greater than 2 mm or not greater than 1.8 mm or not greater than 1.6 mm or not greater than 1.4 mm or not greater than 1.2 mm or not greater than 1 mm or not greater than 900 microns or not greater than 800 microns or not greater than 700 microns or not greater than 600 microns or not greater than 500 microns or not greater than 400 microns or not greater than 300 microns or not greater than 200 microns.

Embodiment 39

The method of any one of embodiments 1, 2, and 3, wherein the ceramic includes a material selected from the group of oxides, nitrides, borides, carbides, and a combination thereof.

Embodiment 40

The method of any one of embodiments 1, 2, and 3, wherein the ceramic includes alumina.

Embodiment 41

The method of any one of embodiments 1, 2, and 3, wherein the plurality of precursor abrasive particles is formed entirely via drying of the body to induce cracking.

Embodiment 42

The method of any one of embodiments 1, 2, and 3, wherein the plurality of precursor abrasive particle is formed without comminution of the body.

Embodiment 43

The method of any one of embodiments 1, 2, and 3, wherein the plurality of precursor abrasive particles is formed without intentional vibration of the body to induce cracking of the body.

Embodiment 44

The method of any one of embodiments 1, 2, and 3, wherein forming the mixture into the body includes forming the mixture on a substrate having a particular surface roughness and surface energy relative to the mixture to facilitate controlled cracking and formation of a plurality of precursor abrasive particles from the controlled cracking.

Embodiment 45

The method of any one of embodiments 1, 2, and 3, wherein drying includes fracturing of the mixture to create a collection of abrasive particles comprising:
a first abrasive particle comprising:
a body including a first major surface, a second major surface opposite the first major surface, and a side surface extending between the first major surface and the second major surface, wherein the side surface comprises at least four side surface portions angled with respect to each other, and wherein the first major surface comprises at least one feature; and
a second abrasive particle comprising:
a body including a first major surface, a second major surface opposite the first major surface, and a side surface extending between the first major surface and the second major surface, wherein the side surface comprises not greater than three side surface portions angled with respect to each other.

Embodiment 46

The method of embodiment 45, further comprising a first group of abrasive particles, each of the abrasive particles in the first group being a first abrasive particle.

Embodiment 47

The method of embodiment 45, further comprising a second group of abrasive particles, each of the abrasive particles in the second group being a second abrasive particle.

Embodiment 48

The method of embodiment 45, wherein the body of the first abrasive particle comprises a two-dimensional shape as viewed in a plane defined by a length and a width of the body selected from the first group consisting of regular polygons, irregular polygons, numerals, Greek alphabet characters, Latin alphabet characters, Russian alphabet characters, complex shapes having a combination of polygonal shapes, a shape with linear and curved portions, and a combination thereof.

Embodiment 49

The method of embodiment 45, wherein at least one of the side surface portions of the body of the first abrasive particle is substantially linear.

Embodiment 50

The method of embodiment 45, wherein the body of the first abrasive particle includes a side surface portion having an irregular contour.

Embodiment 51

The method of embodiment 50, wherein a majority of the side surface portions of the body of the first abrasive particle have an irregular contour.

Embodiment 52

The method of embodiment 45, wherein each of the side surface portions of the body of the first abrasive particle extend for a length of at least 5% of a length of the body or at least 10% or at least 15% or at least 20% or at least 25%.

Embodiment 53

The method of embodiment 45, wherein each of the side surface portions of the body of the first abrasive particle extend for a length of not greater than 80% of a length of the body or not greater than 70% or not greater than 60% or not greater than 50% or not greater than 40% or not greater than 30%.

Embodiment 54

The method of any one of embodiments 1, 2, and 3, wherein drying includes forming a plurality of precursor abrasive particles, wherein a majority of the precursory abrasive particles have an irregular two-dimensional shape.

Embodiment 55

The method of any one of embodiments 1, 2, and 3, wherein drying includes forming a plurality of precursor abrasive particles, wherein a majority of the precursory abrasive particles have an substantially polygonal two-dimensional shape.

Embodiment 56

The method of any one of embodiments 1, 2, and 3, wherein drying includes forming a plurality of precursor abrasive particles, wherein a minority of the precursory abrasive particles have an irregular two-dimensional shape.

EXAMPLES

A variety of abrasive particles were made according to the following conditions.

A first sample, Sample S1, was initially formed from a mixture including approximately 37-43 wt % boehmite, water and nitric acid. One may use a commercially available boehmite, such as Disperal from Sasol Corp. The nitric acid-to-boehmite ratio was approximately 0.035. The boehmite was mixed and seeded with 1% alpha alumina seeds relative to the total alumina content of the mixture. The alpha alumina seeds were made by milling of corundum using conventional techniques, described for example in U.S. Pat. No. 4,623,364. The ingredients were mixed in a planetary mixer of conventional design and mixed under reduced pressure to remove gaseous elements from the mixture (e.g., bubbles).

The mixture was then cast onto a belt using an extruder. The mixture formed a layer having a width of approximately 8 cm and a height of approximately 0.4 mm. The surface of the belt in contact with the mixture was Invar 36. The extrusion and formation of the mixture into a layer was conducted under standard ambient conditions of temperature, pressure, and atmosphere.

After forming the mixture, various modifications were conducted to create different samples of abrasive particles. In particular, the layer was shaped with various different forms having different features.

Example 1

The mixture was formed into a layer as described above and the upper surface of the layer was modified using a form having square-shaped openings, such as the form illustrated in FIGS. 3A and 3B. Each square-shaped opening had four sides defining the openings, and each side was approximately 1.7 mm in length. The form was made of silicone and was pressed (by hand) into the upper surface of the body on the belt. Sufficient force was applied to create lines in the upper surface of the body corresponding to the arrangement of features on the form.

The modified body was conveyed to a drying zone including two 4000 W IR lamps mounted in parallel, side-by-side over the upper surface of the modified body. Each lamp was 40 inches long, 2.5 inch wide, and was used at 35% of the maximum power (i.e., 1400 W). The drying temperature within the drying zone was set for 70° C., which was controlled by a thermocouple placed approximately 1 cm above the upper surface of the modified body. Air having a relative humidity of approximately 50% (+15%) was flowed into the drying zone at a flow rate of approximately 1.5 m/s. The drying zone was partially enclosed, having openings at opposite ends to allow air to flow through the enclosure. The enclosure was 2 meters in length, 0.5 meters in height, and 0.5 meters wide.

Drying was conducted under the conditions noted above to achieve controlled cracking of the body and formation of precursor abrasive particles. That is, after modifying the body with the form, the drying conditions were sufficient to crack the modified body in a manner to create a plurality of precursor abrasive particles from the body. The nature of the pattern in the body that was created by the form influenced the cracking behavior during the drying process to facilitate the formation of the precursor abrasive particles.

The dried abrasive particles were then sintered at a sintering temperature of approximately 1400° C. for 10 minutes in a rotary tube furnace of standard atmospheric pressure and an atmosphere of air.

Figure 13A:
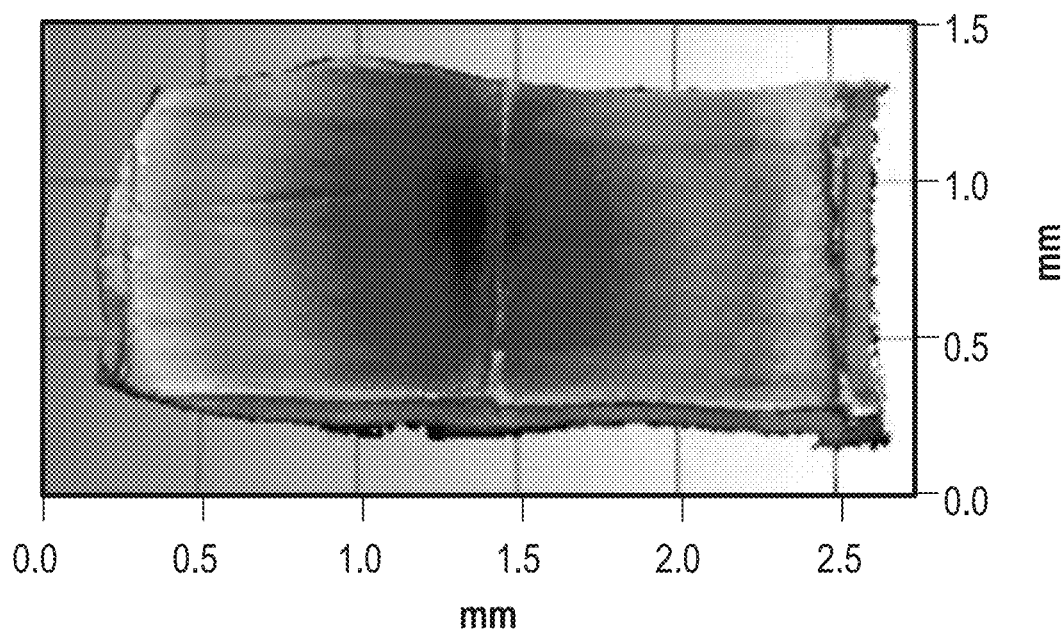
FIGS. 13A-13R include top-down images of abrasive particles from a collection of abrasive particles according to an embodiment.
Figure 13B:
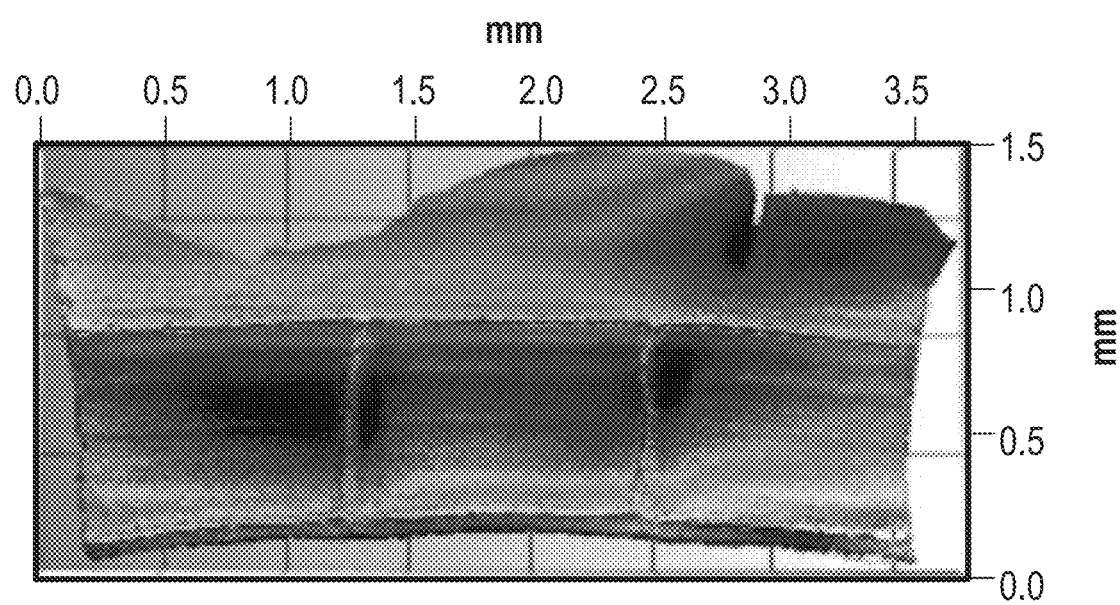
Figure 13C:
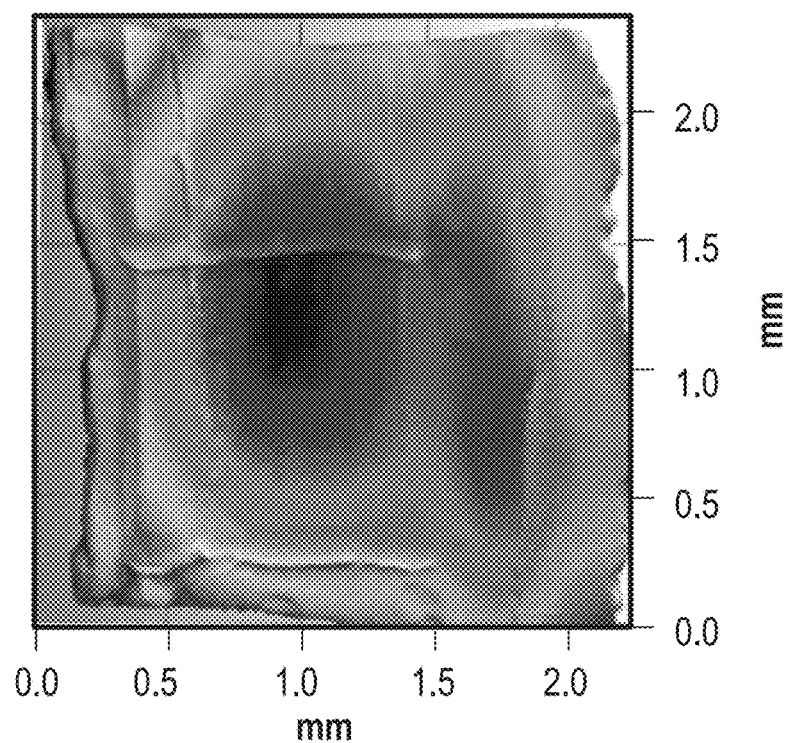
Figure 13D:
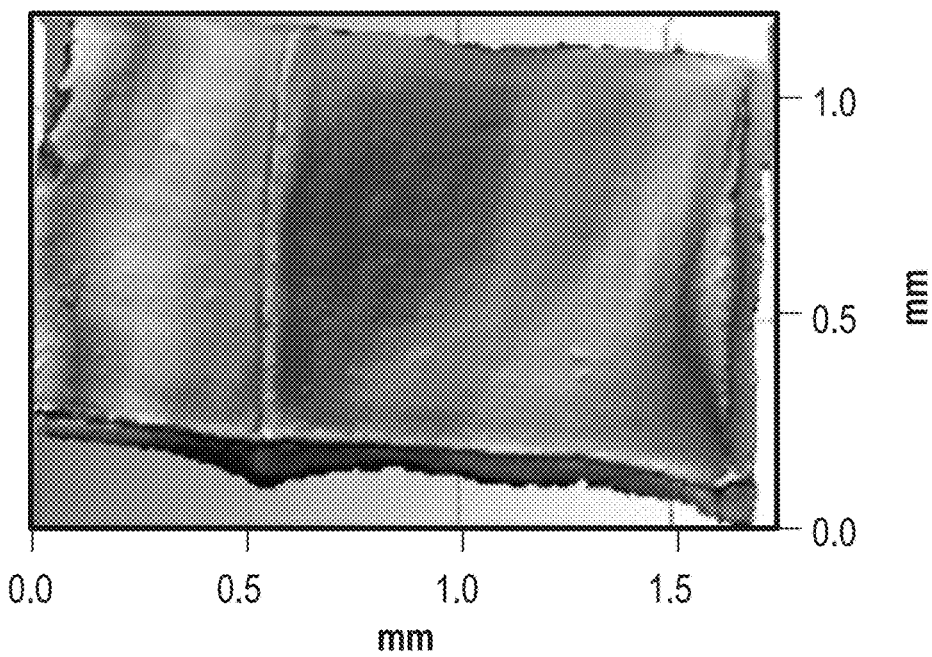
Figure 13E:
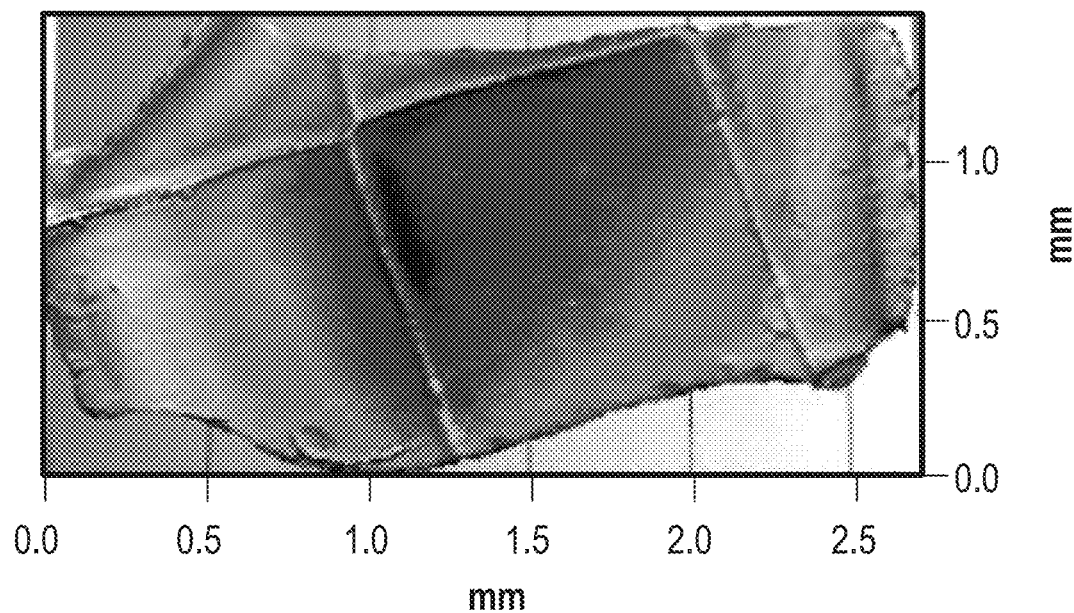
Figure 13F:
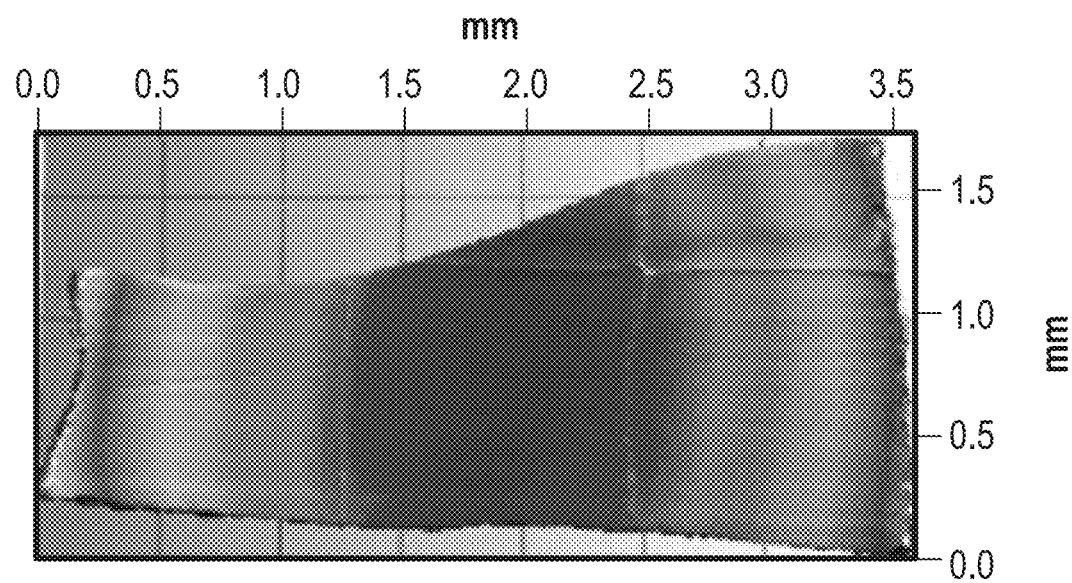
Figure 13G:
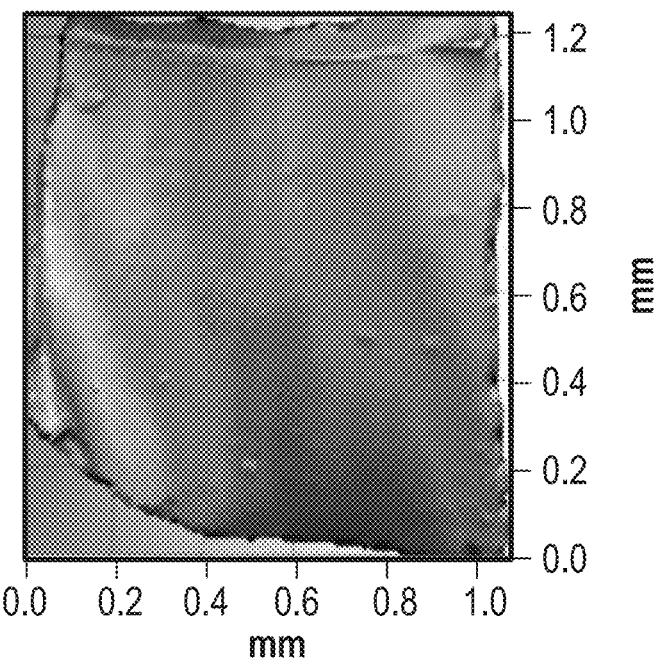
Figure 13H:
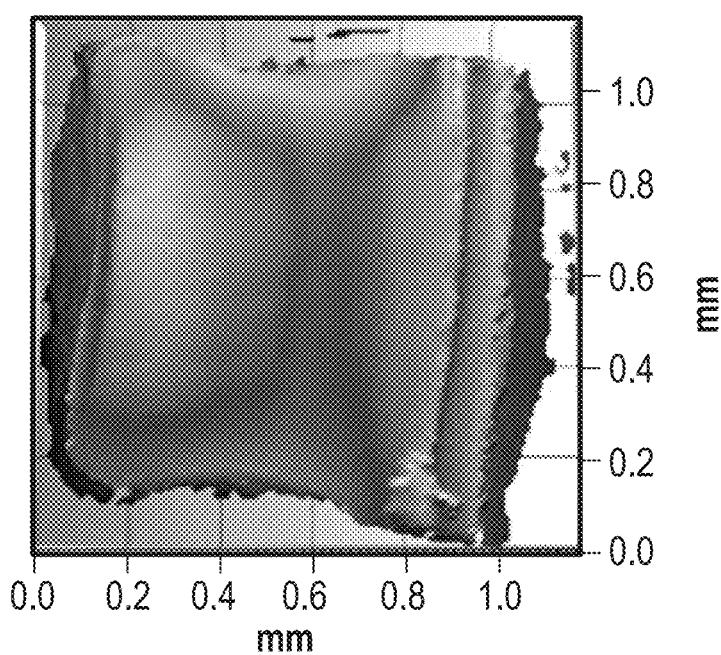
Figure 13I:
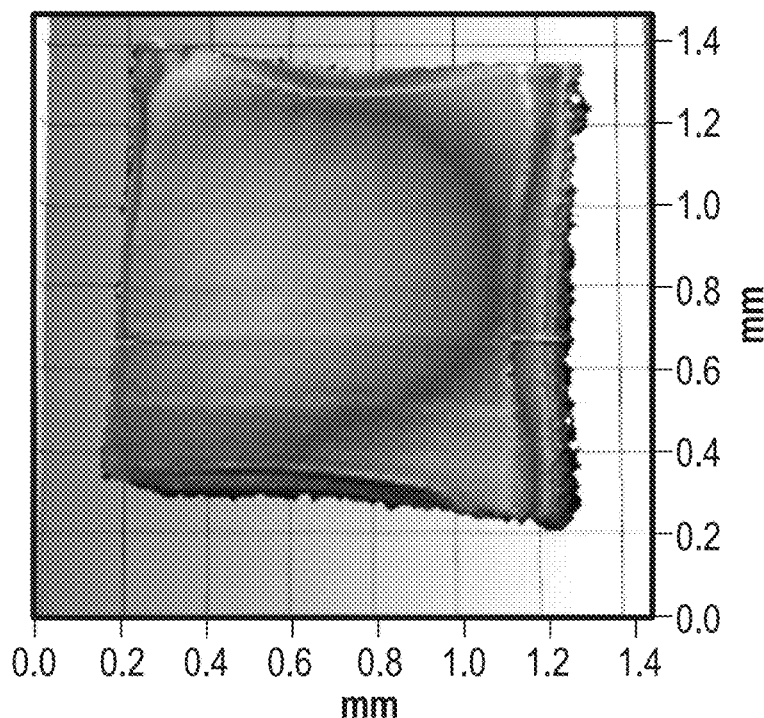
Figure 13J:
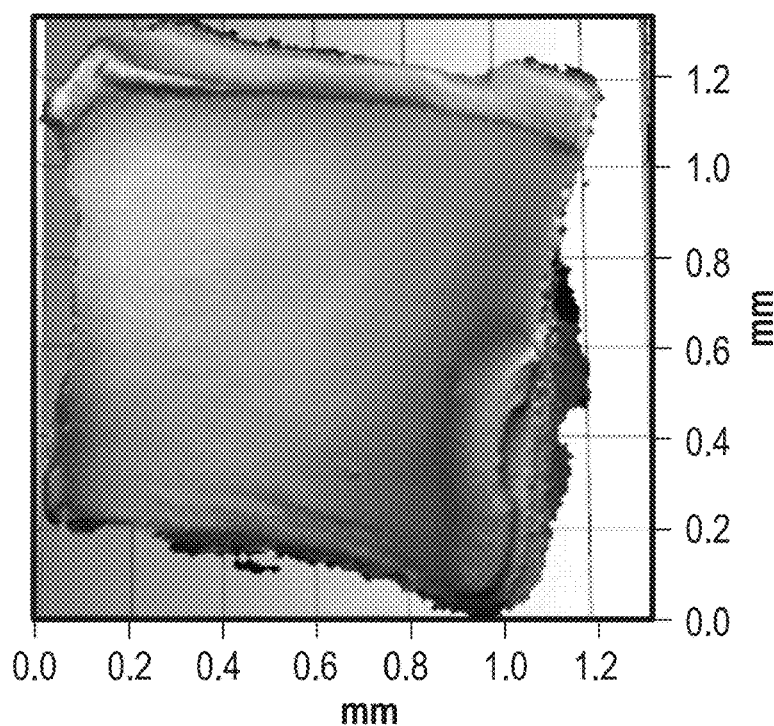
Figure 13K:
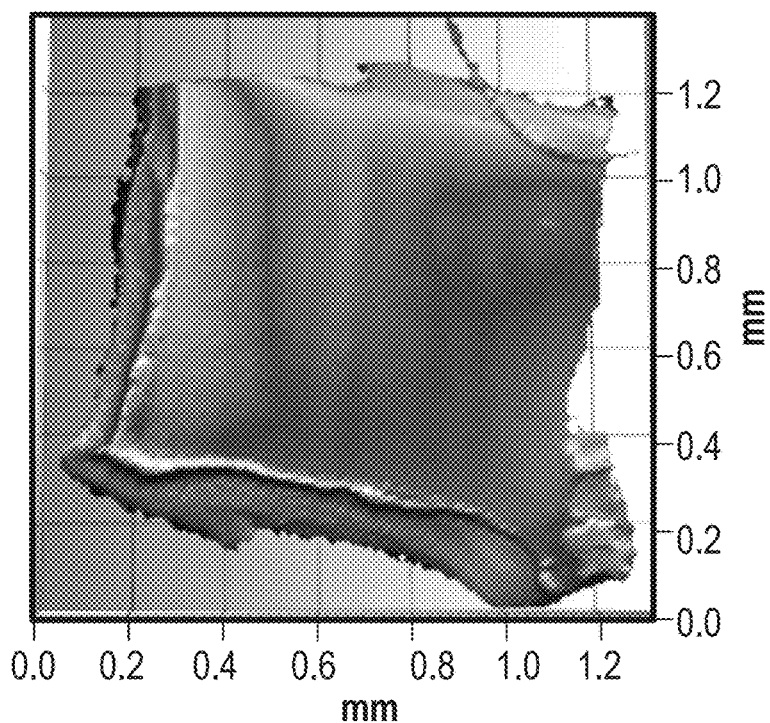
Figure 13L:
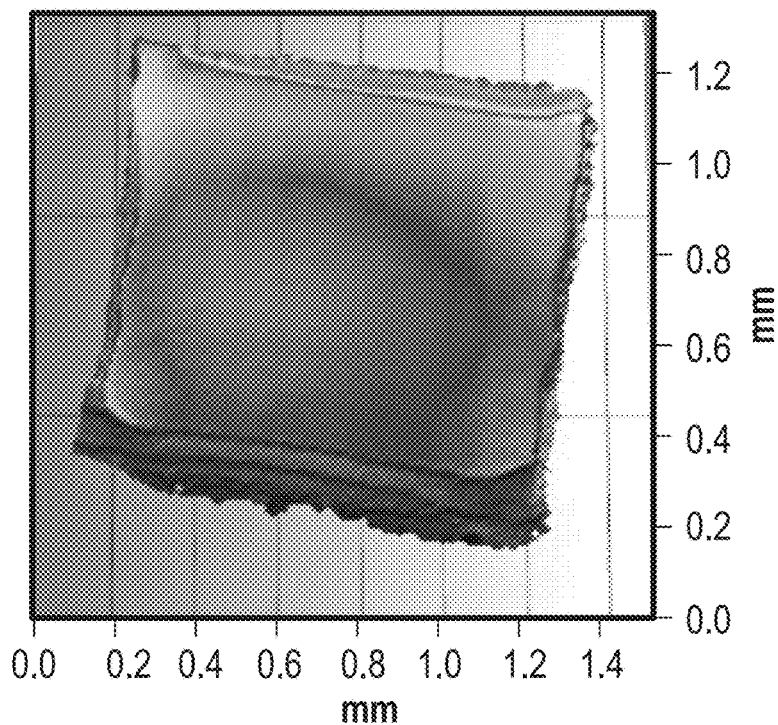
Figure 13M:
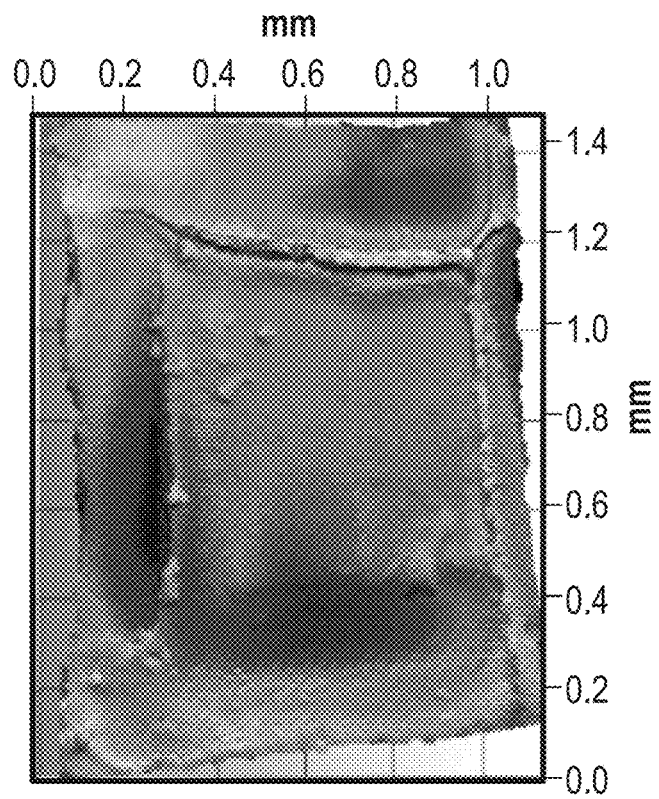
Figure 13N:
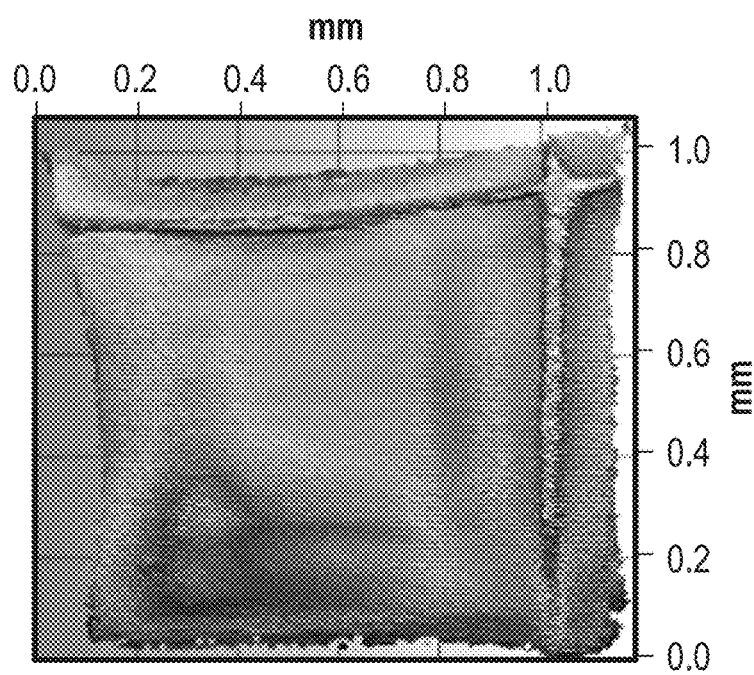
Figure 13O:
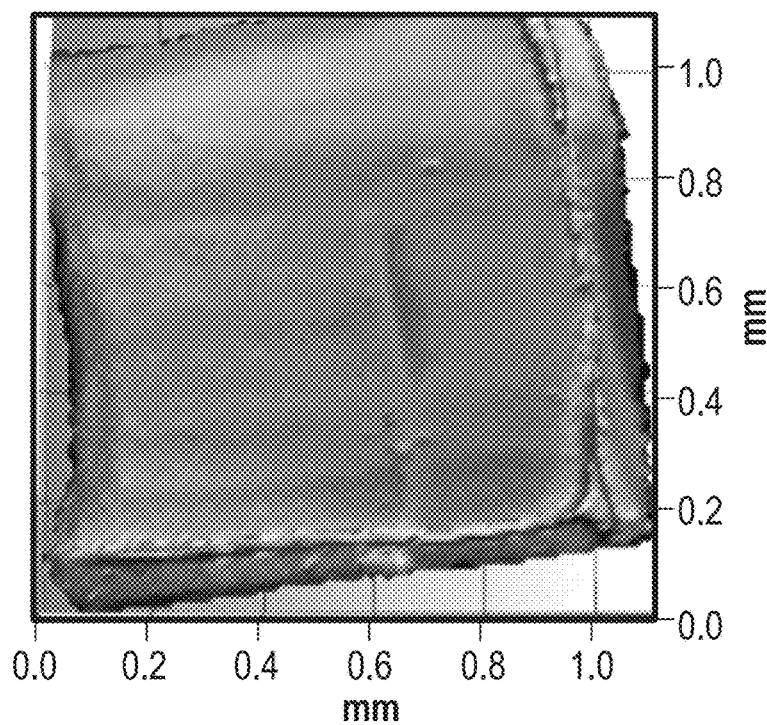
Figure 13P:
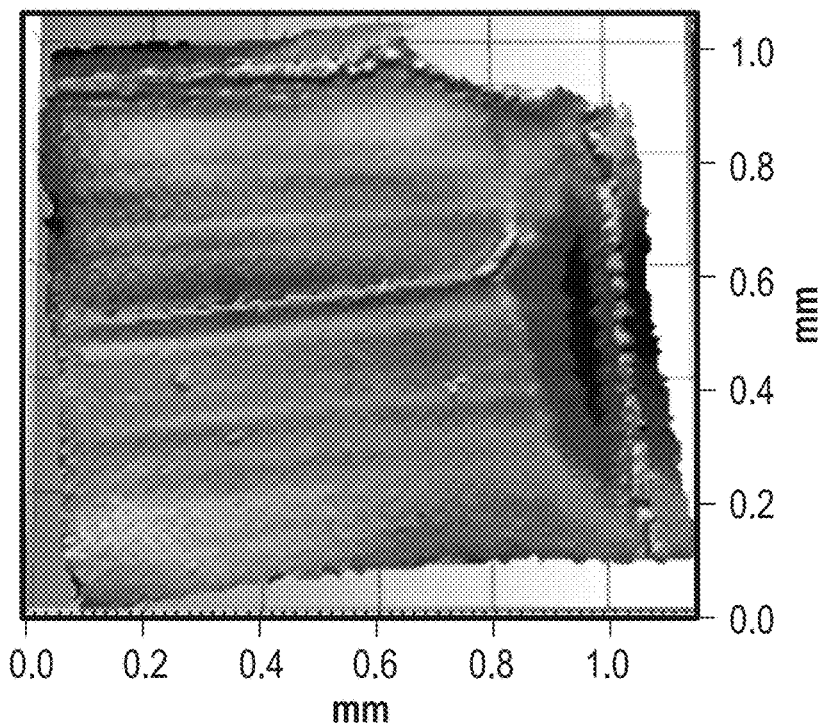
Figure 13Q:
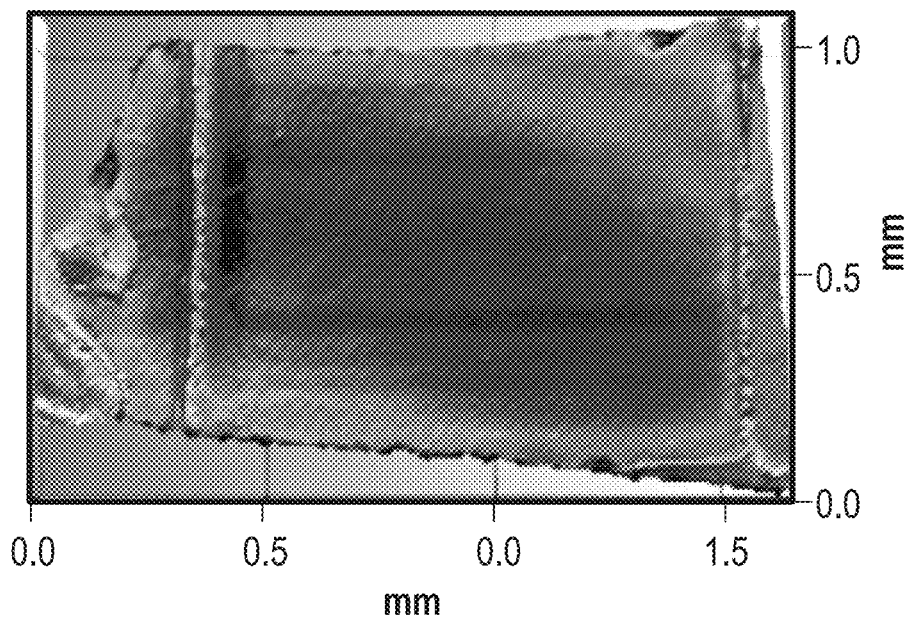
Figure 13R:
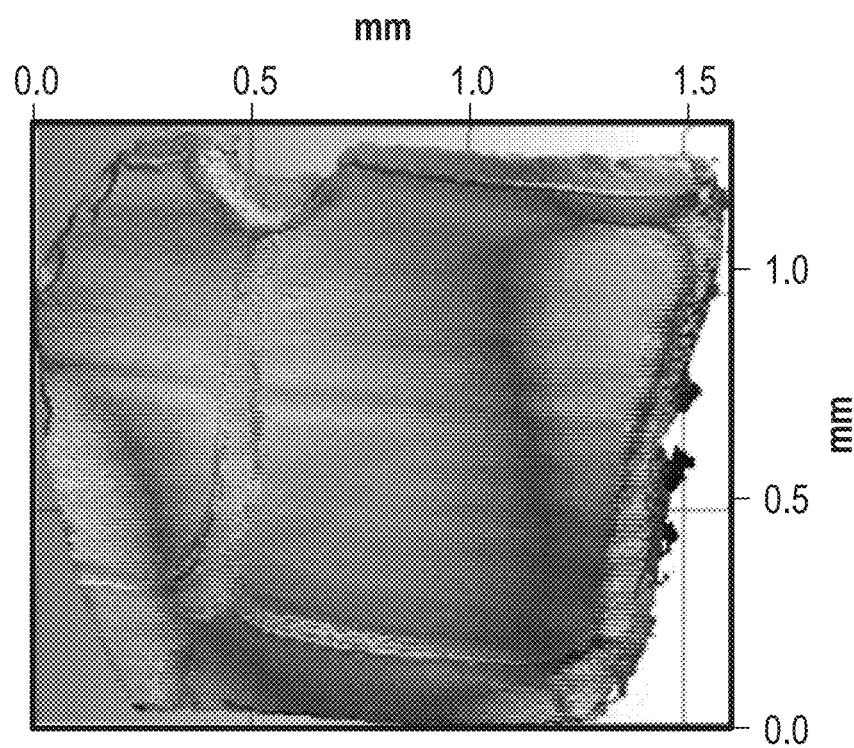
Figure 14A:
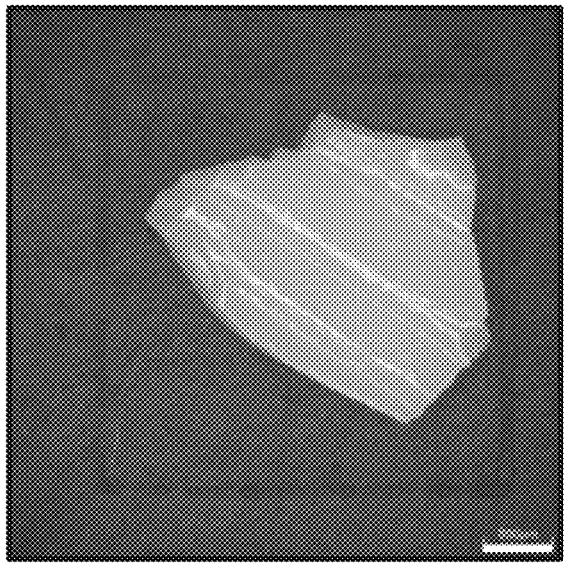
FIGS. 14A-14J include top-down images of abrasive particles from a collection of abrasive particles according to an embodiment.
Figure 14B:
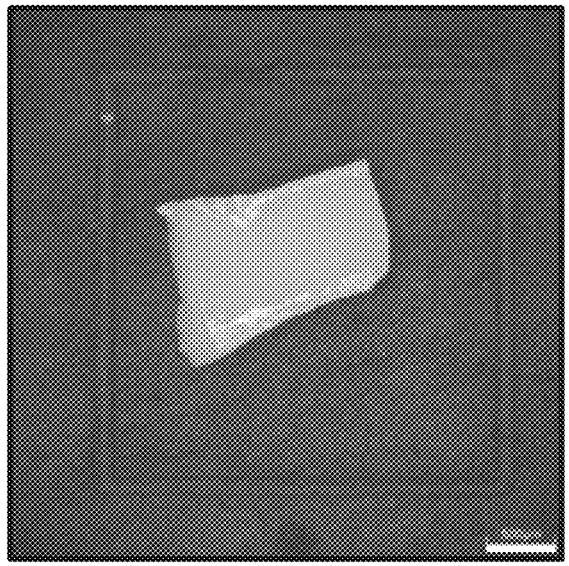
Figure 14C:
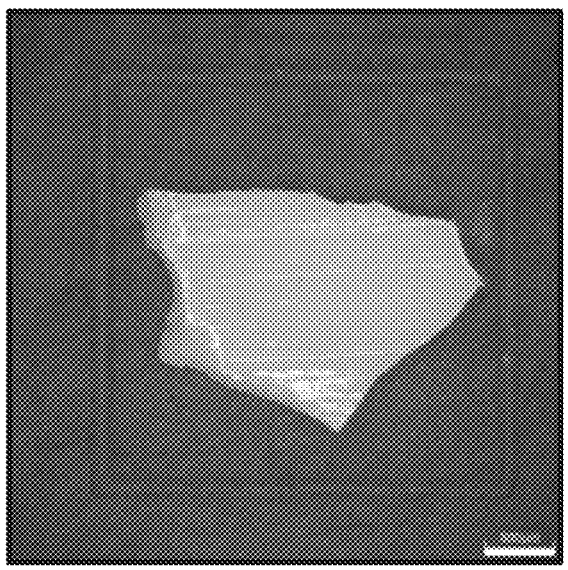
Figure 14D:
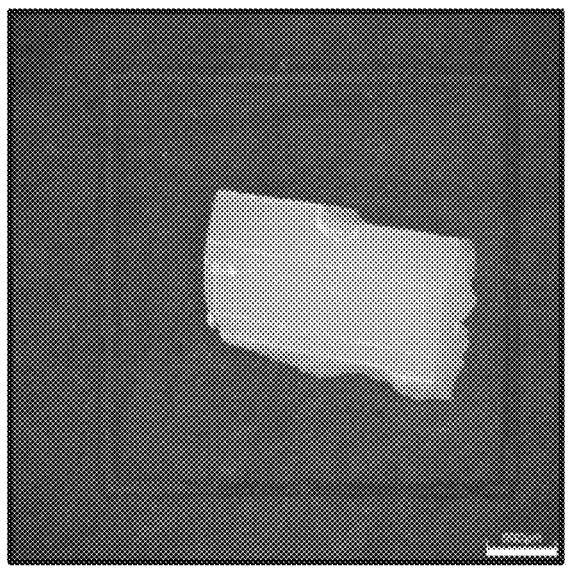
Figure 14E:
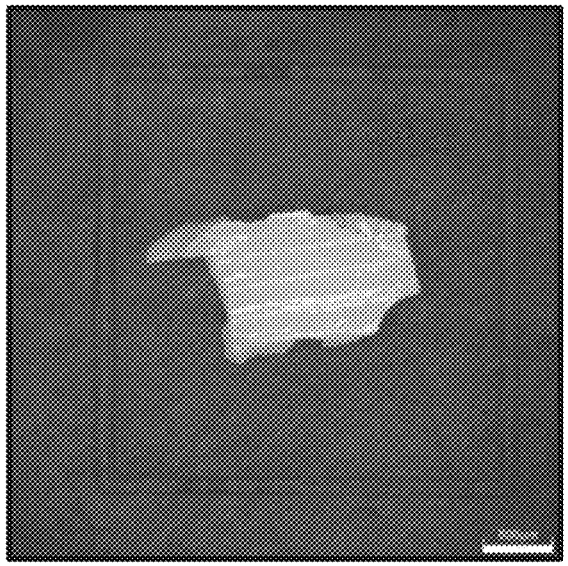
Figure 14F:
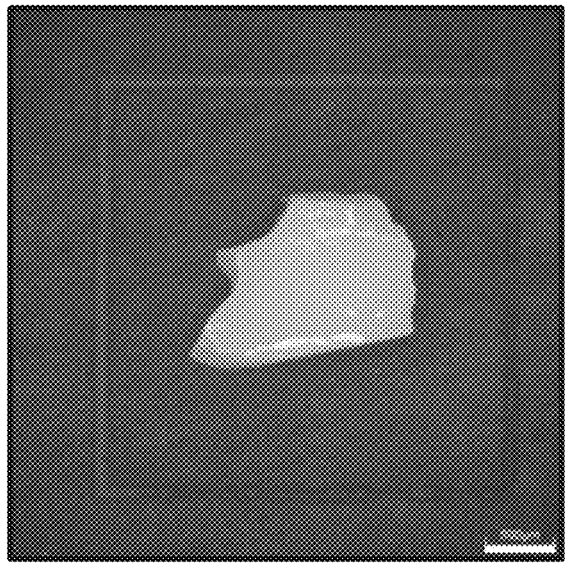
Figure 14G:
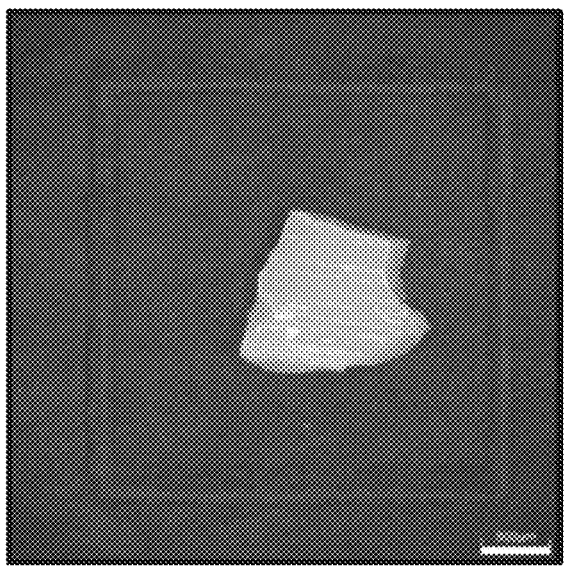
Figure 14H:
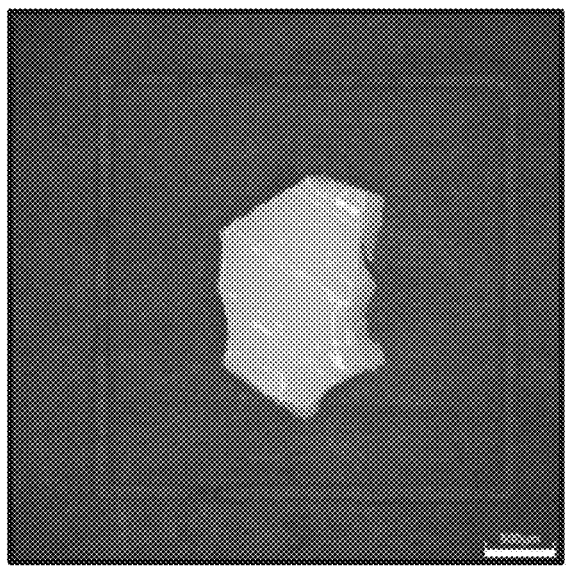
Figure 14I:
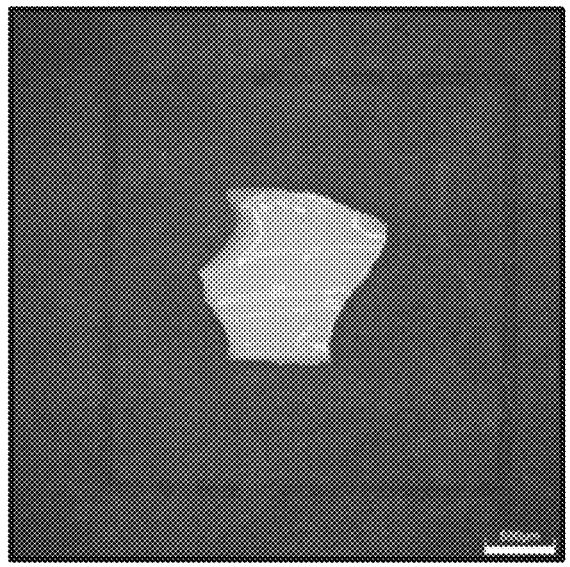
Figure 14J:
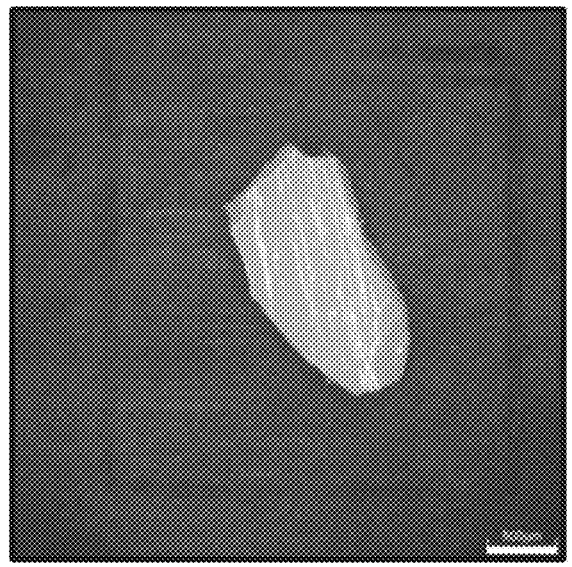

FIGS. 13A-13R provide top-down images of the particles produced according to the method of Example 1. The images from FIGS. 13A-13R include images taken with a Nanovea microscope wherein the color differences represent differences in height along the particle surfaces. Notably, some of the particles did not section along the features formed during the process of modifying the body and evidence of the features exists within these abrasive particles (e.g., FIGS. 13A-13F). Other particles appear to have cracked along the features formed during the modification process (e.g., FIGS. 13G-13L) and such abrasive particles have two-dimensional shapes substantially corresponding to the shape of the openings in the form used to pattern the body. Such abrasive particles also have a size that generally corresponds to the size of the openings in the form used to pattern the body (provided some shrinkage occurred during calcination and sintering). Other abrasive particles (e.g., FIGS. 13M-13R) include images of abrasive particles formed according to Example 1, where the particles appear to have cracked near the features formed in the body, but some evidence of the features (e.g., protrusions or grooves) exist within the abrasive particles. Such features are typically located near the side walls of the abrasive particles. Moreover, those features depicted and described in FIGS. 15A, 15B, 16 and 17 are representative of the abrasive particles made from Example 1.

Example 2

Abrasive particles were formed using the process of creating the mixture as noted above and using the conditions provided in Example 1, except that the body was modified using a form as depicted in FIGS. 4C and 4D. The form was a 3D printed object. The form was pressed (by hand) against the mixture on the belt with sufficient force to create a pattern of features (e.g., depressions) in the upper surface of the body corresponding to the pattern of features in the form. FIGS. 12A-12J include images of the abrasive particles formed according to Example 2.

Example 3

Abrasive particles were formed using the process of creating the mixture as noted above and using the conditions outlined in Example 1, except that the body was modified using a form as depicted in FIGS. 4G and 4H. The form was a 3D printed object. The form was pressed (by hand) against the mixture on the belt with sufficient force to create a pattern of features (e.g., depressions) in the upper surface of the body corresponding to the pattern of features in the form. FIGS. 14A-14J include images of the abrasive particles formed according to Example 3.

Example 4

Abrasive particles were formed using the process of Example 1, with the exception that the mixture was patterned from a form made of PEEK and the form was pressed against the surface of the mixture via a motor-driven roller. These abrasive particles of this sample formed a collection and are referred to herein as Sample S4. A representative image of an abrasive particle from the collection is provided in FIGS. 18-20. The collection of abrasive particles had a MAF of approximately 3.80, an Anisotropy Factor Standard Deviation of approximately 1.14, a MAF difference between the first region and second region of greater than 3, a Mean Non-Convexity Factor of 9.28, a Non-Convexity Factor Standard Deviation of 3.54, an average height of the body of 228 microns, a standard deviation of height of approximately 46 microns, a first region average height of 68 microns, a second region average height of 172 microns.

Figure 23A:
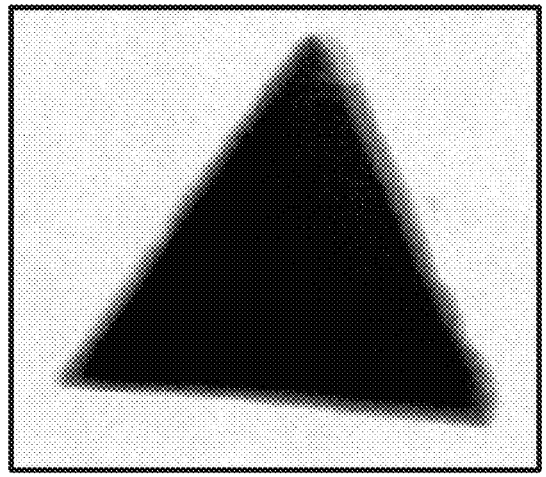
FIG. 23A includes a top-down XRM image of an abrasive particle from Sample CS1.
Figure 23B:
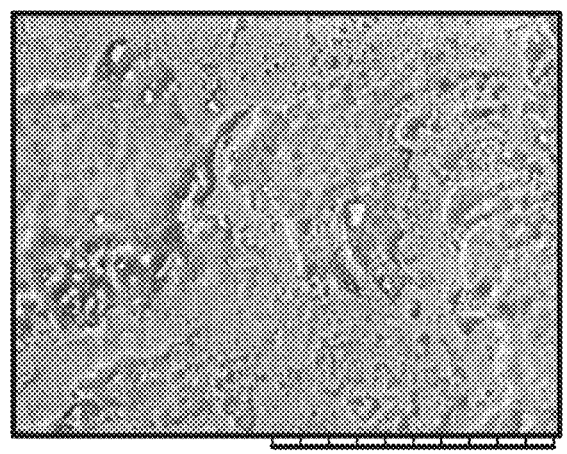
FIG. 23B includes a SEM image of a portion of a side surface of an abrasive particle from Sample CS1.

An analysis was completed on other types of conventional abrasive particles to evaluate the differences between such particles and the representative particles of Sample S4. A first conventional collection of particles, Sample CS1, was obtained and is representative of a triangular shaped abrasive particle available from 3M as Cubitron II. FIG. 23A includes a top-down image of an abrasive particle from Sample CS1. FIG. 23B includes an image of a portion of a side surface of an abrasive particle from Sample CS1.

Figure 24A:
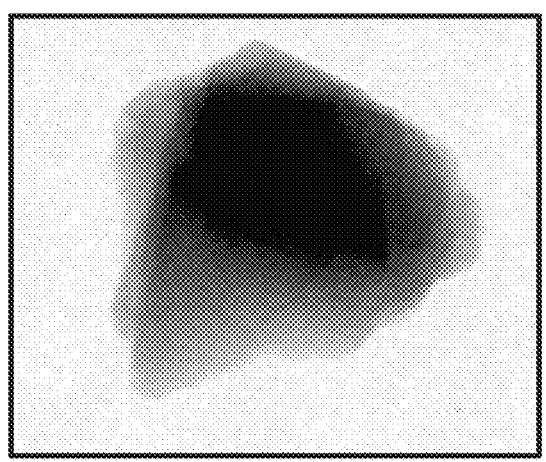
FIG. 24A includes a top-down image of an abrasive particle from Sample CS2.
Figure 24B:
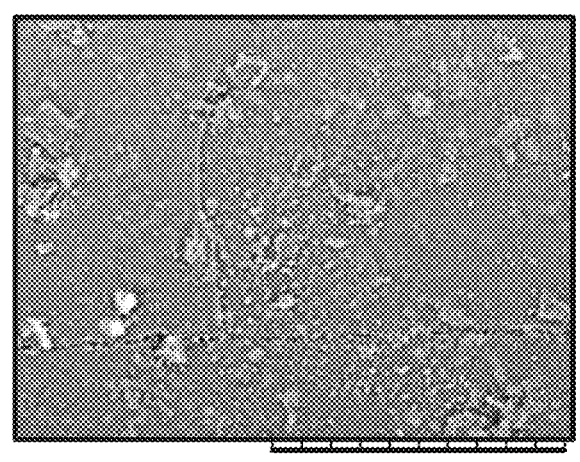
FIG. 24B includes a SEM image of a portion of a side surface of an abrasive particle from Sample CS2.

A second collection of conventional particles, Sample CS2, was obtained and is representative of conventional crushed abrasive particles. FIG. 24A includes a top-down image of a particle of Sample CS2. FIG. 24B includes an image of a portion of a side surface of an abrasive particle of Sample CS2. Such particles are commercially available as Cerpass 24 Grit from Saint-Gobain Corporation.

Figure 25A:
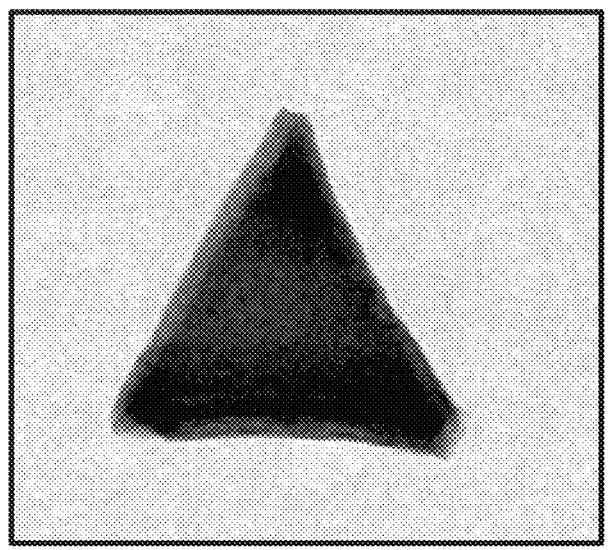
FIG. 25A includes a top-down SEM image of an abrasive particle from Sample CS3.
Figure 25B:
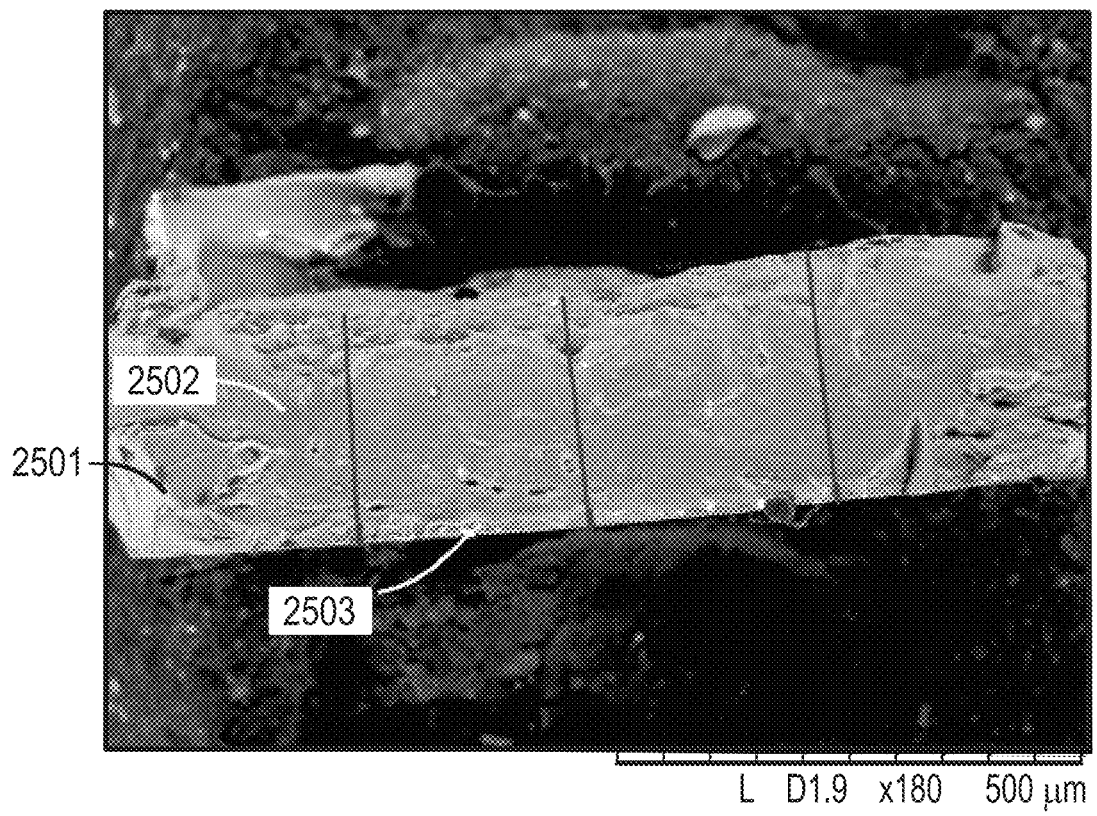
FIG. 25B includes a SEM image of a portion of a side surface of an abrasive particle from Sample CS1.

Finally, a third collection of conventional abrasive particles, Sample CS3, was obtained and is representative of particles that were casted into a layer of material that was later cut by blades. FIG. 25A includes a top-down image of a particle of Sample CS3. FIG. 25B includes an image of a portion of a side surface of an abrasive particle of Sample CS2.

The abrasive particles of Sample CS1 had a MAF of approximately 0.64, an Anisotropy Factor Standard Deviation of approximately 0.49, a Mean Non-Convexity Factor of 3.32, a Non-Convexity Factor Standard Deviation of 0.73, and an average height of the body of 290 microns. As the abrasive particles of Sample CS1 are shaped abrasive particles presumably made through a molding process, the sidewalls of the particles did not exhibit noticeably different regions, such as a first region and second region as was demonstrated by the representative abrasive particles of Sample S4.

The collection of abrasive particles of Sample CS2 had a MAF of approximately 1.21, an Anisotropy Factor Standard Deviation of approximately 0.72, a Mean Non-Convexity Factor of 12.9, a Non-Convexity Factor Standard Deviation of 3.65, an average height of the body of 514 microns, a standard deviation of height of approximately 106 microns. As the abrasive particles of Sample CS2 are crushed abrasive particles, the sidewalls of the particles did not exhibit noticeably different regions, such as a first region and second region as was demonstrated by the representative abrasive particles of Sample S4.

The collection of abrasive particles of Sample CS3 had a Mean Non-Convexity Factor of 9.40, a Non-Convexity Factor Standard Deviation of 2.33. The MAF was not measured, but given what is provided in the images, the majority of the sidewall regions would likely have a MAF less than the representative abrasive particles of Sample S4. The same is expected of the Anisotropy Factor Standard Deviation. As illustrated in FIG. 25B the abrasive particles of Sample CS3 generally had sidewalls that included first and second regions 2502 and 2503, respectively. The average height of the body was approximately 289 microns and the standard deviation of the height was approximately 57 microns. The second region 2503 was notably smaller in height compared to the first region 2502. The second region 2503 had an average height of 18 microns and the first region 2502 had an average height of approximately 271 microns. The height of the second region 2503 relative to the height of the body 2501 was approximately 6%. The first region 2502 has a notably smoother and less textured surface compared to the second region 2503.

The present application represents a departure from the state of the art. While the industry has recognized that abrasive particles may be formed through processes such as molding and screen printing, the processes of the embodiments herein are distinct from such processes. Notably, the embodiments herein utilize a combination of process features that facilitate the formation of abrasive particles having one or a combination of unique features. Such features can include, but are not limited to, shape, size, features in one or more major surfaces, composition, and others as described in the embodiments herein. Moreover, the processes of the embodiments herein facilitate the formation of a shaped abrasive particle or a batch of abrasive particles, having one or more characteristics, including one or more combination of the features of the abrasive particles. Certain abrasive particles and batches containing abrasive particles of the embodiments herein may have features that enable enhanced performance in the context of fixed abrasive articles.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A method for making abrasive particles comprising:
   forming a mixture into a body wherein the body is in the form of a layer, wherein the mixture comprises a ceramic;
   deforming at least a portion of the body to create at least one crack initiation point, wherein deforming includes contacting a form to a surface of the body;
   drying the body under controlled cracking conditions to fracture the body into a plurality of precursor abrasive particles, wherein controlled cracking conditions include controlled crack propagation from the at least one crack initiation point; and
   forming the precursor abrasive particles into abrasive particles, each of the abrasive particles comprising a body having a first major surface, a second major surface, and a side surface extending between the first and second major surfaces, and wherein the side surface comprises an irregular two-dimensional shape as viewed in the plane of the first or second major surfaces.

2. The method of claim 1, wherein forming is conducted without the use of a production tool.

3. The method of claim 1, wherein deforming at least a portion of the body includes forming a controlled distribution of features in at least a portion of the body.

4. The method of claim 3, wherein the controlled distribution of features includes a random distribution of features.

5. The method of claim 1, wherein drying includes creating controlled cracking conditions in the body by controlling at least one of:
   a drying temperature within a range of at least 20° C. and not greater than 250° C.;
   a relative humidity within a range of at least 10% and not greater than 90%;
   a flow rate of gases in a drying environment surrounding the body within a range of at least 0.1 m/s and not greater than 5 m/s; or
   any combination thereof.

6. The method of claim 1, wherein the layer comprises a first major surface, a second major surface, and a side surface, and wherein the first major surface defines a width (w), the side surface defines a height (h), and wherein the layer has an aspect ratio (w:h) of at least 10:1, and wherein the first major surface has a surface area of at least 10 cm2.

7. The method of claim 1, wherein the plurality of precursor abrasive particle is formed without comminution of the body or intentional vibration of the body to induce cracking of the body.

8. The method of claim 1, wherein the form comprises one or more features used to create corresponding features in the body.

9. The method of claim 8, wherein the features include protrusions, walls, or openings.

10. The method of claim 8, wherein a portion of an upper surface of the body is deformed to include features corresponding to the features of the form.

11. The method of claim 1, wherein the side surface comprises a random and unpredictable contour.

12. The method of claim 1, wherein the abrasive particles include constant height abrasive particles (CHAPs) having a length, width and thickness, and wherein the CHAPs have a primary aspect ratio of length:width of at least 1.1:1 and a secondary aspect ratio of width:height of at least 1.1:1.

13. The method of claim 1, wherein the first and second major surfaces are substantially parallel to each other.

14. The method of claim 1, wherein the abrasive particles have a mean non-convexity factor of at least 3.5.

15. The method of claim 1, wherein the abrasive particles have a mean non-convexity factor of no greater than 30.

16. The method of claim 1, wherein the abrasive particles have a non-convexity factor standard deviation of at least 2.4.

17. The method of claim 1, wherein the abrasive particles have a non-convexity factor standard deviation of no greater than 30.

18. The method of claim 1, wherein the abrasive particles have a mean anisotropy factor of at least 1.25.

19. The method of claim 1, wherein the abrasive particles have a mean anisotropy factor of no greater than 20.

20. The method of claim 1, wherein the abrasive particles are incorporated into a coated abrasive.

* * * * *